(12) United States Patent
Shin et al.

(10) Patent No.: US 10,254,863 B2
(45) Date of Patent: Apr. 9, 2019

(54) MOBILE TERMINAL

(71) Applicant: LG ELECTRONICS INC., Seoul (KR)

(72) Inventors: Choonghwan Shin, Seoul (KR);
Eunsang Lee, Seoul (KR); Byunghwa Lee, Seoul (KR); Sanghyun Eim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 14/956,828

(22) Filed: Dec. 2, 2015

(65) Prior Publication Data
US 2016/0179236 A1    Jun. 23, 2016

(30) Foreign Application Priority Data

Dec. 19, 2014  (KR) .................. 10-2014-0184895
Dec. 29, 2014  (KR) .................. 10-2014-0192314

(51) Int. Cl.
| | |
|---|---|
| G06F 1/16 | (2006.01) |
| H04M 1/02 | (2006.01) |
| G06F 3/041 | (2006.01) |
| G06F 3/0481 | (2013.01) |
| G06F 3/0487 | (2013.01) |

(52) U.S. Cl.
CPC ............ *G06F 3/041* (2013.01); *G06F 1/1616* (2013.01); *G06F 1/1652* (2013.01); *G06F 1/1677* (2013.01); *G06F 3/0487* (2013.01); *G06F 3/04817* (2013.01); *H04M 1/0216* (2013.01); *G06F 2203/04102* (2013.01); *G06F 2203/04804* (2013.01); *H04M 1/0245* (2013.01); *H04M 1/0268* (2013.01)

(58) Field of Classification Search
CPC .... G06F 3/041; G06F 3/0487; G06F 3/04817;
G06F 1/1677; G06F 1/1652; G06F 1/1616; G06F 2203/04102; G06F 2203/04804; H04M 1/0216; H04M 1/0245; H04M 1/0268
See application file for complete search history.

(56) References Cited

U.S. PATENT DOCUMENTS 9,703,323 B2 *  7/2017  Song .................... G06F 1/1652
9,804,635 B2 * 10/2017  Kim ..................... G06F 1/1605
(Continued)

FOREIGN PATENT DOCUMENTS

WO        2014101098 A1     7/2014

*Primary Examiner* — Nitin Patel
*Assistant Examiner* — Amy Onyekaba
(74) *Attorney, Agent, or Firm* — Dentons US LLP

(57) ABSTRACT

A mobile terminal includes: a body including a first body, a second body, and a connection unit configured to connect the first and second bodies to each other so that an angle between the first and second bodies is changeable, and the body formed so that at least one region thereof is formed of a transmissive region; a transparent flexible display unit mounted to one surface of the body, and configured to output screen information; a sensing unit configured to sense a first state where the flexible display unit is unfolded, and a second state where the first and second bodies are overlapped with each other, by change of the angle; and a controller configured to change transparency of a region corresponding to the transmissive region, based on change of the angle.

27 Claims, 61 Drawing Sheets

(56) References Cited

U.S. PATENT DOCUMENTS

| | | | |
|---|---|---|---|
| 2007/0085837 A1* | 4/2007 | Ricks | G02F 1/13338 345/173 |
| 2010/0056223 A1* | 3/2010 | Choi | G06F 1/1601 455/566 |
| 2010/0060548 A1 | 3/2010 | Choi et al. | |
| 2010/0117975 A1 | 5/2010 | Cho | |
| 2010/0182265 A1* | 7/2010 | Kim | G06F 1/1616 345/173 |
| 2010/0222110 A1* | 9/2010 | Kim | G06F 1/1616 455/566 |
| 2010/0298032 A1* | 11/2010 | Lee | G06F 1/1616 455/566 |
| 2011/0084893 A1* | 4/2011 | Lee | G06F 1/1649 345/6 |
| 2012/0060089 A1 | 3/2012 | Heo et al. | |
| 2012/0256895 A1* | 10/2012 | Azumada | G09G 3/3611 345/211 |
| 2013/0106737 A1* | 5/2013 | Hong | G06F 3/0485 345/173 |
| 2013/0176248 A1* | 7/2013 | Shin | G06F 3/041 345/173 |
| 2013/0271378 A1 | 10/2013 | Hulford | |
| 2013/0321264 A1* | 12/2013 | Park | G06F 3/01 345/156 |
| 2013/0321340 A1* | 12/2013 | Seo | G06F 1/1641 345/174 |
| 2014/0152553 A1* | 6/2014 | Cha | G06F 3/013 345/156 |
| 2014/0195947 A1* | 7/2014 | Yang | G06F 3/0486 715/769 |
| 2014/0217373 A1* | 8/2014 | Youn | H01L 23/4985 257/40 |
| 2014/0380227 A1* | 12/2014 | Ng | G06F 1/1616 715/778 |
| 2015/0220299 A1* | 8/2015 | Kim | G06F 1/1605 345/1.3 |
| 2015/0228217 A1* | 8/2015 | Perdices-Gonzalez | G09G 3/348 345/5 |
| 2016/0012641 A1* | 1/2016 | Kim | G06T 19/006 345/633 |
| 2016/0042723 A1* | 2/2016 | Lee | G06T 3/0056 345/639 |
| 2016/0085319 A1* | 3/2016 | Kim | G06F 3/0346 345/156 |
| 2016/0093024 A1* | 3/2016 | Kang | G06T 3/60 345/656 |
| 2016/0109973 A1* | 4/2016 | Kim | G06F 3/041 345/173 |
| 2016/0112086 A1* | 4/2016 | Lei | H04B 1/3888 455/566 |

* cited by examiner

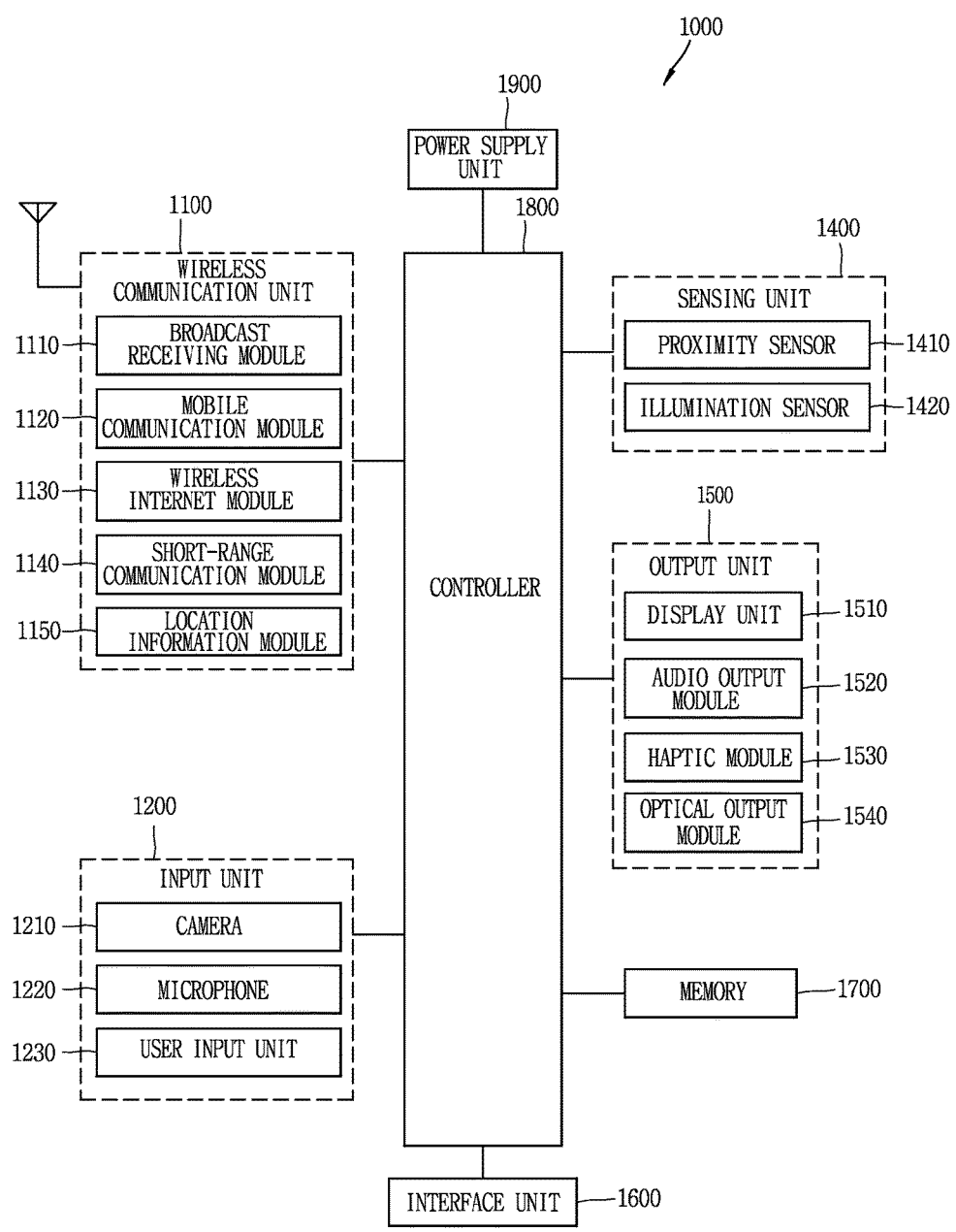

FIG. 5B
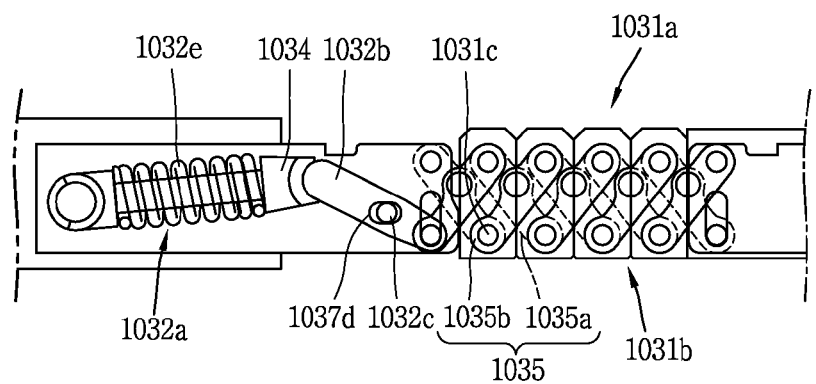
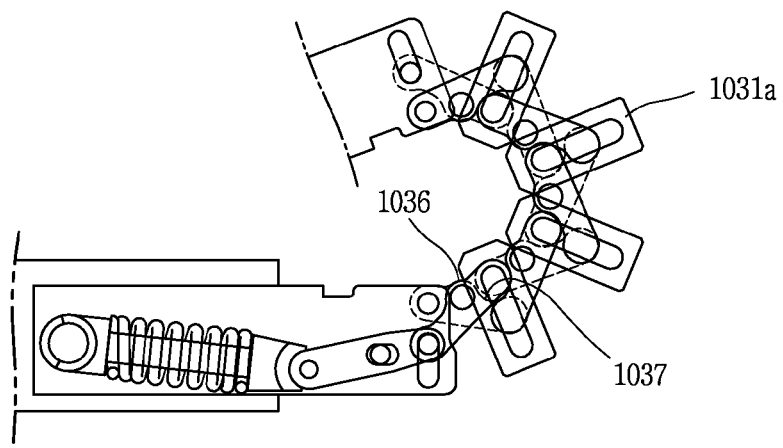

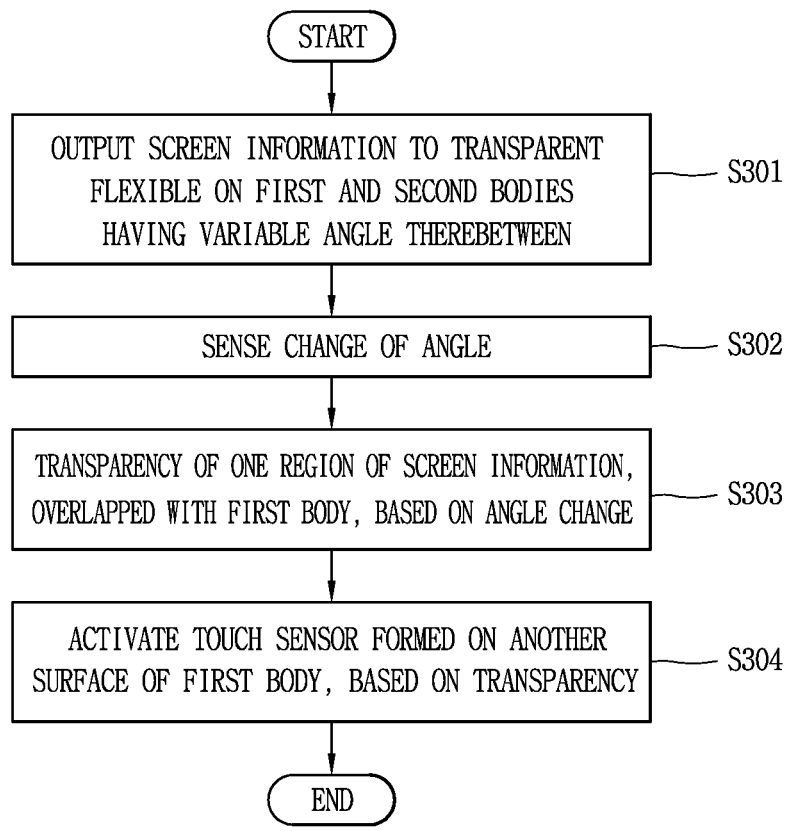

FIG. 6B
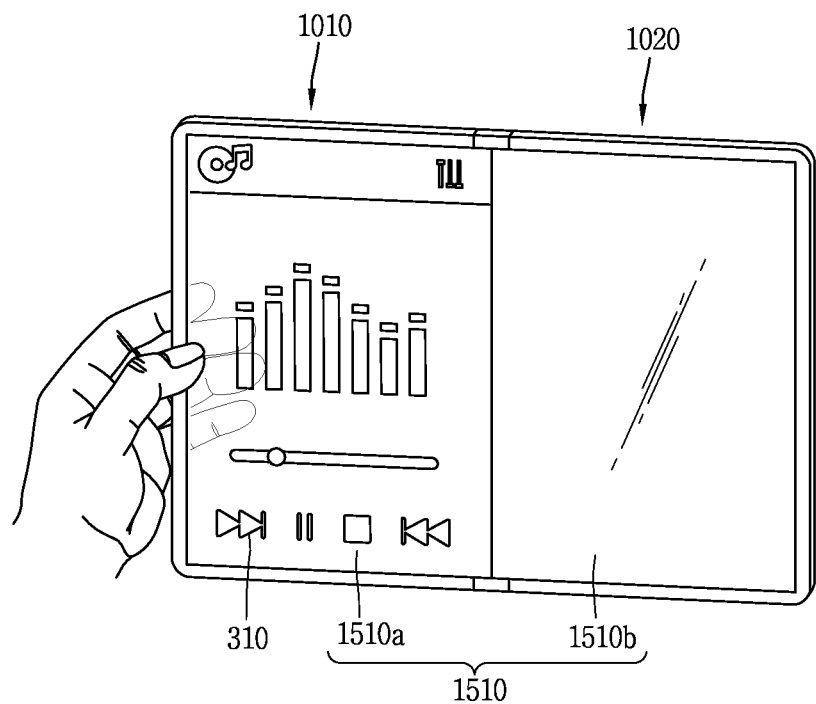
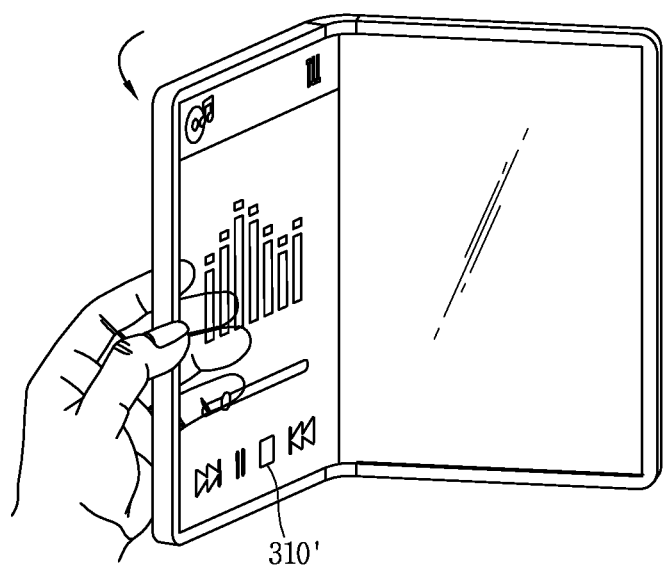

FIG. 6C
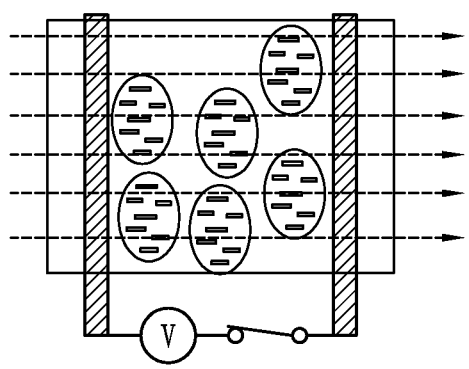
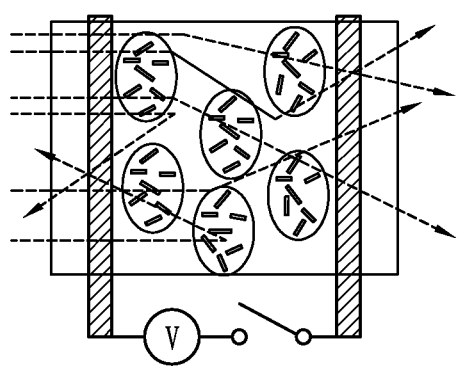

FIG. 9B
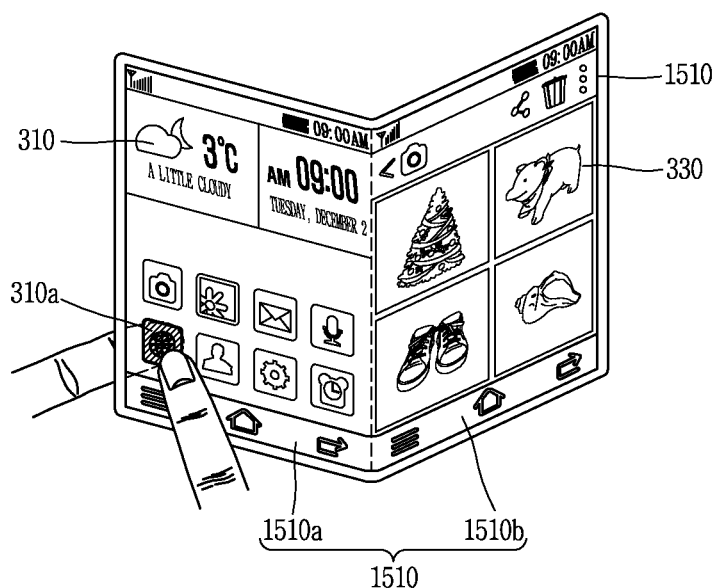
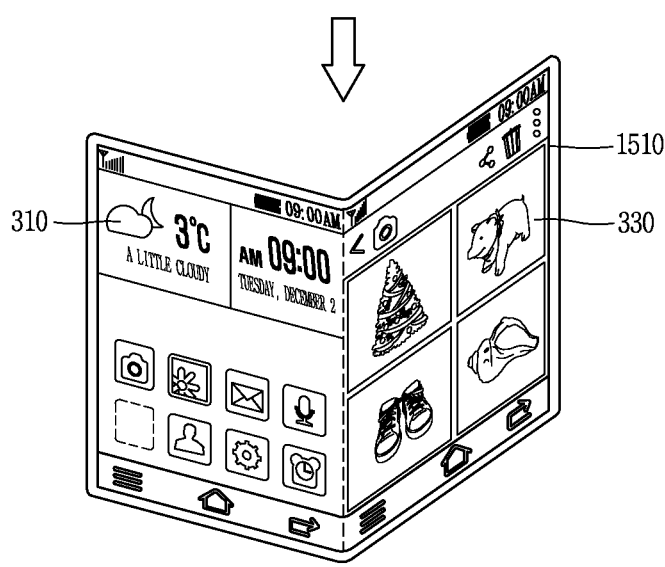

FIG. 9C
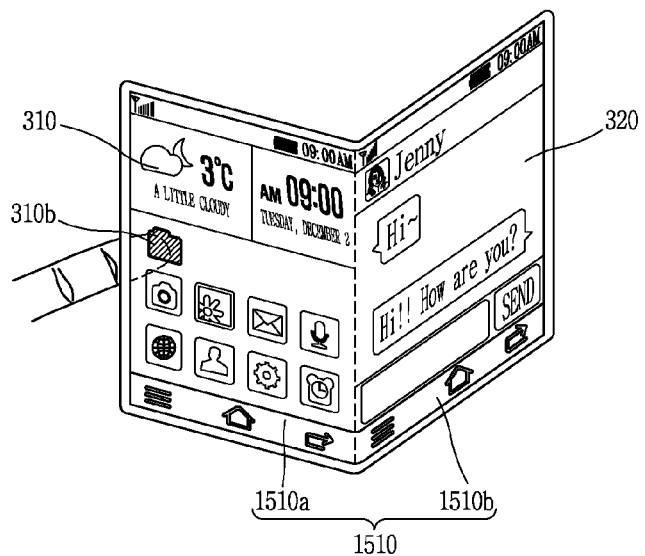
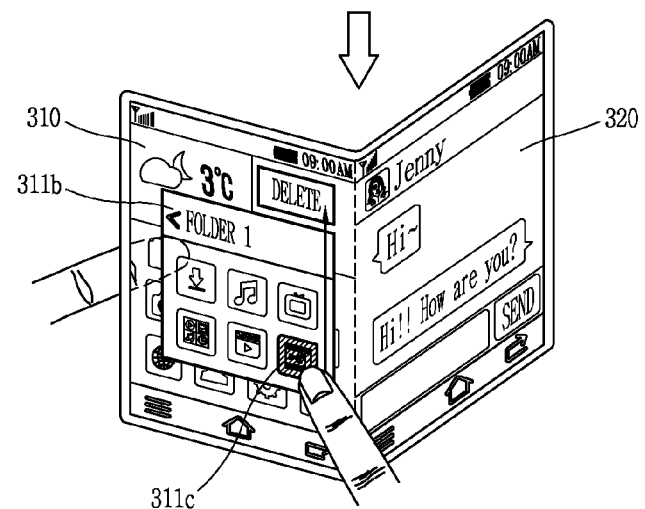
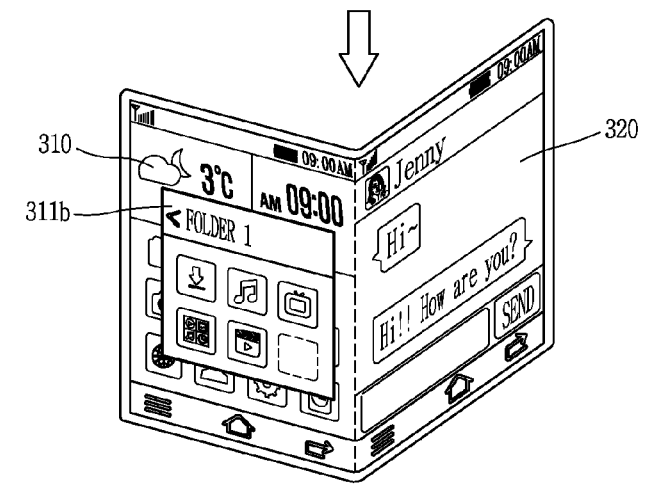

FIG. 10A
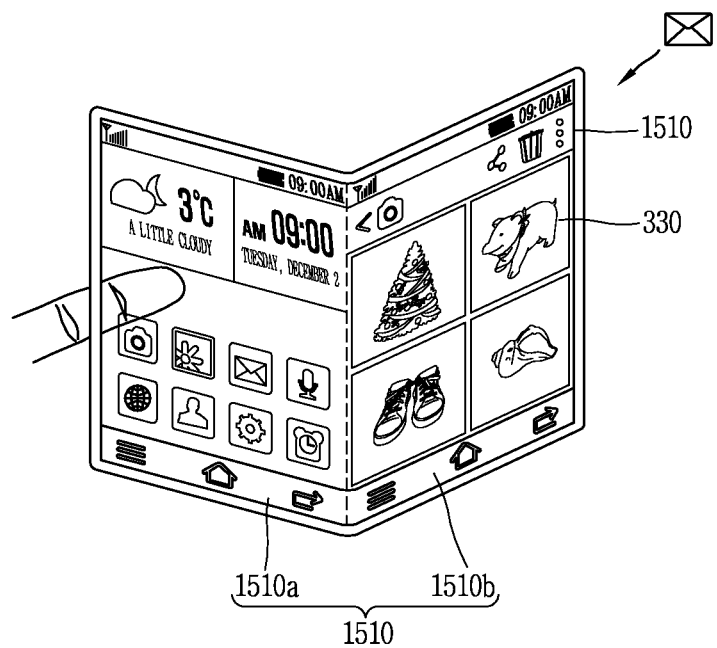
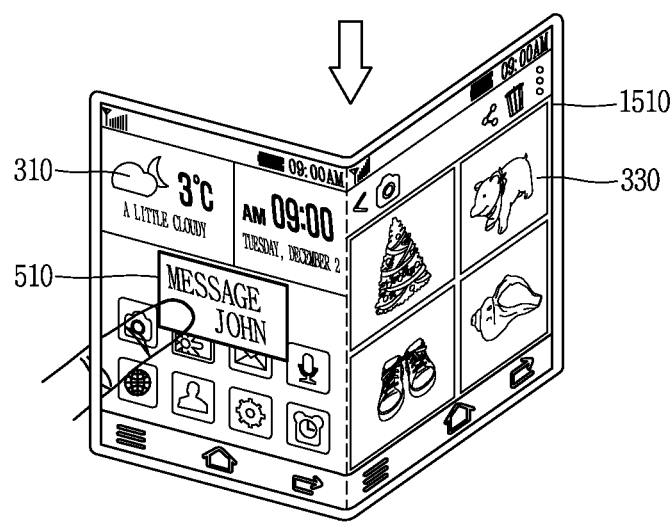

FIG. 10B
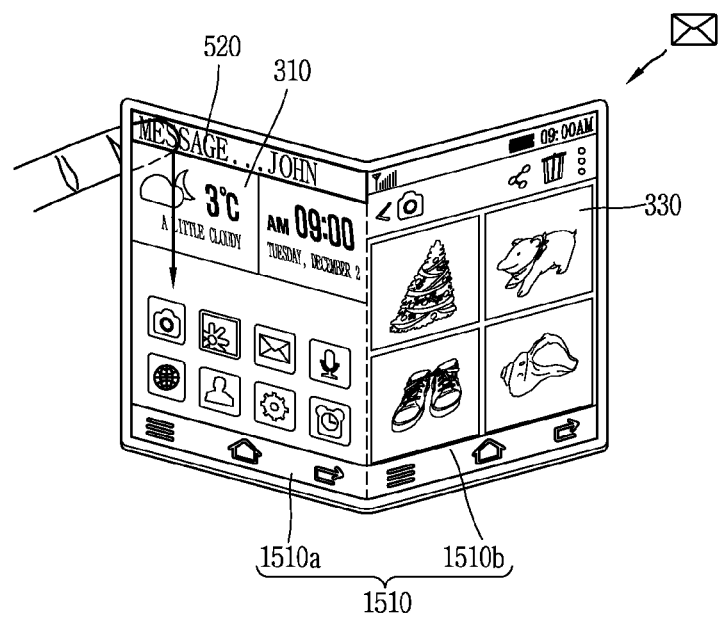
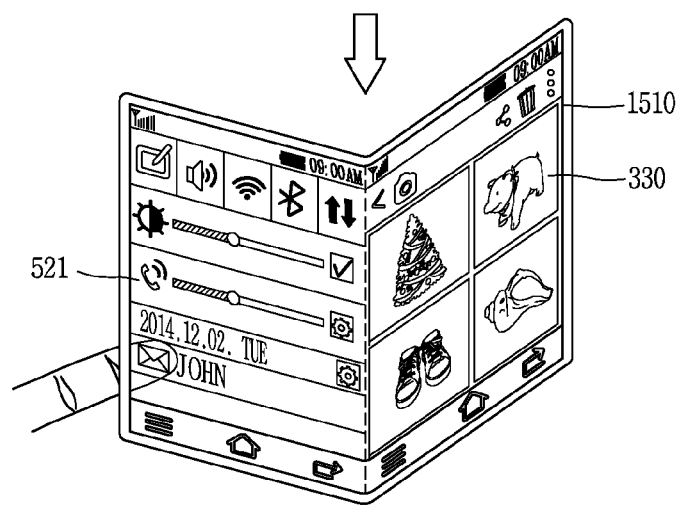

FIG. 10D
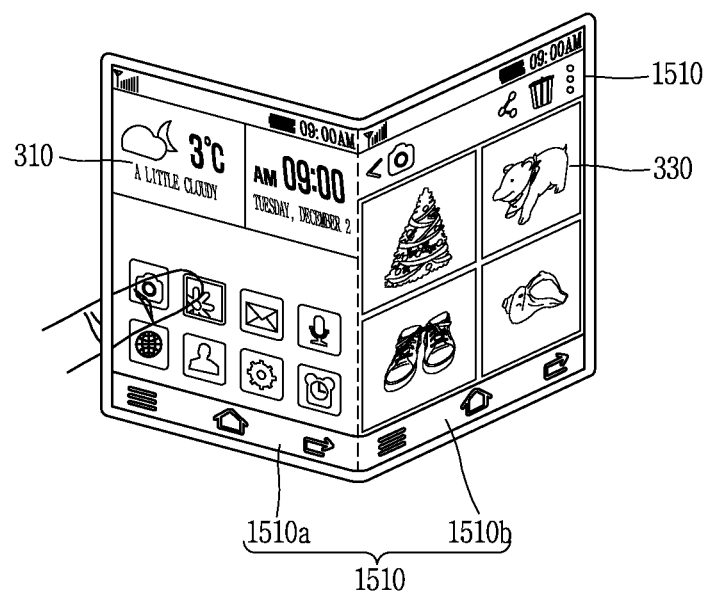
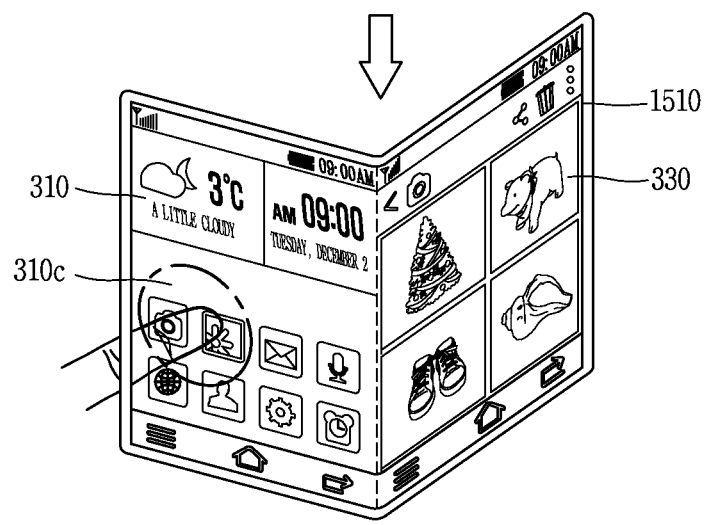

FIG. 11B
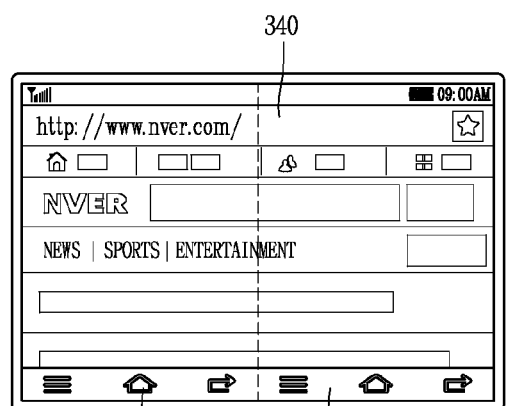
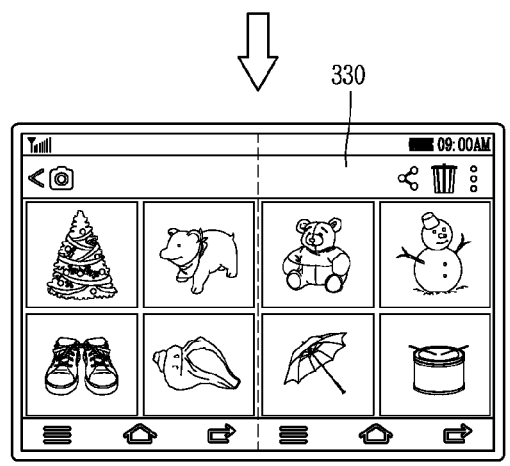
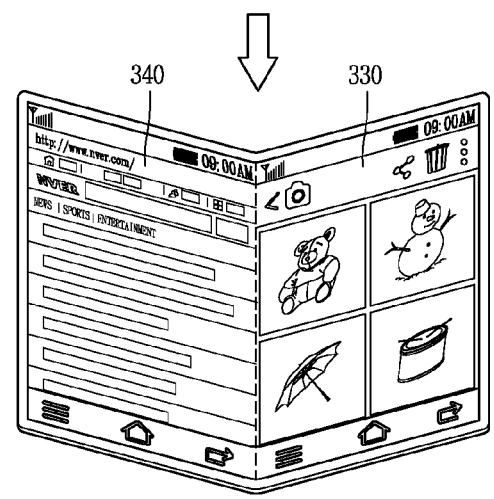

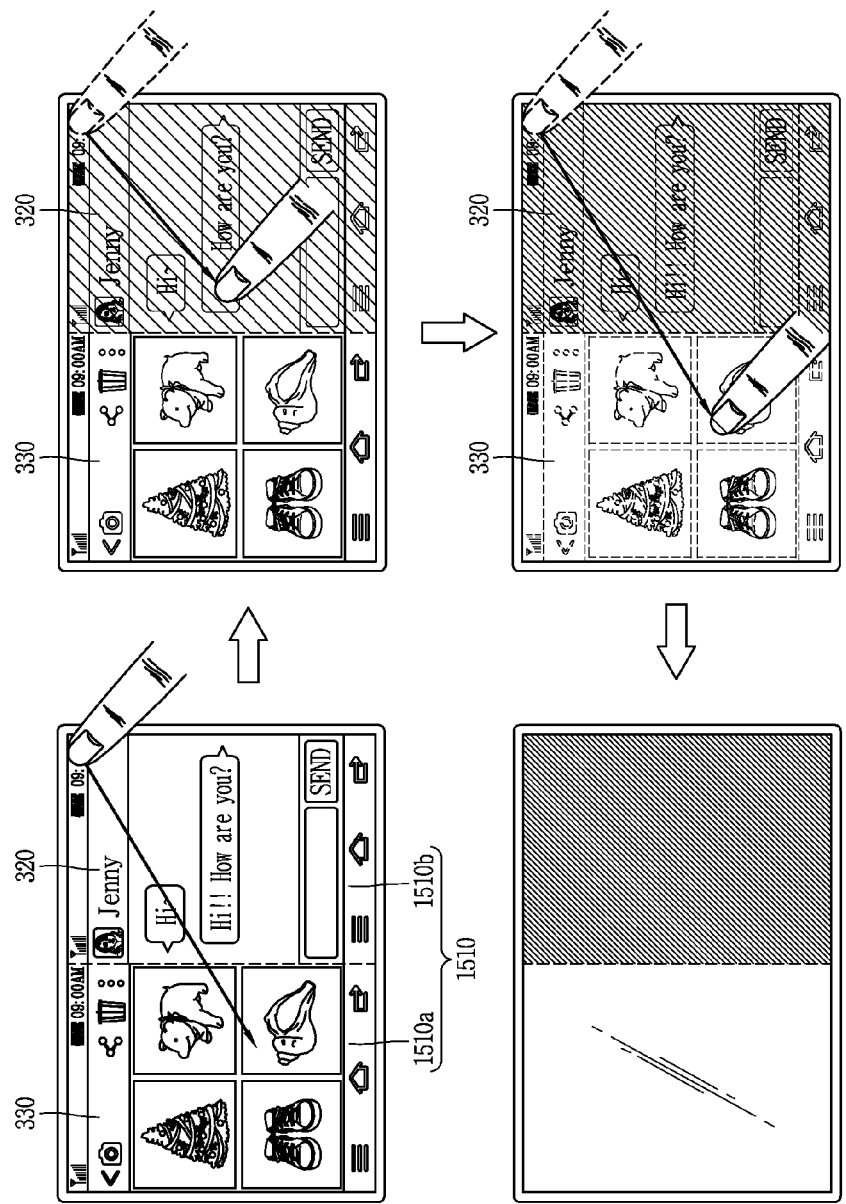

FIG. 15B
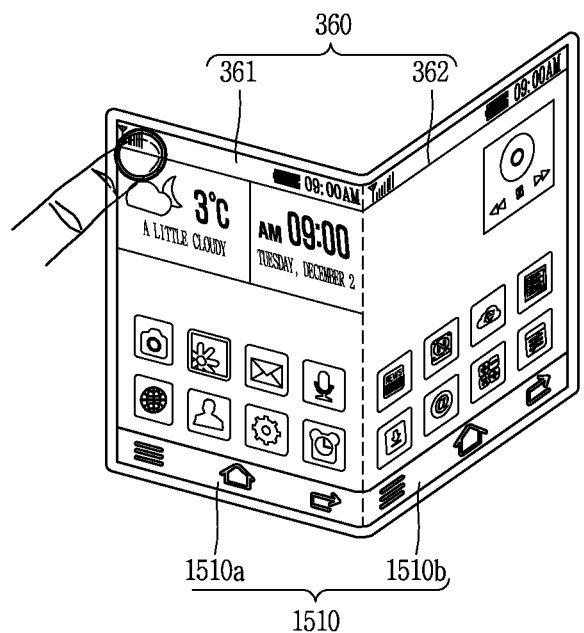
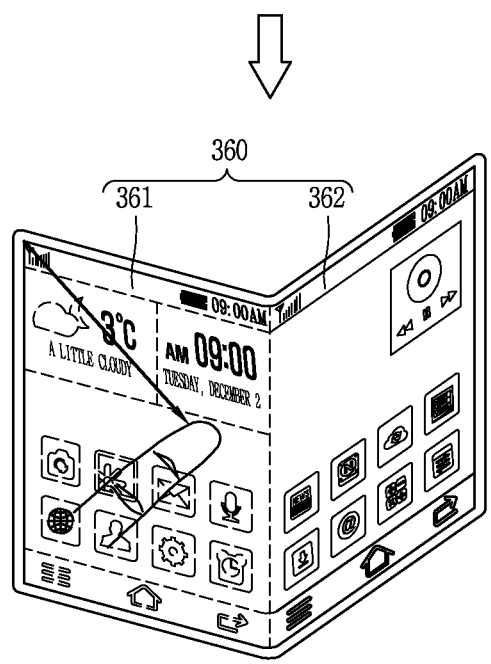

FIG. 18
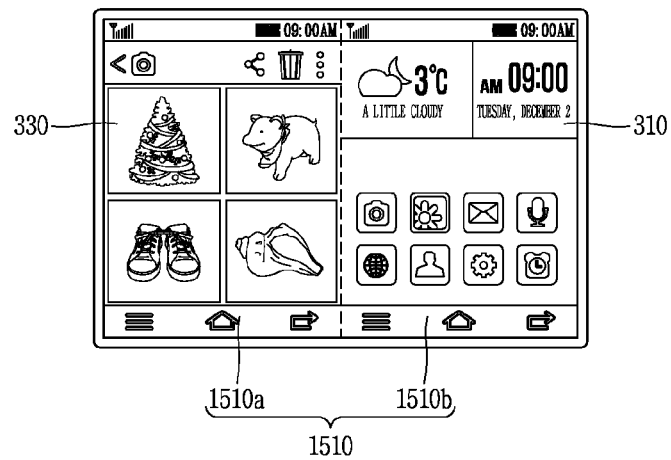
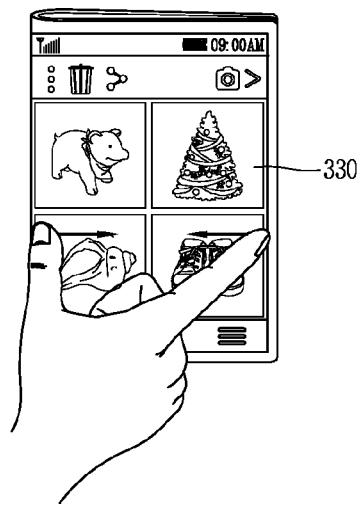
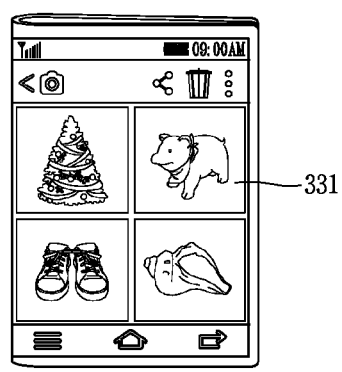

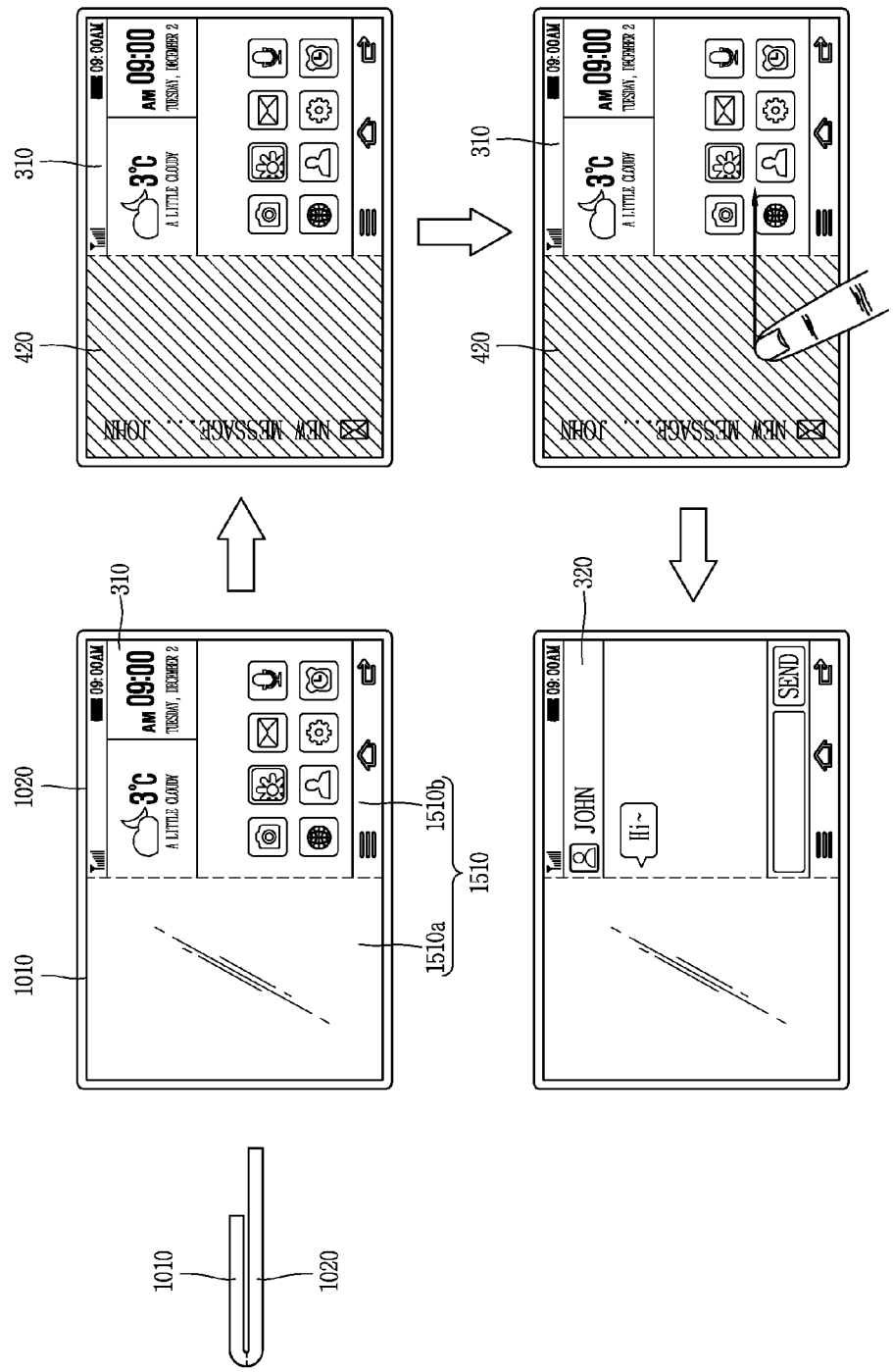

MOBILE TERMINAL

CROSS-REFERENCE TO RELATED APPLICATION

Pursuant to 35 U.S.C. § 119(a), this application claims the benefit of earlier filing date and right of priority to Korean Application No. 10-2014-0184895 and Korean Application No. 10-2014-0192314, filed in Republic of Korea on Dec. 19, 2014 and on Dec. 29, 2014, the contents of which is incorporated by reference herein in its entirety.

BACKGROUND OF THE INVENTION

1. Field of the Invention

This specification relates to a mobile terminal, and more particularly, to a mobile terminal having a flexible display unit which is bendable or foldable partially or wholly.

2. Background of the Invention

A mobile terminal includes all types of devices provided with a battery and a flexible display unit and carried by a user. The devices are configured to output information to the flexible display unit using power supplied from the battery. The mobile terminal includes a device for recording and playing moving images, a device for displaying a graphic user interface (GUI), etc., which includes a notebook, a mobile phone, glasses, a watch, a game console, etc.

Such mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players. More recently, mobile terminals have been configured to receive broadcast and multicast signals which permit viewing of content such as videos and television programs.

Such mobile terminal is being evolved to have various designs. In order to satisfy a user's needs for more novel and various designs, efforts are ongoing to develop the mobile terminal of a newer type. The newer type includes structural changes and improvements to use the mobile terminal more conveniently. One of such structural changes and improvements is a mobile terminal including at least part of a flexible display unit that can be bent or folded.

However, the mobile terminal which is bendable or foldable has the following disadvantages. Firstly, screen information output from a flexible display unit has a degraded quality due to a bendable characteristic of the mobile terminal, or a touch input is applicable only to one surface of the mobile terminal even in a bent state.

In case of a mobile terminal which can be implemented in a folded state and an unfolded state, a user has an inconvenience in stably holding the mobile terminal, at the time of applying a touch input with supporting a transformed state of the mobile terminal. That is, it is inconvenient to apply a touch input to the flexible display unit disposed on one surface of the mobile terminal, with an operation to transform the mobile terminal.

Further, a user has a difficulty in moving his or her hand which is holding the mobile terminal, so as to apply a touch input in a bent state of the mobile terminal.

SUMMARY OF THE INVENTION

Therefore, an aspect of the detailed description is to provide a mobile terminal capable of changing screen information by bending of a flexible display unit, and controlling a receiving region of a touch input.

To achieve these and other advantages and in accordance with the purpose of this specification, as embodied and broadly described herein, there is provided a mobile terminal, including: a body including a first body, a second body, and a connection unit configured to connect the first and second bodies to each other so that an angle between the first and second bodies is changeable, and the body formed so that at least one region thereof is formed of a transmissive region; a transparent flexible display unit mounted to one surface of the body, and configured to output screen information; a sensing unit configured to sense a first state where the flexible display unit is unfolded, and a second state where the first and second bodies are overlapped with each other, by change of the angle; and a controller configured to change transparency of a region corresponding to the transmissive region, based on change of the angle.

In an embodiment of the present invention, the flexible display unit may include a polymer dispersed liquid crystal (PDLC) layer of which transparency is changed by an electric signal.

In an embodiment of the present invention, the mobile terminal may further include a touch sensor formed on another surface of the body corresponding to the transmissive region, the touch sensor activated in a second state where the first and second bodies are overlapped with each other.

Accordingly, a user may be provided with screen information displayed on the first and second bodies in a folded state and an unfolded state, through the transmissive region. The user may control the mobile terminal in the folded state, by activating the touch sensor.

In an embodiment of the present invention, the controller may control the flexible display unit to output a preset image based on change of the angle, and the image may correspond to a home screen page including icons for execution of applications. Thus, an additional icon for opening the home screen page is not required while screen information is being output.

In an embodiment of the present invention, the screen information may be output in a reversed manner, in an overlapped state between the first and second bodies. Transparency of the screen information may be controlled based on a touch input applied to another surface of the body in a folded state. Accordingly, a user may be provided with screen information and apply a touch input for controlling the mobile terminal, not only in an unfolded state, but also in a folded state.

To achieve these and other advantages and in accordance with the purpose of this specification, as embodied and broadly described herein, there is provided a method of controlling the mobile terminal, including: sensing change of an angle between the first and second bodies; changing transparency of one region of the screen information based on the angle change, the one region overlapped with the first body; and activating at least one region of a rear touch sensor disposed on another surface of the body, based on the transparency.

Effects of the Present Invention

In the present invention, transparency of screen information displayed on the transmissive region is increased so that a user's finger can be seen, by change of an angle between the first and second bodies, and a touch input applied to another surface of the body is received, the another surface overlapped with the screen information.

Accordingly, a user can apply a control command while being provided with the screen information, in a state where a folded state of the first and second bodies is supported.

Further, screen information can be checked through the transmissive region even in a folded state of the body, the transmissive region formed on one region of the body so that two surfaces of the flexible display unit can be seen. Accordingly, a user can use the mobile terminal by transforming it into various shapes.

Further, the touch sensor is activated to sense a touch input according to an angle of the body. Accordingly, a user can apply a touch input to another surface of the body, with checking screen information through the transmissive region.

Further, screen information is immediately changed by an operation to fold or unfold the body, without a specific control command. And a user can apply a touch input for controlling the mobile terminal, without changing a position of a hand which performs an operation to fold or unfold the body.

Further, since transparency of the flexible display unit is controlled based on an operation, a user can apply a touch input, like a touch input applied onto the flexible display unit, while seeing screen information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal according to an embodiment of the present invention;

FIGS. 5A and 5B are conceptual views illustrating a driving structure of a connection unit according to the present invention;

FIG. 6A is a flowchart illustrating a method of controlling a mobile terminal according to an embodiment of the present invention;

FIG. 6B is a conceptual view illustrating a method of controlling transparency of an image, based on an angle between a first body and a second body;

FIG. 6C is a conceptual view illustrating a principle to control a polymer dispersed liquid crystal (PDLC) layer for control of transparency;

FIGS. 9A to 9C are conceptual views illustrating a method of controlling a mobile terminal according to various embodiments of the present invention;

FIGS. 10A to 10D are conceptual views illustrating a method of controlling transparency on one region of screen information, based on an angle between a first body and a second body;

FIGS. 11A to 11C are conceptual views illustrating a method of executing a function, based on change of an angle between a first body and a second body;

FIG. 12A(b) is a conceptual view illustrating a method of controlling a flexible display unit based on a two-surface touch input;

FIGS. 13A to 13D are conceptual views illustrating a method of controlling transparency of screen information output to a flexible display unit;

FIGS. 15A to 15C are conceptual views illustrating a control method, based on a touch input sensed by a touch sensor;

FIG. 18 is a conceptual view illustrating a method of outputting reverse image information in a second state;

FIG. 19B(b) is a conceptual view illustrating a mobile terminal including a transparent region on a second body according to another embodiment;

FIG. 19B(c) is a conceptual view illustrating a mobile terminal including a transparent region on a second body according to another embodiment;

FIGS. 22A to 22C are conceptual views illustrating a method of controlling a mobile terminal having bodies of different sizes;

DETAILED DESCRIPTION OF THE INVENTION

Figure 2A:
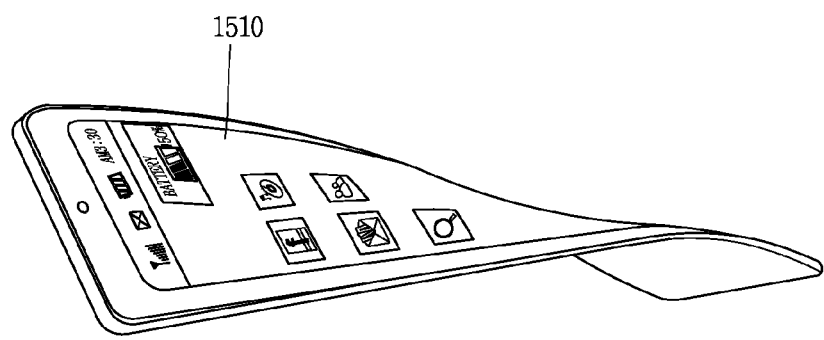
FIGS. 2A and 2B are conceptual views illustrating an example of a mobile terminal according to an embodiment of the present invention, which are viewed from different directions.

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present.

In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A mobile terminal in the present description may include a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

FIG. 1 is a block diagram of a mobile terminal according to an embodiment of the present invention.

The mobile terminal 1000 is shown having components such as a wireless communication unit 1100, an input unit 1200, an electromagnetic wave generation unit 1300, a sensing unit 1400, an output unit 1500, an interface unit 1600, a memory 1700, a controller 1800, and a power supply unit 1900. Implementing all of the illustrated components of FIG. 1 is not a requirement, and greater or fewer components may alternatively be implemented.

The wireless communication unit 1100 typically includes one or more modules which permit communications such as wireless communications between the mobile terminal 1000 and a wireless communication system, communications between the mobile terminal 1000 and another mobile terminal, communications between the mobile terminal 1000 and an external server. Further, the wireless communication unit 1100 typically includes one or more modules which connect the mobile terminal 1000 to one or more networks. To facilitate such communications, the wireless communication unit 1100 includes one or more of a broadcast receiving module 1110, a mobile communication module 1120, a wireless Internet module 1130, a short-range communication module 1140, and a location information module 1150.

The input unit 1200 includes a camera 1210 for obtaining images or video, a microphone 1220, which is one type of audio input device for inputting an audio signal, and a user input unit 1230 (for example, a touch key, a push key, a mechanical key, a soft key, and the like) for allowing a user to input information. Data (for example, audio, video, image, and the like) is obtained by the input unit 120 and may be analyzed and processed by controller 1800 according to device parameters, user commands, and combinations thereof.

The electromagnetic wave generation unit 1300 generates electromagnetic waves having a linear characteristic, as a trigger signal for controlling an external device positioned at a short distance. More specifically, the electromagnetic wave generation unit 1300 generates electromagnetic waves having a specific frequency, under control of the controller 1800. That is, electromagnetic waves generated by the electromagnetic wave generation unit 1300 may have various frequencies under control of the controller 1800. The electromagnetic waves may include various data for controlling an external device. More specifically, the electromagnetic waves may include a request message requesting information related to an external device, or an identifier for security.

The sensing unit 1400 is typically implemented using one or more sensors configured to sense internal information of the mobile terminal, the surrounding environment of the mobile terminal, user information, and the like. For example, in FIG. 1, the sensing unit 1400 is shown having a proximity sensor 1410 and an illumination sensor 1420. If desired, the sensing unit 1400 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 1210), a microphone 1220, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 1000 may be configured to utilize information obtained from sensing unit 1400, and in particular, information obtained from one or more sensors of the sensing unit 1400, and combinations thereof.

The output unit 1500 is typically configured to output various types of information, such as audio, video, tactile output, and the like. The output unit 1500 is shown having a flexible display unit 1510, an audio output module 1520, a haptic module 1530, and an optical output module 1540.

The flexible display unit 1510 may have an inter-layered structure or an integrated structure with a touch sensor in order to facilitate a touch screen. The touch screen may provide an output interface between the mobile terminal 1000 and a user, as well as function as the user input unit 1230 which provides an input interface between the mobile terminal 1000 and the user. The flexible display unit 1510 is generally configured to output information processed in the mobile terminal 1000. For example, the flexible display unit 1510 may display execution screen information of an application program executing at the mobile terminal 1000 or user interface (UI) and graphic user interface (GUI) information in response to the execution screen information.

The flexible display unit 1510 outputs information processed in the mobile terminal 1000. The flexible display unit 1510 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The flexible display unit 1510 may be implemented using two mobile terminals, which can implement the same or different display technology. For instance, a plurality of the flexible display units 1510 may be arranged on one side, either spaced apart from each other, or these devices may be integrated, or these devices may be arranged on different surfaces.

The flexible display unit 1510 may also include a touch sensor which senses a touch input received at the flexible display unit 1510. When a touch is input to the flexible display unit 1510, the touch sensor may be configured to sense this touch and the controller 1800, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 1510*a* and a display on a rear surface of the window 1510*a*, or a metal wire which is patterned directly on the rear surface of the window 1510*a*. Alternatively, the touch sensor may be integrally formed with the display. For example, the touch sensor may be disposed on a substrate of the display or within the display. The flexible display unit 1510 may also form a touch screen together with the touch sensor. Here, the touch screen may serve as the user input unit 1230 (see FIG. 1). Therefore, the touch screen may replace at least some of the functions of the first manipulation unit 1230*a*.

The interface unit 1600 serves as an interface with various types of external devices that can be coupled to the mobile terminal 1000. The interface unit 1600, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 1600.

The memory 1700 is typically implemented to store data to support various functions or features of the mobile terminal 1000. For instance, the memory 1700 may be configured to store application programs executed in the mobile terminal 1000, data or instructions for operations of the mobile terminal 1000, and the like. Some of these application programs may be downloaded from an external server via wireless communication. Other application programs may be installed within the mobile terminal 1000 at time of manufacturing or shipping, which is typically the case for basic functions of the mobile terminal 1000 (for example, receiving a call, placing a call, receiving a message, sending a message, and the like). It is common for application programs to be stored in the memory 1700, installed in the mobile terminal 1000, and executed by the controller 1800 to perform an operation (or function) for the mobile terminal 1000.

The controller 1800 typically functions to control overall operation of the mobile terminal 1000, in addition to the operations associated with the application programs. The controller 1800 can provide or process information or functions appropriate for a user by processing signals, data, information and the like, which are input or output by the various components depicted in FIG. 1, or activating application programs stored in the memory 1700. As one example, the controller 1800 controls some or all of the components illustrated in FIG. 1 according to the execution of an application program that have been stored in the memory 1700.

The power supply unit 1900 can be configured to receive external power or provide internal power in order to supply appropriate power required for operating elements and components included in the mobile terminal 1000. The power supply unit 1900 may include a battery, and the battery may be configured to be embedded in the body of the mobile terminal, or configured to be detachable from the body of the mobile terminal.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 1700.

Referring still to FIG. 1, various components depicted in this figure will now be described in more detail. Regarding the wireless communication unit 1100, the broadcast receiving module 1110 is typically configured to receive a broadcast signal and/or broadcast associated information from an external broadcast managing entity via a broadcast channel. The broadcast channel may include a satellite channel, a terremainingrial channel, or both. In some embodiments, two or more broadcast receiving modules 1110 may be utilized to facilitate simultaneously receiving of two or more broadcast channels, or to support switching among broadcast channels.

The mobile communication module 1120 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Code Division Multi Access 1000 (CDMA 1000), Enhanced Voice-Date Optimized or Enhanced Voice-Data Only (EV-DO), Wideband CDMA (WCDMA), High Speed Downlink Packet access (HSDPA), High Speed Uplink Packet access (HSUPA), Long Term Evolution (LTE), Long Term Evolution-Advanced (LTE-A), and the like).

Examples of wireless signals transmitted and/or received via the mobile communication module 1120 include audio call signals, video (telephony) call signals, or various formats of data to support communication of text and multimedia messages.

The wireless Internet module 1130 is configured to facilitate wireless Internet access. This module may be internally or externally coupled to the mobile terminal 1000. The wireless Internet module 1130 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 1130 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A, and the like, as part of a mobile communication network, the wireless Internet module 1130 performs such wireless Internet access. As such, the Internet module 1130 may cooperate with, or function as, the mobile communication module 1120.

The short-range communication module 1140 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 1140 in general supports wireless communications between the mobile terminal 1000 and a wireless communication system, communications between the mobile terminal 1000 and another mobile terminal 1000, or communications between the mobile terminal and a network where another mobile terminal 1000 (or an external server) is located, via wireless area networks. One example of the wireless area networks is a wireless personal area networks.

In some embodiments, another mobile terminal (which may be configured similarly to mobile terminal 1000) may be a wearable device, for example, a smart watch, a smart glass or a head mounted display (HMD), which can exchange data with the mobile terminal 1000 (or otherwise cooperate with the mobile terminal 1000). The short-range communication module 1140 may sense or recognize the wearable device, and permit communication between the wearable device and the mobile terminal 1000. In addition, when the sensed wearable device is a device which is authenticated to communicate with the mobile terminal 1000, the controller 1800, for example, may cause transmission of data processed in the mobile terminal 1000 to the wearable device via the short-range communication module 1140. Hence, a user of the wearable device may use the data processed in the mobile terminal 1000 on the wearable device. For example, when a call is received in the mobile terminal 1000, the user may answer the call using the wearable device. Also, when a message is received in the mobile terminal 1000, the user can check the received message using the wearable device.

The location information module 1150 is generally configured to detect, calculate, derive or otherwise identify a position of the mobile terminal. As an example, the location information module 1150 includes a Global Position System (GPS) module, a Wi-Fi module, or both. If desired, the location information module 1150 may alternatively or additionally function with any of the other modules of the wireless communication unit 1100 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 1200 may be configured to permit various types of input to the mobile terminal 1200. Examples of such input include audio, image, video, data, and user input. Image and video input is often obtained using one or more cameras 1210. Such cameras 1210 may process image frames of still pictures or video obtained by image sensors in a video or image capture mode. The processed image frames can be displayed on the flexible display unit 1510 or stored in memory 1700. In some cases, the cameras 1210 may be arranged in a matrix configuration to permit a plurality of images having various angles or focal points to be input to the mobile terminal 1000. As another example, the cameras 1210 may be located in a stereoscopic arrangement to acquire left and right images for implementing a stereoscopic image.

The microphone 1220 is generally implemented to permit audio input to the mobile terminal 1000. The audio input can be processed in various manners according to a function being executed in the mobile terminal 1000. If desired, the microphone 1220 may include assorted noise removing algorithms to remove unwanted noise generated in the course of receiving the external audio.

The user input unit 1230 is a component that permits input by a user. Such user input may enable the controller 1800 to control operation of the mobile terminal 1000. The user input unit 1230 may include one or more of a mechanical input element (for example, a key, a button located on a front and/or rear surface or a side surface of the mobile terminal 1000, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 1400 is generally configured to sense one or more of internal information of the mobile terminal, surrounding environment information of the mobile terminal, user information, or the like. The controller 1800 generally cooperates with the sending unit 1400 to control operation of the mobile terminal 1000 or execute data processing, a function or an operation associated with an application program installed in the mobile terminal based on the sensing provided by the sensing unit 1400. The sensing unit 1400 may be implemented using any of a variety of sensors, some of which will now be described in more detail.

The proximity sensor 1410 may include a sensor to sense presence or absence of an object approaching a surface, or an object located near a surface, by using an electromagnetic field, infrared rays, or the like without a mechanical contact. The proximity sensor 1410 may be arranged at an inner region of the mobile terminal covered by the touch screen, or near the touch screen.

The proximity sensor 1410, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 1410 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 1410 may sense proximity touch, and proximity touch patterns (for example, distance, direction, speed, time, position, moving status, and the like). In general, the controller 1800 processes data corresponding to proximity touches and proximity touch patterns sensed by the proximity sensor 1410, and cause output of visual information on the touch screen. In addition, the controller 1800 can control the mobile terminal 1000 to execute different operations or process different data according to whether a touch with respect to a point on the touch screen is either a proximity touch or a contact touch.

A touch sensor can sense a touch applied to the touch screen, such as flexible display unit 1510, using any of a variety of touch methods. Examples of such touch methods include a resistive type, a capacitive type, an infrared type, and a magnetic field type, among others.

As one example, the touch sensor may be configured to convert changes of pressure applied to a specific part of the flexible display unit 1510, or convert capacitance occurring at a specific part of the flexible display unit 1510, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 1800. Accordingly, the controller 1800 can sense which region of the flexible display unit 1510 has been touched. Here, the touch controller may be a component separate from the controller 1800, the controller 1800, and combinations thereof.

In some embodiments, the controller 1800 can execute the same or different controls according to a type of touch object that touches the touch screen or a touch key provided in addition to the touch screen. Whether to execute the same or different control according to the object which provides a touch input may be decided based on a current operating state of the mobile terminal 1000 or a currently executed application program, for example.

The touch sensor may be configured to sense a touch input using a different method, in an activated or deactivated state of the flexible display unit 1510. The different method may be related to an activation period of the touch sensor. More specifically, the touch sensor may be activated at a different period according to whether the flexible display unit 1510 has been activated or not. That is, the touch sensor may have a different activation period according to whether the flexible display unit 1510 has been activated or not, and may sense a touch input applied thereto.

For instance, in a deactivated state of the flexible display unit 1510, the touch sensor may be activated with a preset period. In this instance, the preset period may be a time period more than 0. Further, in an activated state of the flexible display unit 1510, the touch sensor may be always operated in an activated state. In this instance, an activation period of the touch sensor may be '0' or a value very close to '0'.

Whether the touch sensor is in an activated state or a deactivated state may be determined based on a power consumption amount of the touch sensor. For instance, if a power consumption amount of the touch sensor is equal to or less than a preset value based on '0', it may be determined that the touch sensor is in a deactivated state. Further, if a power consumption amount of the touch sensor exceeds the preset value based on '0', it may be determined that the touch sensor is in an activated state.

If the flexible display unit 1510 is in an activated state (hereinafter, will be referred to as an active mode), the touch sensor may wait for input of taps onto the flexible display unit 1510, while maintaining an activated state. Further, if the flexible display unit 1510 is in a deactivated state (hereinafter, will be referred to as a doze mode), the touch sensor may be activated at preset periods.

When the preset period of the touch sensor is shorter, a sensing speed with respect to taps applied onto the flexible display unit 1510 is higher. However, in this instance, a power consumption amount of the touch sensor may be increased. Further, when the preset period of the touch sensor is longer, a sensing speed with respect to taps applied onto the flexible display unit 1510 may be lower, while a power consumption amount of the touch sensor is decreased.

Thus, the preset period may be set so that a sensing speed with respect to taps applied onto the flexible display unit 1510 is high enough not to be recognized by a user, and so that power consumption can be reduced. For instance, the preset period may be set so that the touch sensor in a deactivated state can be activated about 20 times (1 Hz) per second.

While the flexible display unit 1510 is in an activated state, the touch sensor may be also in an activated state. In an activated state, the touch sensor may have an activation period (T) of '0' or a value very close to '0'. Alternatively, in an activated state, the touch sensor may have an activation period (T) much shorter than that set in a deactivated state of the flexible display unit 1510, by several times. That is, the touch sensor may be activated with a different period, according to whether the flexible display unit 1510 is in an activated state or a deactivated state.

In a doze mode where the flexible display unit 1510 is in a deactivated state and the touch sensor is periodically activated, if a preset touch input (e.g., a first touch input and a second touch input consecutively knocking-on a predetermined region within a predetermined time) is sensed by the touch sensor, the controller 1800 can convert the doze mode into an activate mode where the flexible display unit and the touch sensor are activated.

The touch sensor may be driven at a different period based on a state of the flexible display unit 1510. For instance, when the flexible display unit 1510 is in a closed state, a doze mode may be executed. Further, when a closed state is converted into an open state, an active mode may be executed. The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 1800, for example, may calculate a position of a wave generation source based on information sensed by an illumination sensor 1420 and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 1210 typically includes at least one a camera sensor (CCD, CMOS etc.), a photo sensor (or image sensors), and a laser sensor. Implementing the camera 1210 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The camera 1210 is provided with at least one of a first camera 1210a formed on a front surface of the body, and a second camera 1210b formed on a rear surface of the body.

The first camera 1210a is configured to process an image frame of still images or moving images acquired by an image sensor in a capturing mode or a video call mode. The processed image frame may be displayed on the flexible display unit 1510, and may be stored in the memory 1700.

The second camera 1210b may include a plurality of lenses arranged along at least one line. Such lenses may be arranged in the form of matrices. Such camera may be referred to as an 'array camera'. If the second camera 1210b is configured as an array camera, images can be captured in various manners by using a plurality of lenses, and images of better quality can be obtained.

A flash may be additionally disposed close to the second camera 1210b. The flash illuminates light toward an object when capturing the object with the second camera 1210b.

The electromagnetic wave generation unit 1300 may be disposed close to the second camera 1210b. When the second camera 1210b is activated, the electromagnetic wave generation unit emits generated electromagnetic waves.

The flexible display unit 1510 is generally configured to output information processed in the mobile terminal 1000. For example, the flexible display unit 1510 may display execution screen information of an application program executing at the mobile terminal 1000 or user interface (UI) and graphic user interface (GUI) information in response to the execution screen information.

In some embodiments, the flexible display unit 1510 may be implemented as a stereoscopic flexible display unit for displaying stereoscopic images. A typical stereoscopic flexible display unit may employ a stereoscopic display scheme such as a stereoscopic scheme (a glass scheme), an auto-stereoscopic scheme (glassless scheme), a projection scheme (holographic scheme), or the like.

The audio output module 1520 is generally configured to output audio data. Such audio data may be obtained from any of a number of different sources such that the audio data may be received from the wireless communication unit 1100 or may have been stored in the memory 1700. The audio data may be output during modes such as a signal reception mode, a call mode, a record mode, a voice recognition mode, a broadcast reception mode, and the like. The audio output module 1520 can provide audible output related to a particular function (e.g., a call signal reception sound, a message reception sound, etc.) performed by the mobile terminal 1000. The audio output module 1520 may also be implemented as a receiver, a speaker, a buzzer, or the like.

The audio output module 1520 includes at least one of a first audio output module 1520a and a second audio output module 1520b. The first audio output module 1520a may be implemented in the form of a receiver, and the second audio output module 1520b may be implemented in the form of a loud speaker to output voice audio, alarm sounds, multimedia audio reproduction, and the like.

A haptic module 1530 can be configured to generate various tactile effects that a user feels, perceive, or otherwise experience. A typical example of a tactile effect generated by the haptic module 1530 is vibration. The strength, pattern and the like of the vibration generated by the haptic module 1530 can be controlled by user selection or setting by the controller. For example, the haptic module 1530 may output different vibrations in a combining manner or a sequential manner.

Besides vibration, the haptic module 1530 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 1530 can also be implemented to allow the user to feel a tactile effect through a muscle sensation such as the user's fingers or arm, as well as transferring the tactile effect through direct contact. Two or more haptic modules 1530 may be provided according to the particular configuration of the mobile terminal 1000.

An optical output module 1540 can output a signal for indicating an event generation using light of a light source. Examples of events generated in the mobile terminal 1000 may include success or failure of a user authentication, message reception, call signal reception, a missed call, an alarm, a schedule notice, an email reception, information reception through an application, and the like. Upon detection of a user's event check, the controller 1800 can control the optical output unit 1540 so that output of light can be terminated.

A signal output by the optical output module 1540 may be implemented so the mobile terminal emits monochromatic light or light with a plurality of colors. The signal output may be terminated as the mobile terminal senses that a user has checked the generated event, for example.

The interface unit 1600 serves as an interface for external devices to be connected with the mobile terminal 1000. For example, the interface unit 1600 can receive data transmitted from an external device, receive power to transfer to elements and components within the mobile terminal 1000, or transmit internal data of the mobile terminal 1000 to such external device. The interface unit 1600 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 1000 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 1000 via the interface unit 1600.

When the mobile terminal 1000 is connected with an external cradle, the interface unit 1600 can serve as a passage to allow power from the cradle to be supplied to the mobile terminal 1000 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 1700 can store programs to support operations of the controller 1800 and store input/output data (for example, phonebook, messages, still images, videos, etc.). The memory 1700 may store data related to various patterns of vibrations and audio which are output in response to touch inputs on the touch screen.

The memory 1700 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 1000 may also be operated in relation to a network storage device that performs the storage function of the memory 1700 over a network, such as the Internet.

The controller 1800 can typically control the general operations of the mobile terminal 1000. For example, the controller 1800 can set or release a lock state for remaingricting a user from inputting a control command with respect to applications when a status of the mobile terminal meets a preset condition.

The controller 1800 can also perform the controlling and processing associated with voice calls, data communications, video calls, and the like, or perform pattern recognition processing to recognize a handwriting input or a picture drawing input performed on the touch screen as characters or images, respectively. In addition, the controller 1800 can control one or a combination of those components in order to implement various embodiments disclosed herein.

The power supply unit 1900 receives external power or provide internal power and supply the appropriate power required for operating respective elements and components included in the mobile terminal 1000. The power supply unit 1900 may include a battery, which is typically rechargeable or be detachably coupled to the body of the mobile terminal for charging.

The power supply unit 1900 may include a connection port. The connection port may be configured as one example of the interface unit 1600 to which an external charger for supplying power to recharge the battery is electrically connected. As another example, the power supply unit 1900 may be configured to recharge the battery in a wireless manner without use of the connection port. In this example, the power supply unit 1900 can receive power, transferred from an external wireless power transmitter, using at least one of an inductive coupling method which is based on magnetic induction or a magnetic resonance coupling method which is based on electromagnetic resonance.

An accessory for protecting an appearance or assisting or extending the functions of the mobile terminal 1000 can also be provided on the mobile terminal 1000. As one example of an accessory, a cover or pouch for covering or accommodating at least one surface of the mobile terminal 1000 may be provided. The cover or pouch may cooperate with the flexible display unit 1510 to extend the function of the mobile terminal 1000. Another example of the accessory is a touch pen for assisting or extending a touch input to a touch screen.

Various embodiments described herein may be implemented in a computer-readable medium, a machine-readable medium, or similar medium using, for example, software, hardware, or any combination thereof.

Figure 2B:
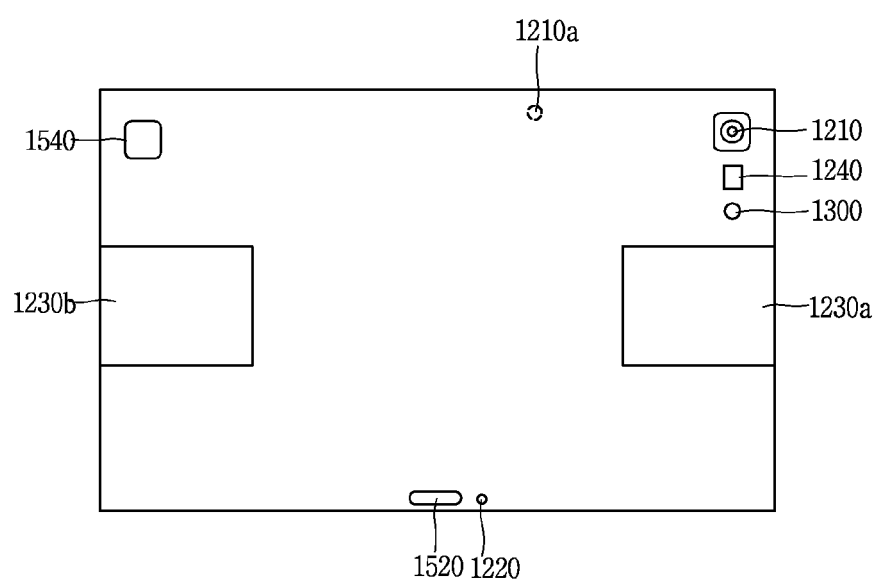

Referring now to FIGS. 2A and 2B, the mobile terminal 1000 is described with reference to a bar-type the body of the mobile terminal. However, the mobile terminal 1000 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The body of the mobile terminal may be understood to indicate the mobile terminal 1000 by regarding the mobile terminal 1000 as at least one assembly. The mobile terminal 1000 will generally include a case (for example, frame, housing, cover, and the like) forming the appearance of the terminal. In this embodiment, the case is formed using a front case and a rear case. Various electronic components are incorporated into a space formed between the front case and the rear case. At least one middle case may be additionally positioned between the front case and the rear case.

The case may be configured to be transformable together with the flexible display unit 1510 by an external force, taking into account characteristics of the flexible display unit 1510. That is, the flexible display unit 1510 is formed to be bendable or foldable together with the case. For instance, the case may be formed of a transformable material such as plastic, thin glass, fiber, thin metal (e.g., aluminum, etc.), textile and silicon, or a combination thereof.

The case may be partially formed of a dielectric material or a low conductive material, and at least part of a structure of the case may be formed of metal. The flexible display unit 1510 may be disposed on a front surface of the body of the mobile terminal to output information. As shown, the flexible display unit 1510 may be mounted to the case to form the front surface of the body.

In some embodiments, electronic components may also be mounted to the rear case. Examples of such electronic components include a detachable battery, an identification module, a memory card, and the like. A rear cover is shown covering the electronic components, and this cover may be detachably coupled to the rear case. Therefore, when the rear cover is detached from the rear case, the electronic components mounted to the rear case are externally exposed. In some embodiments, the rear cover may include an opening for externally exposing a camera 1210 or an audio output unit 1520.

As an alternative to the example in which the plurality of cases form an inner space for accommodating components, the mobile terminal 1000 may be configured such that one case forms the inner space. In this example, a mobile terminal 1000 having a uni-body is formed so synthetic resin or metal extends from a side surface to a rear surface.

If desired, the mobile terminal 1000 may include a waterproofing unit for preventing introduction of water into the body of the mobile terminal. For example, the waterproofing unit may include a waterproofing member which is located between a window and the front case, between the front case and the rear case, or between the rear case and the rear cover, to hermetically seal an inner space when those cases are coupled.

The flexible display unit 1510, the audio output unit 1520, the optical output unit 1540, the camera 1210, the microphone 1220, etc. may be provided at the mobile terminal 100.

As shown in FIGS. 2A and 2B, the flexible display unit 1510 is arranged on a front surface of the body of the mobile terminal 1000, and the camera 1210, the audio output unit 1520, the microphone 1220, the rear input units 1230*a* and 1230*b*, and the optical output unit 1540 are arranged on a rear surface of the body of the mobile terminal 1000. However, alternative arrangements are possible and within the teachings of the instant invention. Some components may be omitted or rearranged.

As shown in FIG. 2A, the flexible display unit 1510 may be arranged on a front surface of the mobile terminal 1000. The flexible display unit 1510 is configured to output information processed in the mobile terminal 1000. For instance, the flexible display unit 1510 may display execution screen information of an application program executing at the mobile terminal 1000 or user interface (UI) and graphic user interface (GUI) information in response to the execution screen information.

The flexible display unit 1510 is configured to be deformable by an external force. This deformation may include any of curving, bending, folding, twisting, rolling, and combinations thereof. The deformable flexible display unit 1510 may also be referred to as a 'flexible display unit' or 'bendable flexible display unit'. In some implementations, the flexible display unit 1510 may include a general flexible display, electronic paper (also known as e-paper), and combinations thereof. That is, the flexible display unit 1510 means a flexible display unit of which at least part is foldable in a flexible manner.

The flexible display is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 1510 is not deformed (for example, in a state with an infinite radius of curvature), a display region of the flexible display unit 1510 includes a generally flat surface. When the flexible display unit 1510 is deformed from the first state by an external force (for example, a state with a finite radius of curvature), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 1510 may be a curved state (for example, a state of being curved from up to down or from right to left), instead of being in flat state. In this embodiment, when an external force is applied to the flexible display unit 1510, the flexible display unit 1510 may transition to the second state such that the flexible display unit is deformed into the flat state (or a less curved state) or into a more curved state.

The flexible display unit 1510 may be formed of material of a plurality of layers. If desired, the flexible display unit 1510 may implement a flexible touch screen using a touch sensor in combination with the display. When a touch is received at the flexible touch screen, the controller 1800 can execute certain control corresponding to the touch input. In general, the flexible touch screen is configured to sense touch and other input while in both the first and second states. The touch sensor may be arranged on a substrate of the display, or may be provided in the display.

The flexible display unit 1510 may form a touch screen together with a touch sensor. In this instance, the touch screen may serve as the user input unit 1230 (refer to FIG. 1). A cause to generate a state conversion of the flexible display unit 1510 is not limited to an external force. For instance, when the flexible display unit 1510 is in a first state, the flexible display unit 1510 may be deformed to a second state by a user's command or application command. More specifically, the mobile terminal 1000 may include a driving unit. If the current condition corresponds to a preset condition, the first state may be changed into the second state by the driving unit, not by an external force.

One option is to configure the mobile terminal 1000 according to an embodiment of the present invention to include a deformation sensor which senses the deforming of the flexible display unit 1510. The deformation sensor may be included in the sensing unit 1400 (refer to FIG. 1).

The deformation sensor may be located in the flexible display unit 1510 or the case to sense information related to the deforming of the flexible display unit 1510. Examples of such information related to the deforming of the flexible display unit 1510 may be a deformed direction, a deformed degree, a deformed position, a deformed amount of time, an acceleration that the deformed flexible display unit 1510 is remainingored, and the like. Alternatively, such information may include various information sensible by bending of the flexible display unit 1510.

In some embodiments, the controller 1800 or other component can change information displayed on the flexible display unit 1510, or generate a control signal for controlling a function of the mobile terminal 1000, based on the information related to the deforming of the flexible display unit 1510.

For instance, if the flexible display unit 1510 is bent in correspondence to an external force, the controller 1800 can rearrange, separate, synthesize or change a curvature of a screen image which has been displayed on the flexible display unit 1510, according to a bent direction of the flexible display unit, a bent degree, and a remainingoration acceleration. More specifically, if the flexible display unit 1510 is inward bent by an external force, the controller 1800 can control screen images displayed on the flexible display unit, to be adjacent to each other. Further, if the flexible display unit 1510 is outward bent by an external force, the controller 1800 can control screen images displayed on the flexible display unit, to be distant from each other.

As shown in FIG. 2B, as another example of the user input unit 1230, one rear input unit or a plurality of rear input units 1230a and 1230b may be located on the rear surface of the case of the mobile terminal. The rear input units 1230a and 1230b can be manipulated by a user to provide input to the mobile terminal 1000. The input may be used in a variety of different ways. For example, the rear input unit may be used by the user to provide an input for power on/off, start, end, scroll, control volume level being output from the audio output unit 1520, switch to a touch recognition mode of the flexible display unit 1510, and the like. The rear input unit may be configured to permit a touch input, a push input, or combinations thereof.

The rear input units 1230a and 1230b may be located to overlap the flexible display unit 1510 of the front side in a thickness direction of the body of the mobile terminal. As one example, the rear input units 1230a and 1230b may be located on a rear surface of the mobile terminal 1000 in a flat state of the case. However, when the case is bent so that a left end and a right end thereof can face each other, the rear input units 1230a and 1230b may be located on a front surface of the mobile terminal 1000. However, the present invention is not limited to this. That is, a position and the number of the rear input units may be variable.

As a further alternative, the mobile terminal 1000 may include a finger scan sensor which scans a user's fingerprint. The controller 1800 can then use fingerprint information sensed by the finger scan sensor as part of an authentication procedure. The finger scan sensor may also be installed in the flexible display unit 1510 or implemented in the user input units 1230a and 1230b. The microphone 1220 is shown located at an end of the mobile terminal 1000, but other locations are possible. If desired, multiple microphones may be implemented, with such an arrangement permitting the receiving of stereo sounds.

The second camera 1210b is shown located at the rear side of the body of the mobile terminal. When the first camera 1210a is arranged on a front surface of the body, the second camera 1210b has an image capturing direction that is substantially opposite to the image capturing direction of the first camera unit 1210a.

The first camera 1210a may be arranged at an opening formed at part of the flexible display unit 1510. Alternatively, the first camera 1210a may be arranged at an opening formed at part of the case disposed on a front surface. The second camera 1210b is configured to process an image frame of still images or moving images acquired by an image sensor in a capturing mode or a video call mode. The processed image frame may be displayed on the flexible display unit 1510, and may be stored in the memory 1700.

The second camera 1210b can include a plurality of lenses arranged along at least one line. The plurality of lenses may also be arranged in a matrix configuration. The cameras may be referred to as an "array camera." When the second camera 1210b is implemented as an array camera, images may be captured in various manners using the plurality of lenses and images with better qualities. A flash 1240 is shown adjacent to the second camera 1210b. When an image of a subject is captured with the second camera 1210b, the flash 1240 may illuminate the subject.

An electromagnetic wave generation unit 1300 may be disposed close to the second camera 1210b. When the second camera 1210b is activated, the electromagnetic wave generation unit 1300 emits generated electromagnetic waves.

At least one antenna for wireless communication may be located on the body of the mobile terminal. The antenna may be installed in the body of the mobile terminal or formed by the case. For example, an antenna which configures a part of the broadcast receiving module 1110 (refer to FIG. 1) may be retractable into the body of the mobile terminal. Alternatively, an antenna may be formed using a film attached to an inner surface of the rear cover, or a case that includes a conductive material.

A battery located in the mobile terminal 1000 may also be deformable in cooperation with the flexible display unit 1510, taking into account the characteristic of the flexible display unit 1510. One technique to implement such a battery is to use a stack and folding method of stacking battery cells.

Further, the interface unit 1600 may be disposed on a side surface of the body of the mobile terminal. The interface unit 1600 may serve as a path allowing the mobile terminal 1000 to interface with external devices. For example, the interface unit 1600 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 1000. The interface unit 1600 may be implemented in the form of a socket for accommodating an external card, such as Subscriber Identification Module (SIM), User Identity Module (UIM), or a memory card for information storage.

A battery may receive power via a power source cable connected to the interface unit 1600. Also, the battery can be recharged in a wireless manner using a wireless charger. Wireless charging may be implemented by magnetic induction or electromagnetic resonance.

The mobile terminal 1000 according to an embodiment of the present invention, which can include at least one of the above components, may be configured as a new form factor which can be used by being folded and unfolded like a book. More specifically, the mobile terminal may be a flexible electonric device that a body is entirely folded and unfolded, despite a length change occurring by layer in a thickness direction when the mobile terminal is folded.

Hereinafter, a structure of the flexible display unit 1510, and a structure of the flexible electronic device related to a transformation of the flexbile flexible display unit 1510 will be explained in more detail with reference to the attached drawings.

Firstly, an external structure of the mobile terminal according to an embodiment of the present invention will be explained.

Figure 3A:
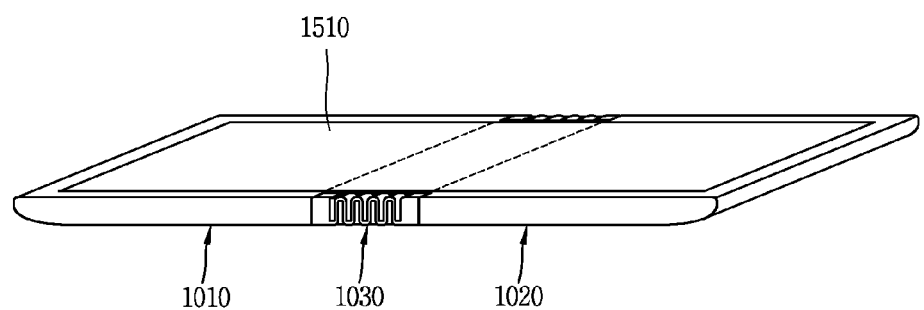
FIG. 3A is a conceptual view of a mobile terminal according to an embodiment of the present invention, which illustrates that a flexible display unit forms a single planar surface.
Figure 3B:
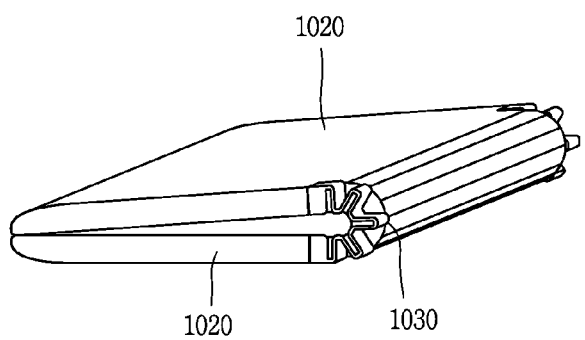
FIG. 3B is a conceptual view of the mobile terminal of FIG. 3A, which illustrates a folded state of a folding region of the flexible display unit.

FIG. 3A is a front perspective view of a mobile terminal according to an embodiment of the present invention, which illustrates that the flexible display unit 1510 forms a single planar surface. FIG. 3B is a conceptual view of the mobile terminal of FIG. 3A, which illustrates a folded state of a folding region of the flexible display unit.

Referring to the drawings, the mobile terminal according to an embodiment of the present invention includes a case which forms the appearance of the mobile terminal, a flexible display unit 1510 disposed on a front surface of the mobile terminal, and a sensing unit 1400 (or transformation sensing mechanism) configured to sense a transformation of the flexible display unit 1510.

The flexible display unit 1510 can be bent or folded.

Folding means a state that a curvature radius of part of a body of the mobile terminal is smaller than a reference value, i.e., a folded state. For such folded state of the mobile terminal, screens of the flexible display unit 1510 contact each other or are positioned close to each other.

On the contrary, the bending means a state that a curvature radius of part of the body of the mobile terminal is larger than the reference value, i.e., a bent state.

The folding and bending may be differentiated from each other according to a bent degree. For instance, if the mobile terminal is bent at an angle larger than a predetermined value, the state may be defined as 'folding'. On the contrary, if the mobile terminal is bent at an angle equal to or smaller than the predetermined value, the state may be defined as 'bending'. Even if the mobile terminal is bent at an angle larger than a predetermined value, if a curvature radius is larger than the reference value, the state may be also defined as 'bending'.

In a state where the flexible display unit 1510 of the mobile terminal forms a single flat surface, at least part of the flexible display unit 1510 may be transformed. The transformed state may be a folded state of the flexible display unit 1510, for example. That is, the flexible display unit 1510 may be configured to be in a first state (refer to FIG. 3A) where a specific region is flat, and a second state (refer to FIG. 3B) where the specific region is bent in the form of a curved surface.

In this instance, the connection unit 1030 may be in a state of being folded along a curved path. The curved path may be part of a circumference of a circle, or may be part of a circumference of an elliptical circle.

The flexible display unit 1510 may be provided with a plurality of folding regions. In this instance, the mobile terminal may provide a dual foldable display, as a left end and a right end of the body of the mobile terminal are folded, respectively.

Figure 4A:
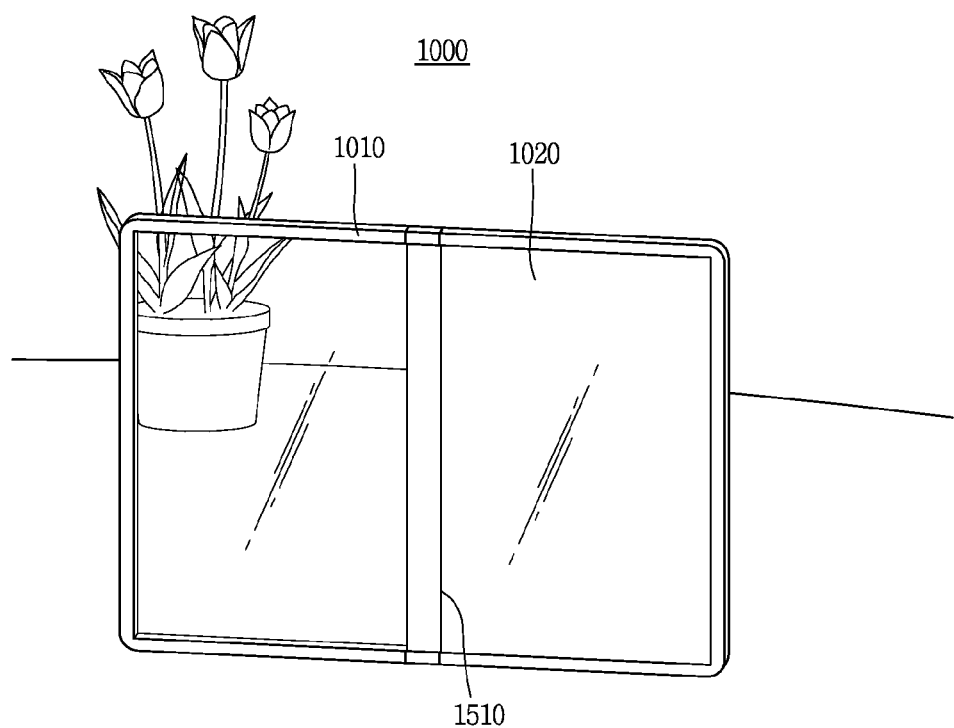
FIGS. 4A and 4B are conceptual views illustrating a transmissive region and a non-transmissive region of a mobile terminal according to the present invention.
Figure 4B:
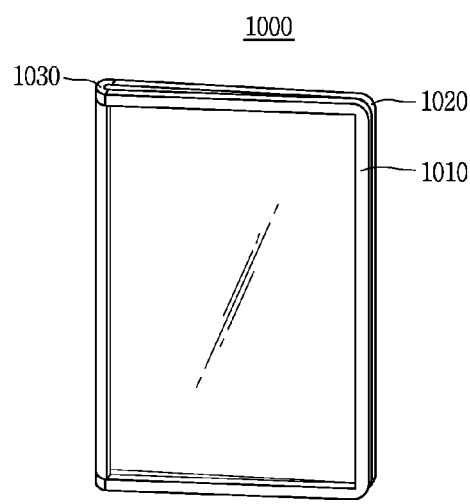
Figure 4C:
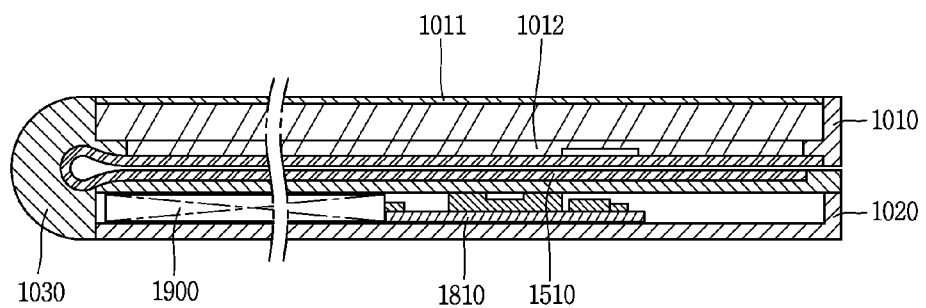
FIG. 4C is a sectional view illustrating a folded state of a mobile terminal according to the present invention.

FIGS. 4A and 4B are conceptual views illustrating a transmissive region and a non-transmissive region of a mobile terminal according to the present invention. FIG. 4C is a sectional view illustrating a folded state of a mobile terminal according to the present invention.

Referring to FIGS. 4A and 4B, the body of the present invention includes a first body 1010, a second body 1020, and a connection unit configured to connect the first and second bodies 1010, 1020 to each other so as to form a specific angle. The flexible display unit 1510 is disposed on one surface of the body. The flexible display unit 1510 is formed to be transparent so that outside can be seen therethrough. For instance, the flexible display unit 1510 may be implemented as a transparent liquid crystal display (LCD).

Although not shown, a window may be formed on the flexible display unit 1510. For instance, the window may be formed of a transmissive and flexible material such as a polyethylene terephthalate (PET) film and thin glass. However, the window may include a non-transmissive region. A transmissive region of the window may have an area corresponding to a display device. Accordingly, a user can recognize visual information output from the flexible display unit 1510 from outside.

A touch sensor (not shown), configured to sense a touch input applied to the window, may be disposed between the window and the flexible display unit 1510. The touch sensor may be mounted to a rear surface of the window, or may be integrally provided with the flexible display unit 1510. The touch sensor may be formed to be transmissive, and is configured to convert change occurring from a specific part of the window (e.g., a voltage and a capacitance) into an electrical input signal so as to sense a touch input.

The body of the mobile terminal according to the present invention has one region formed of a transmissive region. The body may be formed of a deformable material such as plastic, thin glass, fiber, thin metal (e.g., aluminum, etc.), textile, silicon and rubber, or a combination thereof. The transmissive region may be formed of a transmissive material such as a polyethylene terephthalate (PET) film and thin glass. However, the present invention is not limited to this. The body may be further provided with an additional case or cover. For instance, a front case which forms at least part of a front surface of the body, and a rear case which forms at least part of a rear surface of the body are coupled to each other, thereby forming a space where electronic components are mounted. A rear cover for covering mounted electronic components may be detachably coupled to the rear case. In this instance, an opening, through which the camera 1210 and the audio output unit 1540 are exposed to outside, may be provided at the rear cover. One or more rear input units 1230a, 1230b (refer to FIG. 2A) may be provided on a rear surface of the mobile terminal 1000.

A frame, which supports the flexible display unit 1510 and which constitutes the body, may be formed of a transmissive material. For instance, since at least one region of the first body 1010 is formed of a transmissive material, a region where the flexible display unit 1510 is arranged may be formed to be transmissive. An image output from the flexible display unit 1510 may be seen from two surfaces through the first body 1010. The connection unit 1030 may be also formed of a transmissive material. In the drawings, a bezel portion, which supports an edge of the flexible display unit 1510 of the first body 1010, is formed to be opaque. However, the present invention is not limited to this. The second body 1020 is formed of a non-transmissive material.

The flexible display unit 1510 is implemented as a flexible display formed to be bendable or foldable. The first body 1010 and the second body 1020 may be bendable or foldable by the connection unit 1030, with forming an angle therebetween. Referring to FIG. 4B, the first body 1010 and the second body 1020 may be folded on each other so as to face each other, by transformation of the connection unit 1030. The mobile terminal 1000 according to this embodiment of the present invention includes the first body 1010 and the second body 1020 having the same size.

Referring to FIGS. 4B and 4C, a state, where the first body 1010 and the second body 1020 are flat, is defined as a 'first state'. On the contrary, a state, where the first body 1010 and the second body 1020 are folded on each other, is defined as a 'second state'. In the second state, the flexible display unit 1510 is folded on each other in a disposed state between the first body 1010 and the second body 1020. That is, a user may control an angle between the first body 1010 and the second body 1020 so that one surface of the body where the flexible display unit 1510 is disposed can be arranged inwardly, by the connection unit 1030. In a folded state of the first and second bodies 1010, 1020, another surface of the body forms the appearance of the mobile terminal 1000.

Various types of electronic components, electrically connected to the printed circuit board 1810 (refer to FIG. 1), are disposed at an inner space of the second body 1020. The power supply unit 1900 (refer to FIG. 1) may be disposed at the second body 1020.

Since electronic components, etc. are not disposed in the first body 1010 formed as the transmissive region, a user can be provided with an image output from the flexible display unit 1510 more clearly.

The mobile terminal according to the present invention further includes a touch sensor 1011 formed on another surface of the first body 1010. The touch sensor 1011 is disposed to face one region of the flexible display unit 1510. The touch sensor 1011 is configured to sense a user's touch input applied to another surface of the first body 1010.

The mobile terminal 1000 includes a coating layer 1012 formed on one surface of the first body 1010, the one surface corresponding to the transmissive region. The coating layer 1012 may be formed on the flexible display unit 1510. However, the present invention is not limited to this.

A user can recognize an image output from the flexible display unit, through the transmissive region of the first body 1010. In this instance, an amount of light reflected after being incident from outside is reduced by the coating layer 1012, and thus an amount of emitted from the flexible display unit 1510 becomes larger than the amount of light reflected. With such a configuration, an image formed by light emitted from the flexible display unit 1510 can be recognized more clearly. This can enhance visibility of the flexible display unit 1510.

Figure 5A:
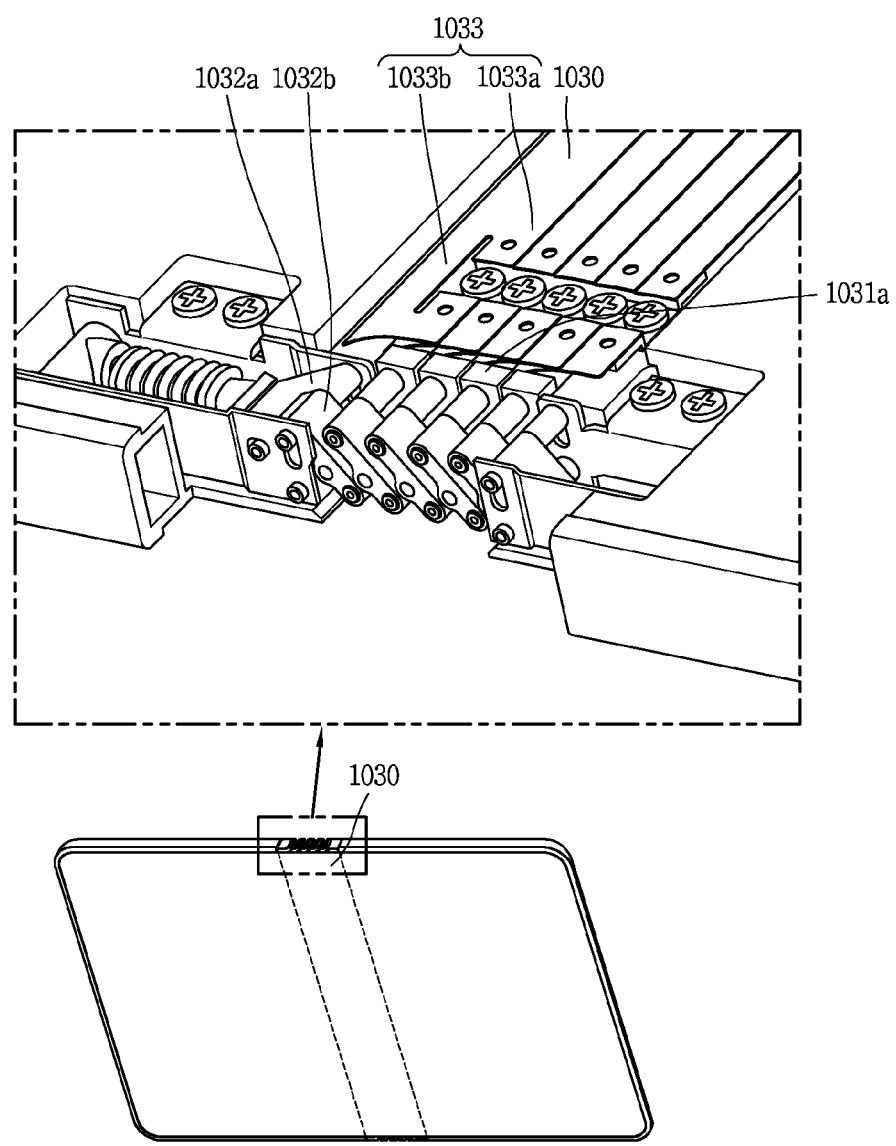

FIGS. 5A and 5B are conceptual views illustrating a driving structure of a connection unit according to the present invention. The connection unit 1030 includes a plurality of blocks 1031*a*. For instance, the plurality of blocks 1031*a* are overlapped with each other on a rear surface of the flexible display unit 1510. The plurality of blocks 1031*a* are arranged so that at least part thereof can be relatively movable with respect to neighboring blocks, in a direction to come close thereto or to be distant therefrom.

The plurality of blocks 1031*a* have a bar shape extending in one direction. For instance, in the first state where the flexible display unit 1510 has been unfolded, the plurality of blocks 1031*a* are disposed in parallel to each other.

Alternatively, the plurality of blocks 1031*a* may be formed to have a square cylindrical shape of which side surface and bottom surface are quadrangular. In this instance, the plurality of blocks 1031*a* may be disposed so that a side surface of one block faces a side surface of another block. Further, the plurality of blocks 1031*a* may be long formed along a first direction parallel to a shorter side of the flexible display unit 1510, and may be sequentially arranged along a second direction perpendicular to a longer side of the flexible display unit 1510. The plurality of blocks 1031*a* may be spaced from each other with a separation distance, in the second direction. For change of the separation distance, the plurality of blocks 1031*a* are arranged so that at least part thereof can be relatively movable with respect to neighboring blocks, in a direction to come close thereto or to be distant therefrom. Further, the plurality of blocks 1031*a* may be formed of a material having rigidity, so as to move not to be transformed on their position. For instance, the plurality of blocks 1031*a* may be formed of plastic, glass, fiber, metal (e.g., aluminum, magnesium, etc.), or a combination thereof. The plurality of blocks 1031*a* may be formed of a magnesium material for a light weight and a high strength.

The plurality of blocks 1031*a* may be formed of a transmissive material such as a polyethylene terephthalate (PET) film and thin glass.

The plurality of blocks 1031*a* are formed so that one block is relatively movable with respect to another neighboring block in a direction to become distant therefrom, when the mobile terminal 1000 is changed to the second state where the flexible display unit 1510 is folded on each other. Thus, a separation distance among the plurality of blocks 1031*a* in the second state may be longer than a separation distance among the plurality of blocks 1031*a* in the first state.

Since the plurality of blocks 1031*a* are arranged along a curved path, respective regions of the flexible display unit 1510 which is disposed at the first and second bodies 1010, 1020 may be spaced from each other without contact in the second state. The separation distance may be increased toward the connection unit 1030, from two sides of the mobile terminal 1000. For such an operation, the separation distance between the blocks adjacent to each other in the second state may be variable in a direction to pass through the flexible display unit 1510 (or a thickness direction of the mobile terminal).

For instance, in the first state, a side surface of one specific block is parallel to a side surface of another neighboring block. In this instance, the side surfaces facing each other may directly contact each other. On the contrary, in the second state, a side surface of one specific block faces a side surface of another neighboring block, with forming an acute angle therebetween. That is, in the second state, the separation distance among the plurality of blocks 1031*a* is increased as the blocks become distant from the flexible display unit 1510 in the thickness direction. That is, a degree of separation among the plurality of blocks 1031*a* is decreased when the blocks are adjacent to the flexible display unit 1510. Further, the plurality of blocks 1031*a* are formed so that at least part thereof can be relatively moved with respect to neighboring blocks, in a direction to come close thereto, when the flexible display unit 1510 is converted to the first state from the second state.

If an object having a thickness is folded, a length change occurs by layer. Thus, when the flexible display unit 1510 is folded, if the body of the mobile terminal 1000 is folded together with the flexible display unit 1510, the body requires a structure to compensate for such a length change. The length change should be compensated so that a rear surface of the flexible display unit 1510 can be a smooth curved surface when the flexible display unit 1510 is folded on each other.

In this embodiment, such a length change can be solved as the plurality of blocks 1031*a* are relatively moved with respect to each other. With such a configuration, a novel form factor hinge which is unfoldable and foldable like a book can be implemented. The mobile terminal of the present invention provides a mechanism to apply a force to the plurality of the blocks 1031*a* so that the plurality of blocks 1031*a* can be relatively moved with respect to each other. Hereinafter, such a mechanism will be explained in more detail.

Referring to the drawings, the connection unit 1030 includes a coupling portion 1031*b* for connecting the plurality of blocks 1031*a* to each other.

The plurality of blocks 1031*a* may be formed so that one end thereof is tilted based on a connection shaft 1031*c* of the coupling portion 1031*b*, when the flexible display unit 1510 is converted to the second state from the first state. More specifically, a connection groove for insertion-connecting the connection shaft 1031*c* thereto is provided at an end part of the plurality of blocks 1031*a*. The connection groove may be formed as a slit long in one direction so that the connection shaft 1031*c* can be moveable in the connection groove.

The connection unit is provided with links 1035 connected to an end part of the plurality of blocks 1031*a* so as to be relatively-rotatable.

The connection shaft 1031*c* may be a rivet coupled to the connection groove by a punch, and the links are connected to one another by the rivet to thus be rotated in an engaged state. In this instance, a guide of the links is moved in the blocks 1031*a* when the connection unit 1030 performs a trajectory motion, due to an outer side groove shape of a fixing portion.

In this instance, at least part of the links 1035 is configured to sequentially connect one side and another side of the plurality of blocks 1031*a* to each other.

With such a structure, the links perform a rotary motion and a sliding motion at a side far from the flexible display unit 1510, whereas the links perform only a rotary motion at a side close to the flexible display unit 1510. More specifically, if at least part 1035*a* of the links 1035 is defined as a first group, the links 1035 may be provided with a second group arranged so that links 1035*b* thereof can cross the links 1035*a* of the first group. The links 1035*b* of the second group are overlapped with the links 1035*a* of the first group, in a direction toward the end of the plurality of blocks. Further, the links 1035*b* of the second group are arranged to cross the links 1035*a* of the first group, and are sequentially connected to an upper end and a lower end of the links 1035*a* of the first group. In this instance, the links 1035*b* of the second group may be connected to the links 1035*a* of the first group by the connection shaft 1031*c*. With such a structure, the links 1035*a* of the first group and the links 1035*b* of the second group may be disposed, in the first state, to be inclined in opposite directions, based on the end of the plurality of blocks 1031*a*. In this instance, the links 1035*a* of the first group and the links 1035*b* of the second group may be symmetrical to each other right and left, based on the end of the plurality of blocks 1031*a*.

Thus, the links 1035*b* of the second group cross the links 1035*a* of the first group. The links 1035*b* of the second group and the links 1035*a* of the first group may be connected to each other, at positions where the links cross each other. The links 1035 may be formed as three-point links connected to each other on three points. The connection unit 1030 performs a trajectory motion with a predetermined 'R' value by connection of the three-point links.

Under the structure of the blocks 1031*a* and the coupling portion 1031*b*, once a user folds the mobile terminal, the folding force is transmitted to the coupling portion 1031*b* and the blocks 1031*a*. As a result, the blocks 1031*a* perform a relative motion with respect to each other. Accordingly, when the body of the mobile terminal is folded, a length change of the body can be compensated.

Further, the connection unit 1030 has a structure to maintain a folded state in the second state. For instance, the links 1035*b* of the second group are provided with a protrusion 1036 protruding between two ends of a link body. The protrusion 1036 may be disposed at the crossing part, thereby being rotatably connected to the links 1035*a* of the first group. More specifically, the links 1035*b* of the second group are provided with a groove 1037 formed between the protrusion 1036 and the end of the link body. In this instance, the groove 1037 may be formed to accommodate therein the end of the links 1035*b* of the second group, in the second state where the flexible display unit 1510 has been folded.

More specifically, the end of the links 1035*b* of the second group has a circular shape, and the groove 1037 is formed to have a shape corresponding to an outer circumference of the cylindrical shape. The groove 1037 may be formed on a side surface of the links 1035*b* of the second group by the protrusion 1036. In this embodiment, only the links 1035*b* of the second group will be explained. However, such a structure may be provided with the links 1035*a* of the first group.

If the blocks 1031*a* are relatively moved in the second state in a direction to become distant from each other, the end of the links 1035, which is far from the flexible display unit 1510, is moved toward the flexible display unit 1510, whereas the end of the links 1035, which is close to the flexible display unit 1510 is rotated on their position. Thus, an inclined degree of the links 1035 with respect to the end of the plurality of blocks 1031*a*, in the second state, is increased. With such a configuration, the end of the links 1035*b* of the second group may be accommodated in the groove 1037 in the second state. Under such a structure, the second state can be maintained, even if an external force is applied to the mobile terminal in a direction rather than a direction to unfold the mobile terminal.

The mobile terminal according to this embodiment may include a pressing module 1032*a* configured to apply a force to the plurality of blocks 1031*a* in a direction that the blocks are close to each other, in the first state where the flexible display unit 1510 is flat. In this instance, the pressing module 1032*a* is formed to apply a force to a region adjacent to one end of the plurality of blocks 1031*a*, in a direction to pass through the flexible display unit 1510.

The pressing module 1032*a* may be formed so that a force direction can be reversed as the connection unit 1030 is folded. For instance, a force direction is changed while the connection unit 1030 is folded so that a force to maintain a first state in the first state can be generated, and a force to maintain a second state in the second state can be generated. Such a mechanism may be implemented by the following structure.

For instance, an auxiliary link 1032b, connected to an outermost link among the links 1035b of the second group, may be provided. An auxiliary groove 1032d for inserting an auxiliary shaft 1032c inserted into the auxiliary link 1032b may be formed at a plate of the fixing portion. The pressing module 1032a is provided with a spring 1032e for applying a force to the auxiliary link 1032b. The spring 1032e may be a compression spring for applying a pushing force to the auxiliary link 1032b in the first state.

The auxiliary link 1032b is connected to an outermost link among the links 1035b of the second group through a connection shaft, at one side of the blocks (a side far from the flexible display unit 1510). The auxiliary link 1032b may be arranged in a direction to cross the links 1035b of the second group, in the first state. For instance, the auxiliary link 1032b may be arranged so as to be inclined with respect to the end of the blocks, in the same direction as the links 1035a of the first group, in the first state. The spring 1032e may be inserted into a spring supporting portion 1034. One end of the spring supporting portion 1034 may be rotatably coupled to the fixing portion, and another end thereof may be rotatably coupled to the auxiliary link 1032b.

As shown, the auxiliary link 1032b may be arranged in the first state so that an angle between itself and the spring supporting portion 1034 can be less than 180°, at a side far from the flexible display unit 1510. Since an elastic force of the spring 1032e is applied to the auxiliary link 1032b having the connection relation, a force, to push the plurality of blocks 1031a at one side of the blocks in a direction to cross the links 1035b of the second group, is generated. Thus, the plurality of blocks 1031a may be adhered to each other in the first state. If the mobile terminal is converted to the second state from the first state, an angle between the auxiliary link 1032b and an outermost link of the links 1035b of the second group is increased. Thus, the auxiliary link 1032b is converted so that an angle between itself and the spring supporting portion 1034 is less than 180°, at a side close to the flexible display unit 1510. Thus, in the second state, the elastic force of the spring 1032e pushes the plurality of blocks 1031a in a direction parallel to the links 1035b of the second group. Such a force is applied along a curved path, a folding line of a folding region, a force to maintain the second state may be generated. In this embodiment, a direction of the elastic force of the spring is changed when an angle of the flexible display unit 1510 exceeds a half of a rotation radius at a folding region. However, the present invention is not limited to this.

In the above description, the coupling portion 1031b is provided at one end of the plurality of blocks 1031a. However, as shown, the coupling portion 1031b may be provided at two ends of the plurality of blocks 1031a, respectively. In this instance, the structure of the coupling portion 1031b may be equally applied to an opposite side to the plurality of blocks 1031a, and detailed descriptions thereof will be omitted.

The present invention proposes a novel structure of a case for accommodating the plurality of blocks 1031a therein.

A plurality of plates 1033 for covering the blocks 1031a may be mounted to the blocks 1031a, respectively. The body of the mobile terminal is provided with a front surface where the flexible display unit 1510 is arranged, and a rear surface where the plurality of plates 1033 are arranged. The plurality of plates 1033 may be exposed to outside from the rear surface.

The plurality of plates 1033 are formed so that at least part thereof is overlapped with neighboring plates. With such a structure, spaces among the blocks 1031a can be blocked from outside.

More specifically, each of the plurality of plates 1033 is provided with a base portion 1033a, a region coupled to the block 1031a. An extension portion 1033b extends from the base portion 1033a, toward a neighboring block. The extension portion 1033b is formed to cover a base portion of a neighboring plate. Further, the plurality of plates 1033 may be formed to have a curved surface, not a flat surface. This can facilitate an operation to change a covered degree of a base portion of a neighboring plate by the extension portion 1033b, along a curved path of the connection unit 1030.

A cover (not shown) formed of a flexible material may be mounted to a side surface of the body of the mobile terminal. In this embodiment, the cover is formed to be flexible so that at least part thereof is transformable by an external force.

For instance, the cover (not shown) may be formed so as to be foldable on a plurality of points, along the side surface of the body. That is, the cover has a consecutive round structure so as to be transformable along the curved path of the folding portion. The cover is formed to have a length corresponding to the connection unit 1030, and is configured to cover a side surface of the connection unit 1030.

So far, has been explained a hardware configuration of the mobile terminal where the mobile terminal is folded on a folding region and then is remainingored to a flat state. The aforementioned hardware configuration may be modified in various manners. The controller 1800 determines a state of the mobile terminal using the sensing unit 1400, and controls information output to the flexible display unit 1510 based on a result of the determination.

The controller 1800 of the mobile terminal 1000 according to the present invention controls the flexible display unit 1510 and the touch sensor 1011, based on change of an angle between the first body 1010 and the second body 1020. Hereinafter, a control method of the mobile terminal 1000 will be explained in more detail.

FIG. 6A is a flowchart illustrating a method of controlling a mobile terminal according to an embodiment of the present invention.

Firstly, screen information is output to the flexible display unit 1510 disposed on one surface of the first body 1010 and the second body 1020 (S301). The flexible display unit 1510 may be divided into a first display region 1510a and a second display region 1510b by the first and second bodies 1010, 1020. The first and second display regions 1510a, 1510b may be divided from each other based on the connection unit 1030. Screen information corresponding to execution screens of different applications may be output to the first and second display regions 1510a, 1510b, respectively. Any type of screen information may be displayed on the flexible display unit. The screen information may correspond to one of a home screen page and a preset image.

The controller 1800 senses change of an angle between the first and second bodies 1010, 1020 by the sensing unit 1400 (S302). Then, the controller 1800 changes transparency of one region of screen information overlapped with the first body 1010, based on the angle change (S303).

The mobile terminal 1000 may include a polymer dispersed liquid crystal (PDLC) layer of which transparency is changed in an overlapped state by an electrical signal. In this instance, the controller 1800 may control an image output from the flexible display unit 1510, not to be recognized from another surface of the body, by controlling transparency of the PDLC layer. The PDLC layer may be disposed on the first body 1010 so as to be overlapped with the flexible display unit 1510 (independent configuration). Alternatively, the PDLC layer may be implemented as a component of the flexible display unit 1510.

The PDLC layer increases transparency of the screen information, when an angle between the first and second bodies 1010, 1020 is changed due to transformation of the connection unit 1030, i. e., when the first and second bodies 1010, 1020 are folded with a preset angle therebetween.

More specifically, once a voltage is applied to the PDLC layer, liquid crystals are constantly aligned in a direction. As a result, the PDLC layer has the same refractivity as a medium, and thus the flexible display unit 1510 becomes transparent. That is, once the first and second bodies 1010, 1020 are bent with a specific angle therebetween, the flexible display unit 1510 applies a specific voltage to the PDLC layer which constitutes the flexible display unit 1510, thereby controlling its transparency.

The controller 1800 activates the touch sensor 1011 formed on another surface of the first body 1010, based on the transparency (S304). For instance, the controller 1800 may activate the touch sensor 1011 so that the touch sensor 1011 receives a user's touch input, when transparency of the screen information is more than about 20%. That is, the controller 1800 activates the touch sensor 1011 when the first and second bodies 1010, 1020, set so that transparency has a preset value, have a reference angle therebetween.

When an angle between the first and second bodies 1010, 1020 is larger than the specific angle, the controller 1800 maintains the touch sensor 1011 in a deactivated state. Thus, reception of a user's touch input is prevented in the first state.

An object (e.g., a user's finger) is seen through the screen information overlapped with the transmissive region. In this state, a user may apply a touch input to one region of the touch sensor 1011 disposed on a rear surface of the body and overlapped with the screen information.

In the present invention, while transparency of screen information displayed on a transmissive region is controlled based on an angle between the first and second bodies, a touch input applied to the transmissive region overlapped with the screen information is received when the flexible display unit 1510 has transparency high enough for a user's finger to be viewable. Thus, the user can control the mobile terminal with being provided with screen information, in a state where the folded state of the first and second bodies is supported by his or her finger.

FIG. 6B is a conceptual view illustrating a method of controlling transparency of an image, based on an angle between the first and second bodies.

FIG. 6C is a conceptual view illustrating a principle to control a a polymer dispersed liquid crystal (PDLC) layer for control of transparency.

Referring to FIG. 6B, the flexible display unit 1510 may be divided into a first display region 1510a and a second display region 1510b by the first and second bodies 1010, 1020. The first and second display regions 1510a, 1510b may be divided from each other based on the connection unit 1030. In the first state where the first and second bodies 1010, 1020 are unfolded, first screen information 310 is output to the first display region 1510a of the flexible display unit 1510. Since the first screen information 310 is output to the transmissive region of the first body 1010, the first body 1010 has a relatively low transparency. As a result, an object disposed behind the transparent region is scarcely seen. More specifically, an object is seen in a dim state, so that a user can merely recognize that there exists an object or not.

The mobile terminal 1000 may include a polymer dispersed liquid crystal (PDLC) layer of which transparency is changed in an overlapped state by an electrical signal. In this instance, the controller 1800 may control an image output from the flexible display unit 1510, not to be recognized from another surface of the body, by controlling transparency of the PDLC layer. The PDLC layer may be disposed on the first body 1010 so as to be overlapped with the flexible display unit 1510 (independent configuration). Alternatively, the PDLC layer may be implemented as a component of the flexible display unit 1510.

When the PDLC layer is implemented as an additional component disposed on the flexible display unit 1510, the controller 1800 may control transparency of the PDLC layer so that the screen information is not viewable through the transmissive region. In this instance, a dim shape, by which only whether there exists an object or not can be checked through the flexible display unit 1510, may be recognized. The controller 1800 may control the PDLC layer in an opaque state so that the object is not recognizable according to a user's setting.

The PDLC layer increases transparency of the first screen information 310 when an angle between the first and second bodies 1010, 1020 is changed based on transformation of the connection unit 1030, i.e., when the first and second bodies 1010, 1020 are folded with a preset angle therebetween.

Through the first screen information 310 output to the first body 1010, a rear side of the body may be recognized. For instance, when a user's hand is positioned on another surface of the first body 1010, the user may recognize his or her fingers through the transmissive region of the first body 1010, when an angle between the first and second bodies 1010, 1020 is decreased.

Referring to FIG. 6C, the PDLC layer maintains an opaque state when no voltage is applied thereto, because liquid crystal molecules are irregularly aligned, and because scattering occurs on an interface between the PDLC layer and a medium which have different refractivities.

Once a voltage is applied to the PDLC layer, the PDLC layer becomes transparent, because the refractivities of the medium and the PDLC layer become consistent with each other as liquid crystal molecules are regularly aligned. That is, when the first and second bodies 1010, 1020 are bent to have a specific angle therebetween, the flexible display unit 1510 may apply a specific voltage to the PDLC layer thereof, thereby controlling transparency thereof.

Although not shown, the flexible display unit 1510 formed of the PDLC layer may be disposed only on the transmissive region. For instance, a display panel formed of the PDLC layer may be disposed on the transmissive region, and a non-transmissive display panel may be disposed on the remaining region (non-transmissive region) of the body.

Figure 6D:
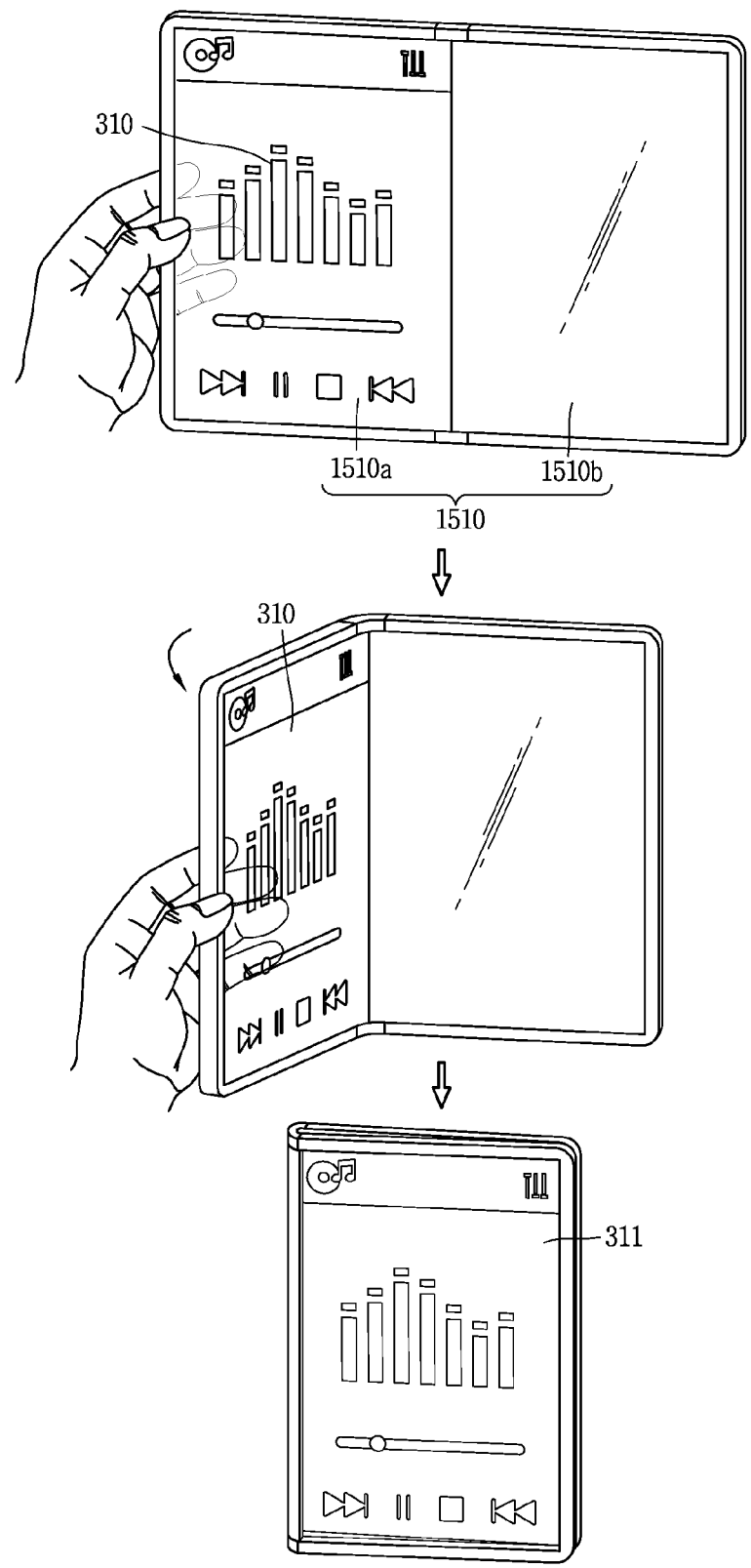
FIG. 6D is a conceptual view illustrating a method of controlling a flexible display unit based on an angle between a first body and a second body according to an embodiment of the present invention.

FIG. 6D is a conceptual view illustrating a method of controlling the flexible display unit 1510 based on an angle between the first and second bodies according to an embodiment of the present invention.

Referring to FIG. 6D, in the first state where the first screen information 310 is output to the first display region 1510a, an angle between the first and second bodies 1010, 1020 is changed by an external force. For instance, if an angle between the first and second bodies 1010, 1020 is decreased, transparency of the first screen information 310 is increased. That is, the controller 1800 may sense an angle between the first and second bodies 1010, 1020 and may apply a voltage to the flexible display unit 1510, thereby changing transparency of the flexible display unit 1510. Through the transmissive region to which the first screen information 310 having increased transparency is output, a user can recognize an object disposed on another surface of the first body 1010.

If the first state is converted into the second state where the first and second bodies 1010, 1020 are overlapped with each other, the controller 1800 controls the flexible display unit 1510 to output first reverse image information 311 of the first screen information 310, to the first display region 1510a. Once the first state is converted into the second state, the controller 1800 may increase or decrease transparency of the first display region 1510a.

For instance, if an image is output to the second display region 1510b, and if transparency of the first display region 1510a is increased, a user can check that the different image is overlapped with the first reverse image 311 having increased transparency, in the second state.

Figure 6E:
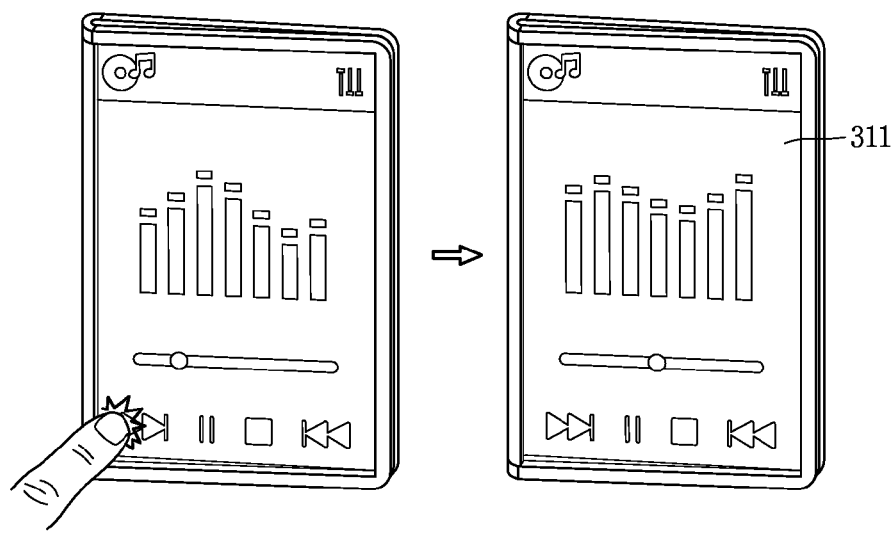
FIG. 6E is a conceptual view illustrating a method of activating a touch sensor formed on another surface of a body.

FIG. 6E is a conceptual view illustrating a method of activating the touch sensor 1011 formed on another surface of the body.

Referring to FIGS. 4C and 6D, the controller 1800 activates the touch sensor 1011 in the second state.

That is, in the second state where the flexible display unit 1510 is inwardly disposed, the flexible display unit 1510 outputs the first reverse image information 311 through the transmissive region, and the controller 1800 controls the touch sensor 1011 to receive a user's touch input applied to another surface of the body. Thus, a user can control the first reverse image information 311 and the mobile terminal 1000 through a touch input, even in the second state.

In the present invention, screen information can be checked even in a folded state of the body, through the transmissive region formed on one region of the body for check of two surfaces of the flexible display unit 1510. With such a configuration, a user can use the mobile terminal by transforming the mobile terminal in various shapes.

Further, since the touch sensor is activated to sense a touch input according to an angle of the body, a user can apply a touch input to another surface of the body with checking screen information through the transmissive region.

The controller 1800 may control a sensitivity of the touch sensor 1011, based on the angle change. More specifically, the touch sensor 1011 may become activated as the mobile terminal is activated, and may enhance a touch sensitivity based on the angle change. Further, the controller 1800 may enlarge or contract a region of the touch sensor 1101 to be activated, based on the angle. When the touch sensor 1011 is activated to sense a touch input, the controller 1800 may ignore the sensed touch input based on the angle. In this instance, the controller 1800 may control a touch input applied to a specific point to be ignored based on the angle.

More specifically, the controller 1800 controls transparency of the flexible display unit 1510 and controls activation of the touch sensor 1011, by sensing an angle between the first and second bodies 1010, 1020.

Figure 6F:
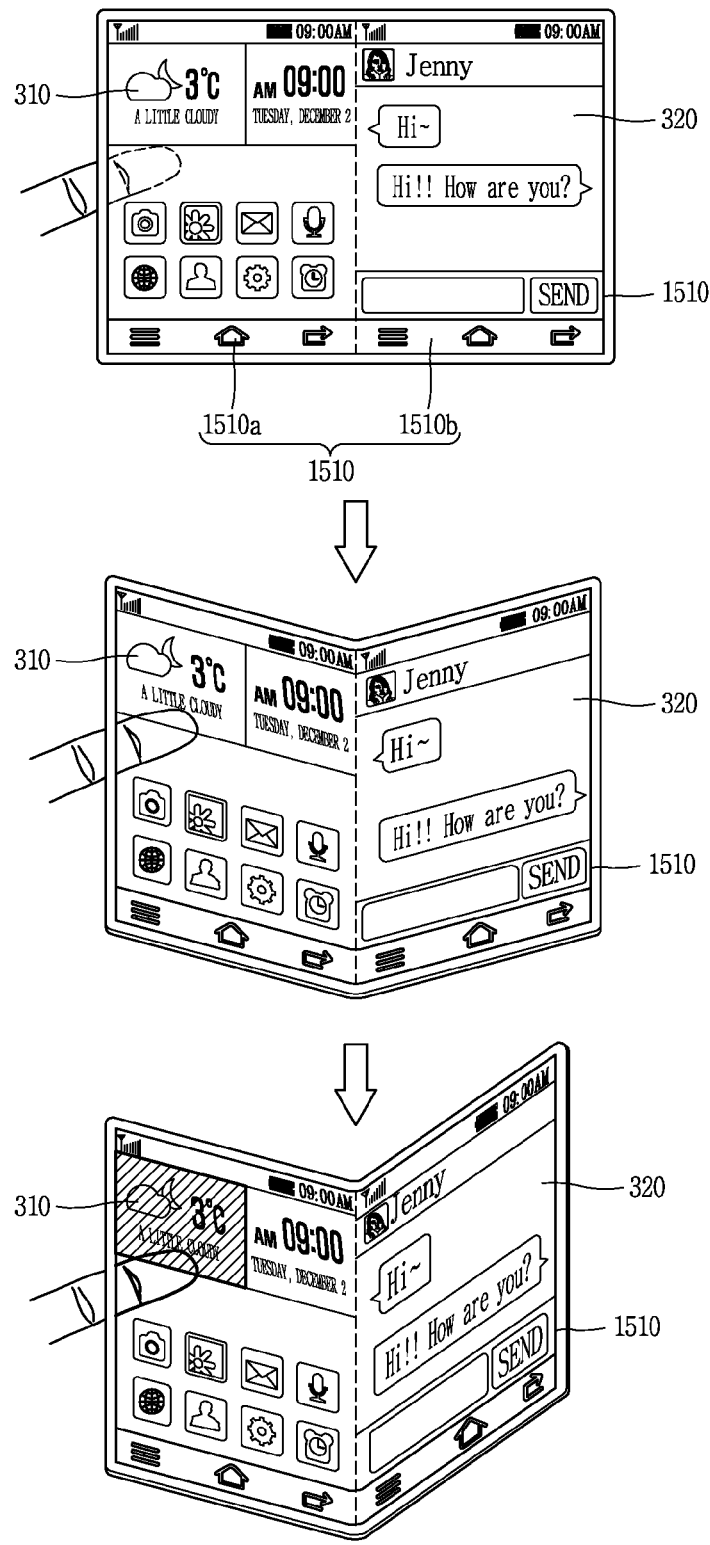
FIG. 6F is a conceptual view illustrating a method of controlling a mobile terminal according to another embodiment of the present invention.

FIG. 6F is a conceptual view illustrating a method of controlling a mobile terminal according to another embodiment of the present invention. If an angle between the first and second bodies 1010, 1020 is decreased by an external force in the first state, transparency of the first screen information 310 is increased. Thus, a finger is seen through the first screen information 310 corresponding to the transmissive region. In the drawings, the finger is illustrated as a dotted line, a thin solid line and a thick solid line, according to a transparent degree of the flexible display unit 1510.

The first display region 1510a of the flexible display unit 1510 outputs the first screen information 310, and the second display region 1510b of the flexible display unit 1510 outputs second screen information 320. The first and second screen information 310, 320 may correspond to execution screens of different applications, or may correspond to one of a home screen page and a preset image.

When an angle between the first and second bodies 1010, 1020 is larger than the specific angle, the controller 1800 maintains the touch sensor 1011 in a deactivated state. Thus, reception of a user's touch input is prevented in the first state.

An object (e.g., a user's finger) is seen through the first screen information 310 overlapped with the transmissive region. In this state, a user may apply a touch input to one region of the touch sensor 1011 disposed on a rear surface of the body and overlapped with the first screen information 310.

In the present invention, while transparency of screen information displayed on a transmissive region is controlled based on an angle between the first and second bodies, a touch input applied to the transmissive region overlapped with the screen information is received when the flexible display unit 1510 has transparency high enough for a user's finger to be viewable. Thus, the user can control the mobile terminal with being provided with screen information, in a state where the folded state of the first and second bodies is supported by his or her finger.

Figure 7A:
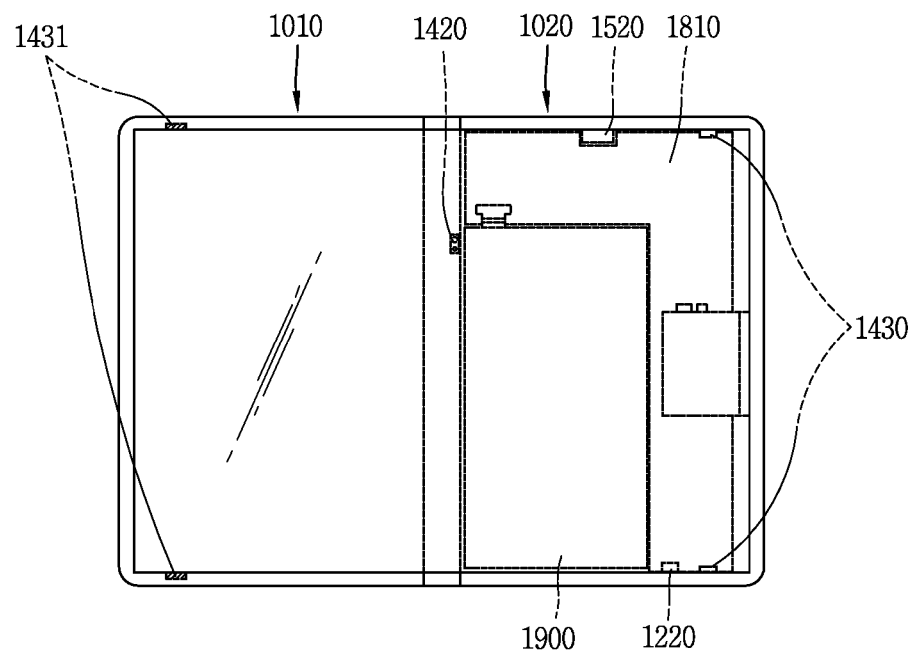
FIGS. 7A to 7C are conceptual views illustrating a sensing unit for sensing change of an angle between a first body and a second body according to various embodiments of the present invention.
Figure 7B:
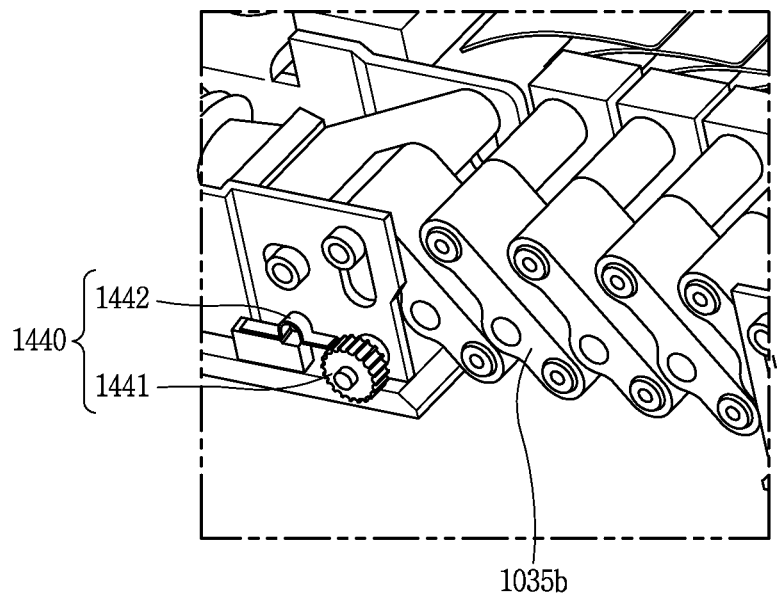
Figure 7C:
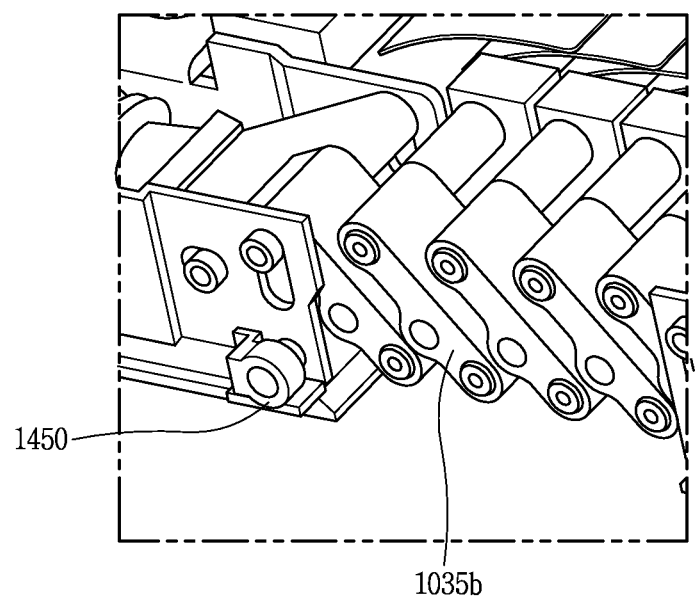

FIGS. 7A to 7C are conceptual views illustrating a sensing unit for sensing change of an angle between the first and second bodies according to various embodiments of the present invention.

The mobile terminal 1000 of FIG. 7A includes a proximity illumination sensor 1420 and hall sensors 1430. Preferably, the proximity illumination sensor 1420 is disposed on the second body 1020, and is formed at a region adjacent to the connection unit 1030. The proximity illumination sensor 1420 is configured to sense change of a distance between the first ands second bodies 1010, 1020, and change of the amount of incident light.

Although not shown, the mobile terminal 1000 may sense light as a transparent window for covering the proximity illumination sensor 1420 is formed. The proximity illumination sensor 1420 may sense change of an angle between the first and second bodies 1010, 1020, when the angle between the first and second bodies 1010, 1020 is less than about 90°. For instance, the controller 1800 may control the flexible display unit 1510 to increase transparency of its one region corresponding to the transmissive region, when the angle between the first and second bodies 1010, 1020 is decreased by the proximity illumination sensor 1420.

The hall sensors 1430 are configured to sense the first and second states. The hall sensors 1430 are disposed at the second body 1020. For instance, the hall sensors 1430 may be formed at a bezel portion which constitutes the second body 1020 and which supports the flexible display unit 1510. The first body 1010 includes magnets 1431 corresponding to the hall sensors 1430. Preferably, the magnets 1431 are arranged to face each other in the second state where the first and second bodies 1010, 1020 are overlapped with each other. That is, the magnets 1431 may be formed at a bezel portion which constitutes the first body 1010 and which supports the flexible display unit 1510.

Once a magnetism change of the magnets 1431 is sensed by the hall sensors 1430, the controller 1800 determines the first state or the second state. As shown in FIG. 6C, the controller 1800 may control the flexible display unit 1510 to convert the first screen information 310 into the first reverse image information 311, based on a magnetism change sensed by the hall sensors 1430.

The mobile terminal 1000 of FIG. 7B includes a rotation sensing module 1440 configured to sense a motion of links 1035b of the connection unit 1030, so as to sense a relative motion of the first and second bodies 1010, 1020. The rotation sensing module 1440 includes a gear portion 1441 fixed to a shaft of one of the links 1035b and rotated by motion of the links 1035b, and a clip portion 1442 disposed so that one end thereof contacts an outer circumferential surface of the gear portion 1441. The shaft, to which the gear portion 1441 has been fixed, is formed to be rotated when the links 1035b are rotated.

The clip portion 1442 may be implemented as a 'C'-clip extending to one direction, having one end supported by the gear portion 1441, and another end fixed to one region of the connection unit 1030. In the drawings, the rotation sensing module 1035b is arranged at a rotation shaft disposed at the outermost angle. However, the rotation sensing module 1035b may be mounted to any shaft of the links. The mobile terminal 1000 may include a plurality of rotation sensing modules 1035b.

When the gear portion 1441 is rotated, the clip portion 1442 reciprocates in one direction due to a shape of an outer circumferential surface of the gear portion 1441. The rotation sensing module 1440 may include a switch (not shown) for sensing a motion of the clip portion 1442. As the clip portion 1442 is moved by being pushed by the gear portion 1441, the switch is turned on/off.

The controller 1800 senses change of an angle between the first and second bodies 1010, 1020, based on a frequency (the number of times) that the switch of the rotation sensing module 1440 is turned on/off. The controller 1800 may control transparency of the flexible display unit 1510, based on a rotation degree of the gear portion 1441 sensed by the rotation sensing module 1440.

The mobile terminal 1000 according to this embodiment may further include the hall sensors 1430. The controller 1800 may sense a motion and a state of the body by sensing a magnetism change by the hall sensors 1430, and may determine change of an angle between the first and second bodies 1010, 1020 by the rotation sensing module 1440.

The mobile terminal 1000 of FIG. 7C includes an angle sensor 1450. The angle sensor 1450 may be implemented as an analogue rotary angle sensor. The angle sensor 1450 is fixed to a shaft of one of the links 1035b. The shaft, to which the angle sensor 1450 has been fixed, is formed to be rotated when the links 1035b are rotated.

The controller 1800 senses change of a rotation angle of the first and second bodies with respect to each other, by rotation of the shaft, and senses change of an angle between the first and second bodies 1010, 1020 based on the change of the rotation angle. Further, the controller 1800 controls transparency of the flexible display unit 1510, based on the change of the rotation angle.

The mobile terminal 1000 according to this embodiment may further include the hall sensors 1430. The controller 1800 may sense a motion and a state of the body by sensing a magnetism change by the hall sensors 1430, and may determine change of an angle between the first and second bodies 1010, 1020 by the angle sensor 1450.

The mobile terminal 1000 of FIGS. 7A to 7C according to various embodiments includes various types of sensors. However, the present invention is not limited to this, and the sensors may have the same components.

As another example, the sensing unit may include a bending sensor (not shown) disposed on one surface between a front surface and a rear surface of the flexible display unit 1510, or disposed on two surfaces, and configured to sense a bent state of the flexible display unit 1510. The bending sensor indicates a sensor formed to be bendable, and configured to sense a bent state using a characteristic that a resistance value is variable according to a bent degree. For instance, the bending sensor may be an optical fiber bending sensor using a transformation rate of optical fiber, an electric resistance type bending sensor using an electric resistance, a pressure sensor, a strain gauge, etc. The sensing unit 1400 may calculate a resistance value of the bending sensor, using a size of a voltage applied to the bending sensor, or a size of a current flowing on the bending sensor. And the sensing unit 1400 may sense a position where bending of the flexible display unit 1510 has occurred, a bent degree, etc., based on the calculated resistance value.

Since the components of the sensing unit are arranged at the connection unit 1030 which implements a relative motion of the first and second bodies 1010, 1020, the touch sensor and the flexible display unit 1510 may be controlled based on an angle between the first and second bodies 1010, 1020. Hereinafter, a method of controlling the touch sensor and the flexible display unit 1510 using the sensing unit will be explained in more detail.

Figure 8A:
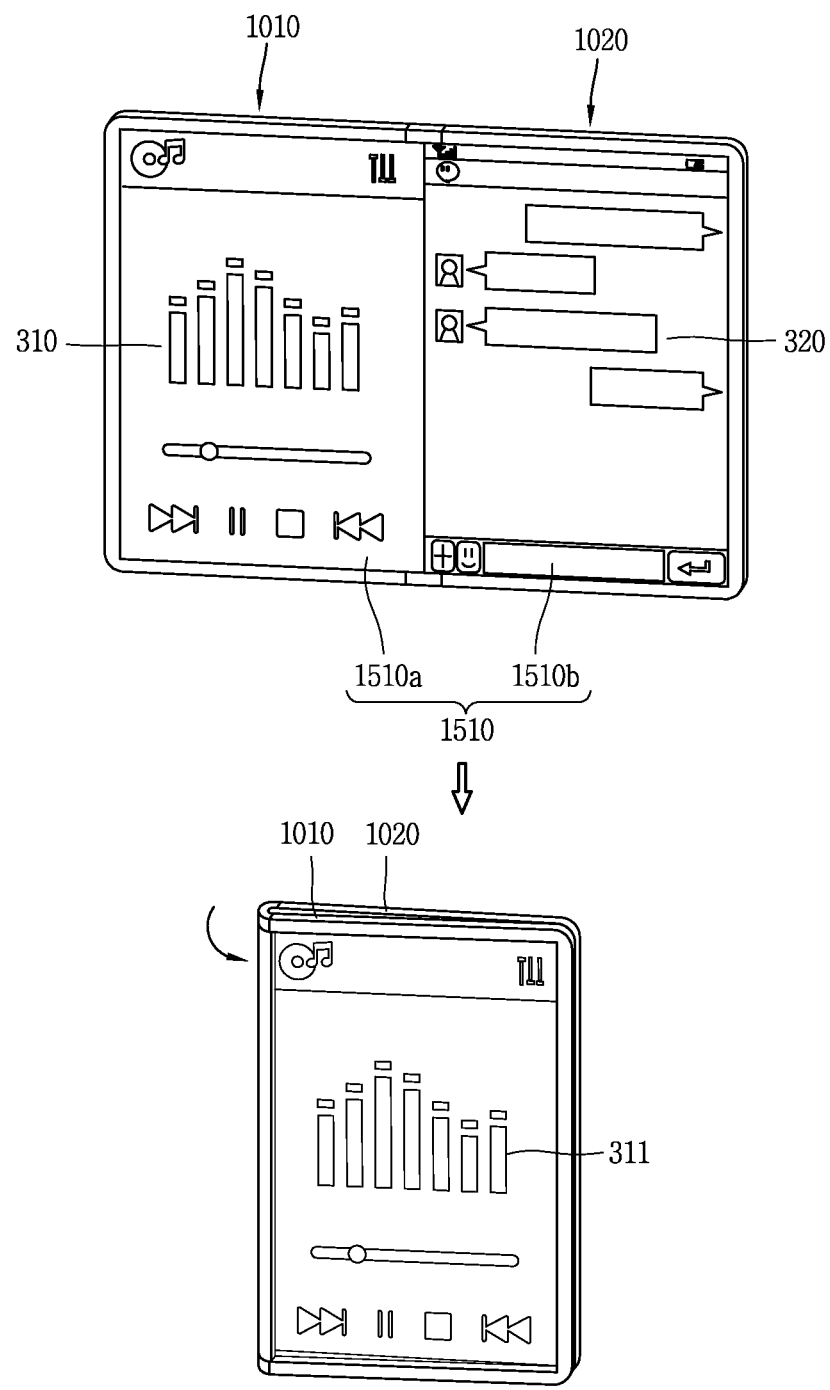
FIGS. 8A to 8C are conceptual views illustrating a control method according to various embodiments of the present invention.
Figure 8B:
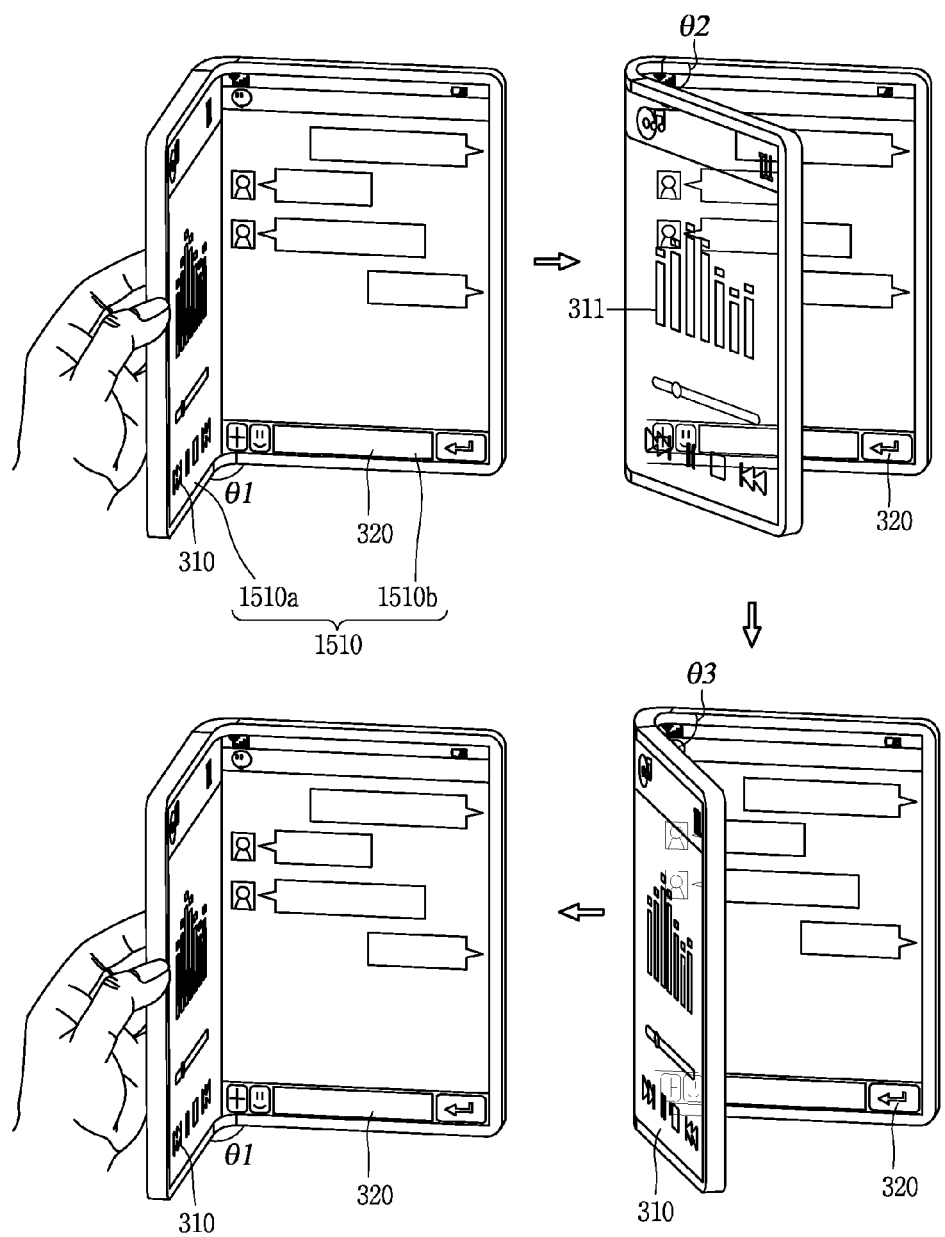
Figure 8C:
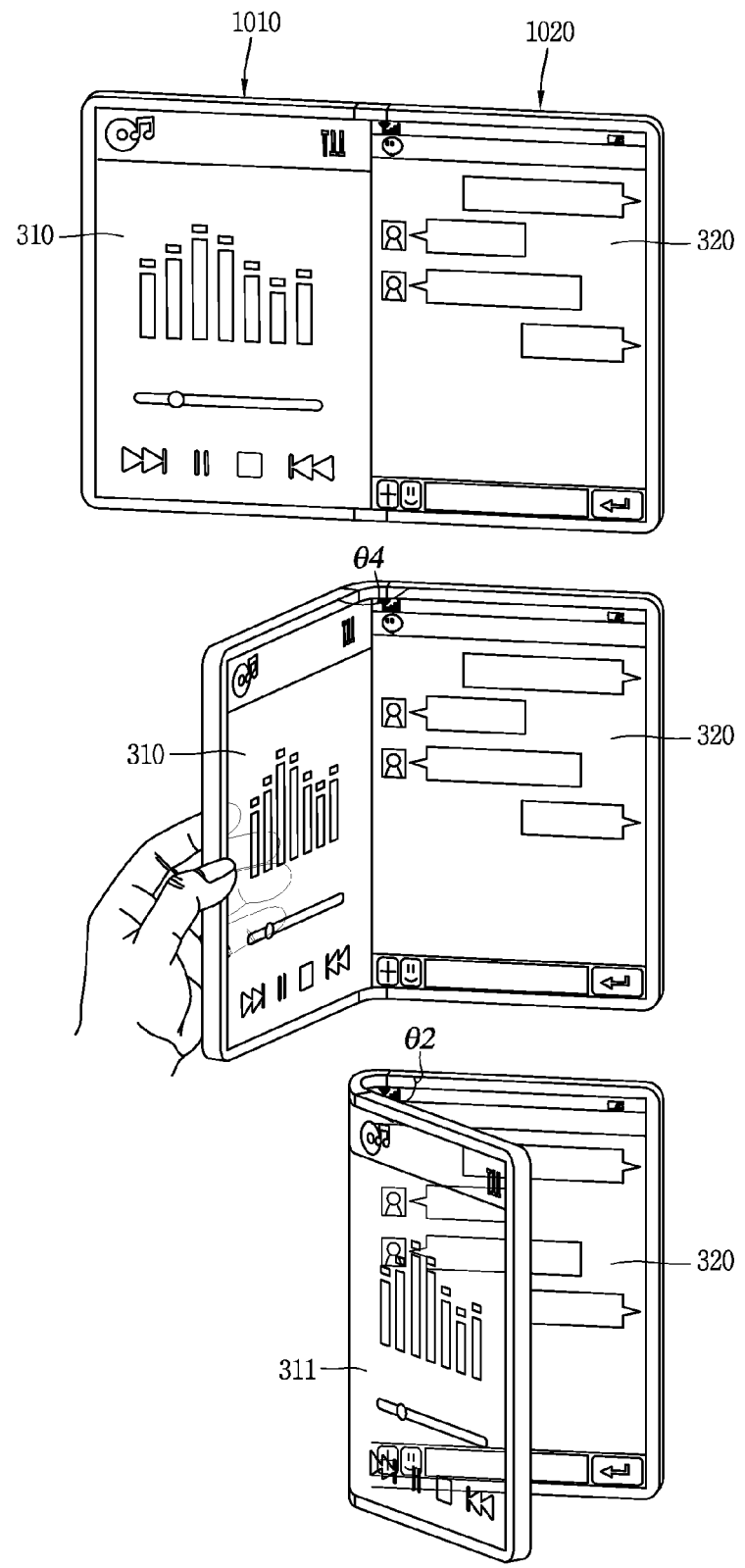

FIGS. 8A to 8C are conceptual views illustrating a control method according to various embodiments of the present invention.

Referring to FIG. 8A, in the first state, the flexible display unit 1510 outputs the first screen information 310 to the first display region 1510a, and outputs the second screen information 320 to the second display region 1510b. The first and second screen information 310, 320 may correspond to execution screens of different applications, preset images, home screen pages, etc. Any type of first and second screen information 310, 320 may be used.

If it is sensed, by the sensing unit (i.e., the hall sensors 1430), that the first state has been converted into the second state, the controller 1800 controls the flexible display unit 1510 to convert the first screen information 310 into the first reverse image information 311.

In this instance, the controller 1800 may control the flexible display unit 1510 to convert the second display region 1510b into a deactivated state. Alternatively, the controller 1800 may control the flexible display unit 1510 to output a relatively dark image to the second display region 1510b, or to change a brightness of the second screen information 320 into a low level (dark color). As a result, the first reverse image information 311 output through the transmissive region of the transparent flexible display unit 1510 can be recognized more clearly.

Referring to FIG. 8B, will be explained a method of controlling transparency of the flexible display unit 1510 based on change of an angle between the first and second bodies 1010, 1020. FIG. 8B(a) illustrates that the first screen information 310 is displayed on the first display region 1510a, and the second screen information 320 is displayed on the second display region 1510b, in a state where an angle between the first and second bodies 1010, 1020 is a first angle ($\theta 1$). In this instance, the first angle ($\theta 1$) may be about 90°.

If it is sensed, by the sensing unit, that the angle between the first and second bodies 1010, 1020 is changed to a second angle (θ2) smaller than the first angle (θ1), the controller 1800 controls the flexible display unit 1510 to convert the first screen information 310 into the first reverse image information 311. And the controller 1800 increases transparency of the first reverse image information 311.

Referring to FIGS. 8B(b) and (c), if it is sensed, by the sensing unit, that the angle between the first and second bodies 1010, 1020 is changed to a third angle (θ3) smaller than the first angle (θ1) but larger than the second angle (θ2), the controller 1800 controls the flexible display unit 1510 to decrease transparency of the first reverse image information 311.

That is, the controller 1800 may control the flexible display unit 1510 to decrease transparency of the flexible display unit 1510, as an angle between the first and second bodies 1010, 1020 is increased. However, the present invention is not limited to this. For instance, the controller 1800 may control the flexible display unit 1510 to increase transparency of the flexible display unit 1510, as an angle between the first and second bodies 1010, 1020 is increased. Alternatively, the controller 1800 may control the flexible display unit 1510 to output an image with the same transparency when an angle between the first and second bodies 1010, 1020 is 90° or less.

When the angle between the first and second bodies 1010, 1020 is the first angle (θ1), the controller 1800 may control the flexible display unit 1510 to output the first screen information 310 to the first display region 1510*a* in an opaque manner. That is, if the transparency of the flexible display unit 1510 is decreased, it is impossible to recognize an object through the first screen information 310.

Thus, if the mobile terminal is converted into a folded state, images output to the first and second display regions 1510*a*, 1510*b* may be provided respectively.

Referring to FIG. 8C, if it is sensed, by the sensing unit, that the angle between the first and second bodies 1010, 1020 is a fourth angle (θ4) larger than about 90°, the controller 1800 controls the flexible display unit 1510 to output an image in a state where transparency of the first screen information 310 is maintained.

If it is sensed that the angle between the first and second bodies 1010, 1020 is the first angle (θ1), the controller 1800 controls the flexible display unit 1510 to convert the first screen information 310 into the first reverse image information 311. Also, the controller 1800 controls the flexible display unit 1510 to increase transparency of the first reverse image information 311. Thus, a user can recognize the second screen information 320 together with the first reverse image information 311, through the first reverse image information 311 through the transmissive region.

The controller 1800 may control the flexible display unit 1510 to increase transparency of the first display region 1510*a*, as an angle between the first and second bodies 1010, 1020 is increased. With such a configuration, an object (a user's finger) disposed on another surface of the body can be recognized through the transmissive region.

Figure 9A:
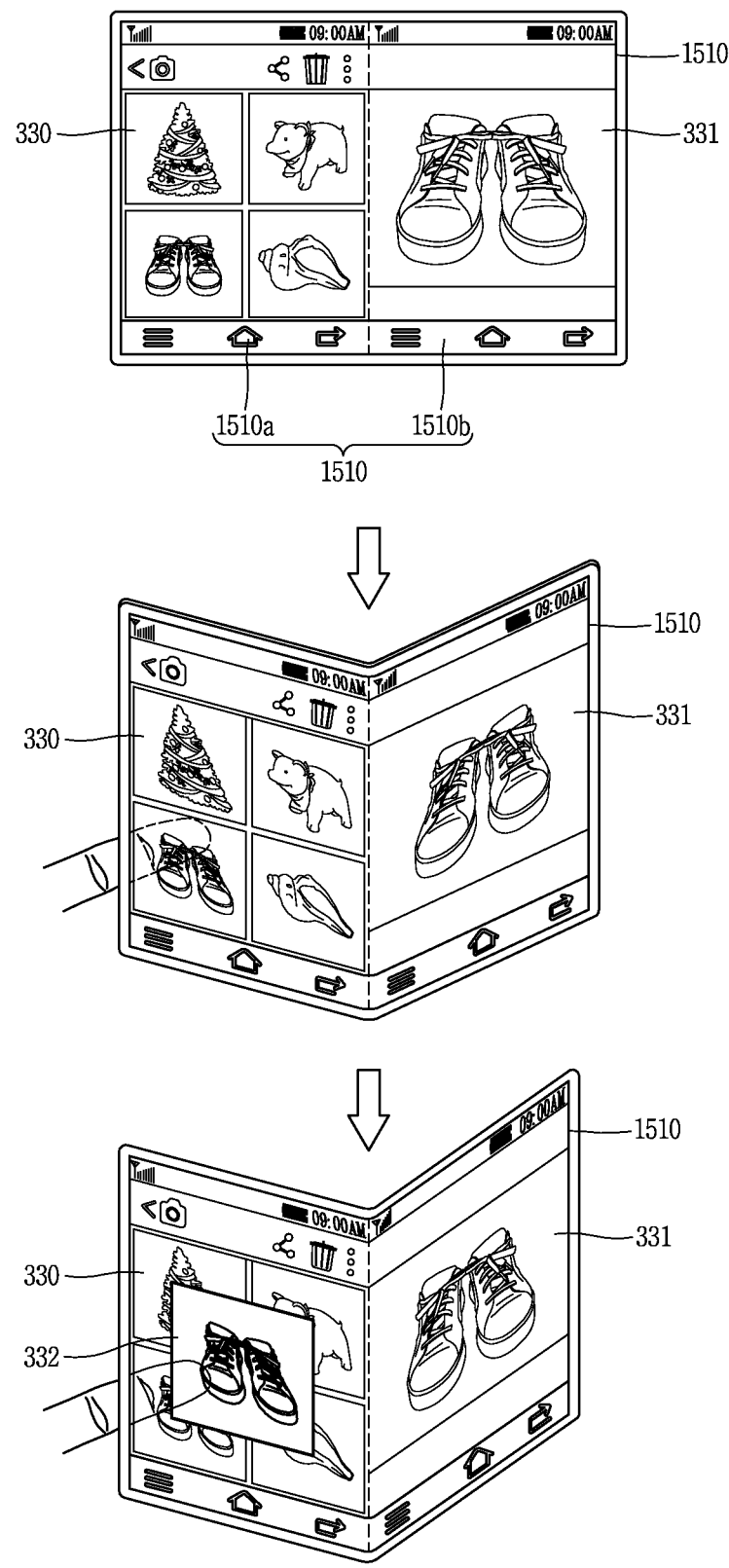

FIGS. 9A to 9C are conceptual views illustrating a method of controlling a mobile terminal according to various embodiments of the present invention.

Referring to FIG. 9A, will be explained a method of controlling first screen information based on a touch input sensed by the touch sensor 1011. In the first state, third screen information 330 is output to the first display region 1510*a* of the flexible display unit 1510, and a related image 331 related to the third screen information 330 is output to the second display region 1510*b* of the flexible display unit 1510. The related image 331 may correspond to part of content included in the third screen information 330, or an execution screen of an application related to the content. For instance, if the third screen information 330 is an execution screen of a gallery application, the related image 331 may be one of a plurality of images included in the execution screen.

If the first and second bodies 1010, 1020 form a specific reference angle therebetween, the controller 1800 controls transparency of the third screen information 330, and activates the touch sensor 1011.

The controller 1800 controls the flexible display unit 1510 to output one image 332 selected from the plurality of images, to the third screen information 330 in an overlapped manner, based on a touch input sensed by the touch sensor 1011. The selected image 332 may be displayed on a region corresponding to coordinates of a touch input applied to the touch sensor 1011. Also, the selected image 332 may be output with transparency different from that of the third screen information 330. For instance, the selected image 332 may be output in an opaque manner, whereas the third screen information 330 may be output with a preset transparency.

The controller 1800 may perform a specific function using the selected image 332, based on the touch input sensed by the touch sensor 1011. For instance, the controller 1800 may control the flexible display unit 1510 to share the selected image, to change a storage space, or to output the selected image 332 to the second display region 1510*b*, by applying a consecutive touch input to the selected image 332.

Referring to FIG. 9B, will be explained a method of executing a preset function based on a touch input sensed by the touch sensor 1011. The first display region 1510*a* outputs the first screen information 310, and the second display region 1510*b* outputs the third screen information 330. The flexible display unit 1510 outputs the first screen information 310 with a specific transparency, based on the first and second bodies 1010, 1020 bent to have the reference angle therebetween.

The controller 1800 selects a first image 310*a* included in the first screen information 310, based on the touch input sensed by the touch sensor 1011. The controller 1800 executes a preset function using the first image 310*a*, based on a front touch input applied onto the flexible display unit 1510 and overlapped with the touch input.

For instance, the first image 310*a* may be an icon included in the home screen page and corresponding to an application. In this instance, the controller 1800 may control the flexible display unit 1510 to delete the icon from the first screen information 310, based on the touch input and the front touch input.

Although not shown, the preset function is not limited to this. For instance, the controller 1800 may control the flexible display unit 1510 to execute an application corresponding to the first image 310*a*, to temporarily hide the first image 310*a*, or to output the first image 310*a* to the second display region 1510*b*.

Referring to FIG. 9C, will be explained a control method based on a touch input sensed by the touch sensor 1011, and a front touch input. When the first and second bodies 1010, 1020 have a reference angle therebetween, the flexible display unit 1510 outputs the first screen information 310 with a specific transparency, and the touch sensor 1011 is activated.

The controller 1800 selects a second image 310*b* included in the first screen information 310, based on a touch input sensed by the touch sensor 1011. The controller 1800 controls the flexible display unit 1510 to output a pop-up image 311*b* related to the second image 310*b*, to the first display region 1510*a*.

For instance, if the second image 310b is a folder image including a plurality of information (icons), the pop-up image 311b corresponds to screen information including the plurality of information (icons). The controller 1800 may control the flexible display unit 1510 to make the pop-up image 311b disappear, when the touch input is released.

The controller 1800 may select one of the plurality of information in response to the front touch input, while the pop-up image 311b is being output. Also, the controller 1800 may control the selected information based on the front touch input. For instance, the flexible display unit 1510 may delete a third image 311c based on the front touch input.

In the preferred embodiments of the present invention, even while the touch sensor 1011 receives a touch input in a state where the first and second bodies 1010, 1020 have a reference angle therebetween, the flexible display unit 1510 may select an image to be displayed by sensing a front touch input. When both of the touch input and the front touch input are sensed, a specific function is immediately executed. This can allow a user to perform a desired function more rapidly.

FIGS. 10A to 10D are conceptual views illustrating a method of controlling transparency on one region of screen information, based on an angle between the first and second bodies.

Referring to FIG. 10A, the controller 1800 outputs the first screen information 310 with a specific transparency, in a state where the first and second bodies 1010, 1020 have a reference angle therebetween. The controller 1800 controls the flexible display unit 1510 to output first event information 510 to the first screen information 310, based on a received event.

The controller 1800 may output the first event information 510 with the specific transparency, and may reduce transparency of the first screen information 310. For instance, the controller 1800 may control the flexible display unit 1510 to output the first screen information 310 in an opaque state.

That is, an object (a user's finger) disposed on another surface of the body can be recognized through one region of the flexible display unit 1510 to which the first event information 510 is output.

Although not shown, when a preset time lapses, the controller 1800 may control the first event information 510 to be deleted, and may control the first screen information 310 to have the specific transparency again.

In this embodiment, when an event is received, the event can be easily checked based on a touch input applied to another surface of the body.

Referring to FIG. 10B, the flexible display unit 1510 outputs second event information 520 related to a received event, to a status display line of an upper end of the first display region 1510a. The second event information 520 is output to the status display line, with the specific transparency. In this instance, the controller 1800 controls the flexible display unit 1510 to reduce transparency of the first screen information 310. For instance, the controller 1800 may display the first screen information 310 in an opaque manner.

The controller 1800 controls the flexible display unit 1510 to output status screen information 521 including the second event information 520, based on a consecutive touch input applied to the second event information 520. The status screen information 521 may be output with the specific transparency. However, transparency of the status screen information 521 is not limited to the specific transparency.

In this embodiment, when a specific event is received, transparency of existing screen information becomes opaque, and the event is output with higher transparency. Thus, a user can check the received event more easily.

Figure 10C:
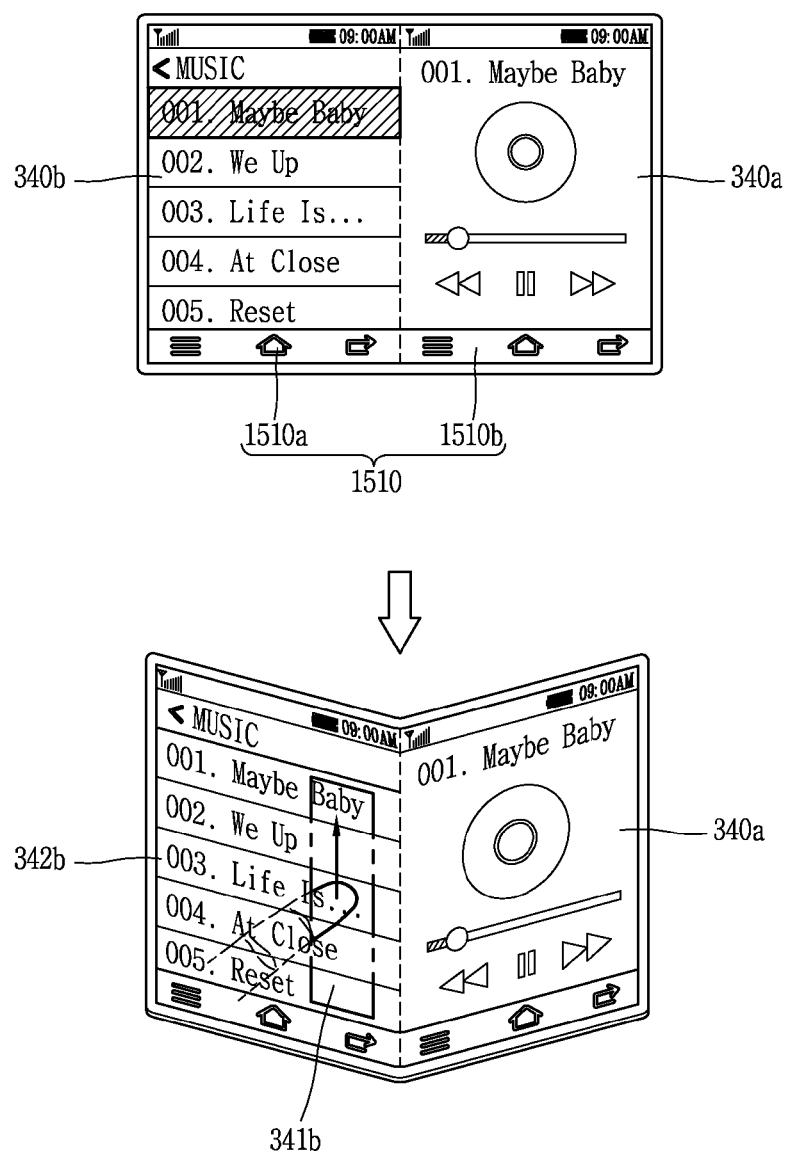

Referring to FIG. 10C, will be explained a method of controlling transparency of one region on screen information in order to control a list.

Referring to FIG. 10C, in the first state, fourth screen information 340a is output to the second display region 1510b, and a list screen 340b related to the fourth screen information 340a is output to the first display region 1510a. The list screen 340b includes a plurality of content, and includes additional content to be output based on a touch input applied in one direction. For instance, the controller 1800 may control the flexible display unit 1510 to output the additional content, based on a dragging-type of touch input upwardly applied to the list screen 340b in the first state.

The controller 1800 controls the flexible display unit 1510 to change one region of the list screen 340b into a transparent region 341b, when an angle between the first and second bodies 1010, 1020 is a reference angle. That is, the transparent region 341b may be formed to have the specific transparency, and the remaining region of the list screen 340b may be displayed in an opaque manner.

The controller 1800 activates at least one region of the touch sensor 1011. For instance, the controller 1800 may activate part of the touch sensor 1011 corresponding to the transparent region 341b.

Thus, a user may control the list screen 340b and the fourth screen information 340a by applying a touch input to the touch sensor 1011 corresponding to the transparent region 341b, viewing the list screen 340b entirely.

Referring to FIG. 10D, will be explained a method of controlling transparency of the flexible display unit 1510 based on a touch input applied to the touch sensor 1011. The first display region 1510a outputs the first screen information 310, and the second display region 1510b outputs the third screen information 330. However, the present invention is not limited to this. That is, the flexible display unit 1510 may entirely output consecutive single screen information.

The controller 1800 activates the touch sensor 1011 when the first and second bodies 1010, 1020 form a reference angle therebetween. The controller 1800 may change transparency of the first screen information 310. If a touch input is sensed by the touch sensor 1011, the controller 1800 may control the flexible display unit 1510 to control transparency of one region on the first screen information 310, the one region corresponding to coordinates of the touch input.

For instance, the controller 1800 may increase or decease transparency of a region 310c of the first screen information 310, the region 310c extended by a specific range based on a point where the touch input has been applied. Further, if the point where the touch input has been applied is changed, the region 310c of the first screen information 310, where the transparency is to be changed, may be altered.

With such a structure, a user may selectively change transparency of a region on screen information output based on a touch input.

Figure 11A:
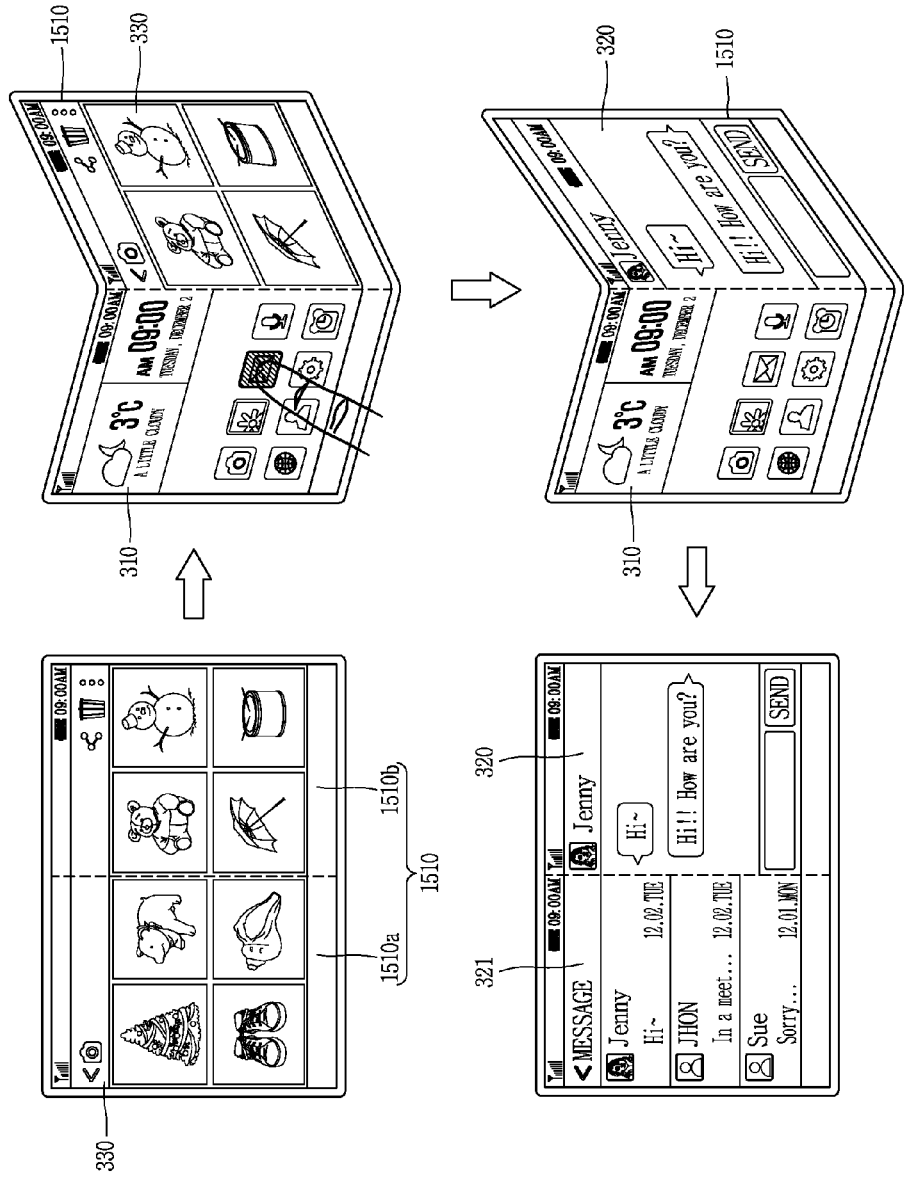
Figure 11C:
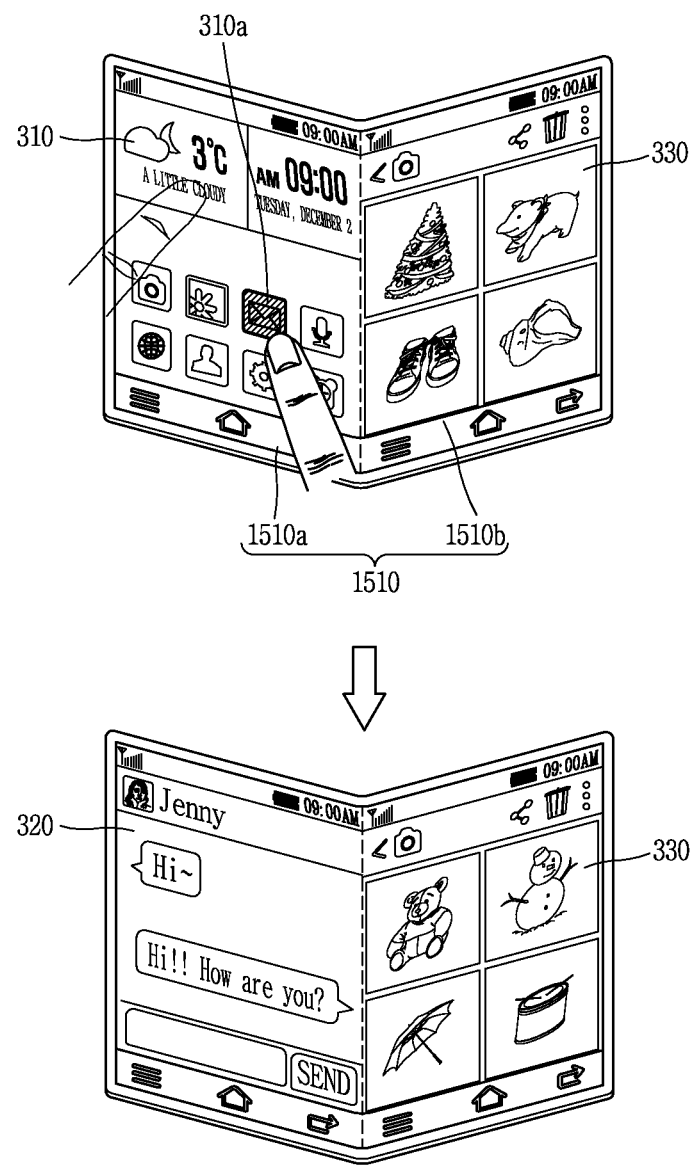

FIGS. 11A to 11C are conceptual views illustrating a method of executing a function, based on change of an angle between the first and second bodies.

Referring to FIG. 11A, will be explained a method of outputting preset screen information based on change of an angle between the first and second bodies. The flexible display unit 1510 entirely outputs the third screen information 330 to the flexible display unit 1510. If change of an angle between the first and second bodies 1010, 1020 is sensed, the controller 1800 controls the flexible display unit 1510 to output the third screen information 330 to the second display region 1510*b*, and to output the first screen information 310 to the first display region 1510*a*. For instance, the first screen information 310 may be a home screen page including a plurality of icons, for control of execution of an application.

In this embodiment, it is not necessary to output a graphic image for receiving a touch input in order to output the home screen page, with other screen information. Thus, screen information may be output by using a wider region on the flexible display unit 1510.

The controller 1800 may control the flexible display unit 1510 to change the third screen information 330 into the second screen information 320 on the second display region 1510*b*, based on a touch input applied to the home screen page. While the third screen information 330 is output, the first screen information 310 may be continuously output to the first display region 1510*a*.

If the mobile terminal is converted into the first state, the controller 1800 may control the flexible display unit 1510 to output a related screen 321 related to the second screen information 320, to the first display region 1510*a*. For instance, in a case where the home screen page is output to the first display region 1510*a*, if the mobile terminal is converted into the first state, the controller 1800 may control the flexible display unit 1510 to output an image related to screen information output to the second display region 1510*b*.

With such a configuration, a user can be provided with desired information more rapidly, by applying an external force to the first and second bodies 1010, 1020.

Referring to FIG. 11B, the controller 1800 controls the flexible display unit 1510 to convert the fourth screen information 340 into the third screen information 330, based on a touch input applied onto the flexible display unit 1510. In the first state, the flexible display unit 1510 selectively outputs an execution screen of an application to be executed.

If the first and second bodies 1010, 1020 are folded to have a reference angle therebetween, the controller 1800 may control the third screen information 330 to be output to the second display region 1510*b*, and may control the fourth screen information 340 to be output to the first display region 1510*a*. That is, the controller 1800 may display two screen information on the first and second display regions 1510*a*, 1510*b*, respectively, among execution screens of recently-executed applications.

That is, the controller 1800 may control the flexible display unit 1510 to output an execution screen of an application executed or an application being executed.

However, the present invention is not limited to this. If the first and second bodies 1010, 1020 are folded to have the reference angle therebetween in the first state, the controller 1800 may control the flexible display unit 1510 to output two preset screens. For instance, the two preset screens may be execution screens of applications set by a user, or applications set as frequently-used ones.

With such a configuration, a user may be provided with desired screen information more rapidly through a gesture to fold the body.

Referring to FIG. 11C, when the first and second bodies 1010, 1020 are folded to have a reference angle therebetween, the controller 1800 increases transparency of the first screen information 310 output to the first display region 1510*a*.

The controller 1800 selects the first image 310*a* included in the first screen information 310, based on a front touch input applied to the flexible display unit 1510. The controller 1800 may control the flexible display unit 1510 to change transparency of the first image 310*a* when the first image 310*a* is selected. For instance, when a front touch input is applied to the flexible display unit 1510, one region of the first screen information may be displayed in an opaque manner.

Once the first image 310*a* is selected, the second screen information 320, an execution screen related to the first image 310*a*, is output to the first display region 1510*a*.

In this embodiment, even when the first and second bodies 1010, 1020 are folded to have a reference angle therebetween, the mobile terminal is controllable not only by a touch input sensed by the touch sensor 1011, but also by a front touch input applied onto the flexible display unit 1510.

Figure 12A:
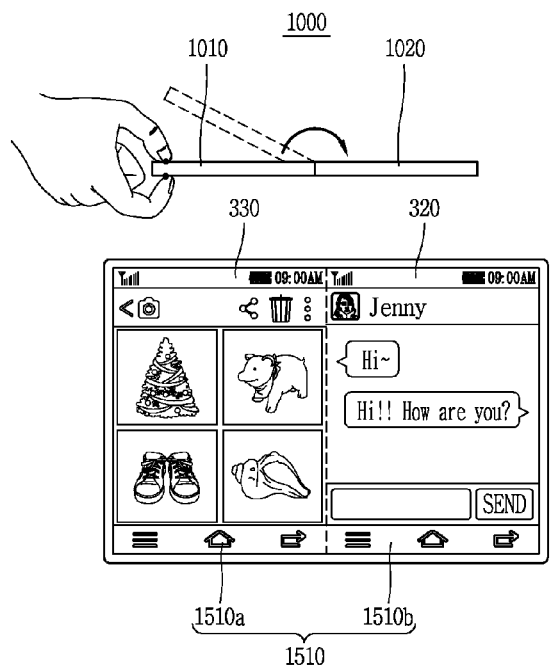
FIG. 12A(a) is a conceptual view illustrating a method of controlling a flexible display unit based on a two-surface touch input.
Figure 12A:
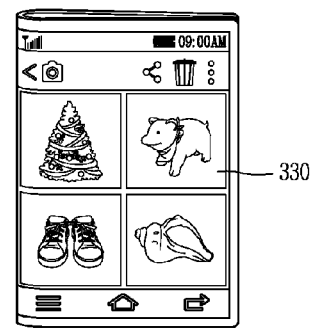
Figure 12B:
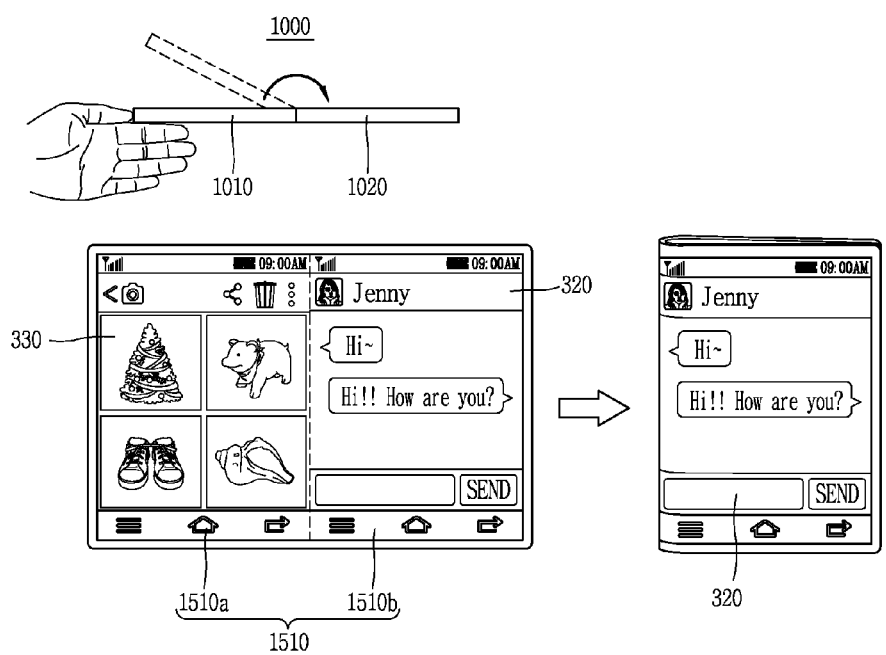
FIG. 12B is a conceptual view illustrating a method of controlling a flexible display unit based on a two-surface touch input.
Figure 12C:
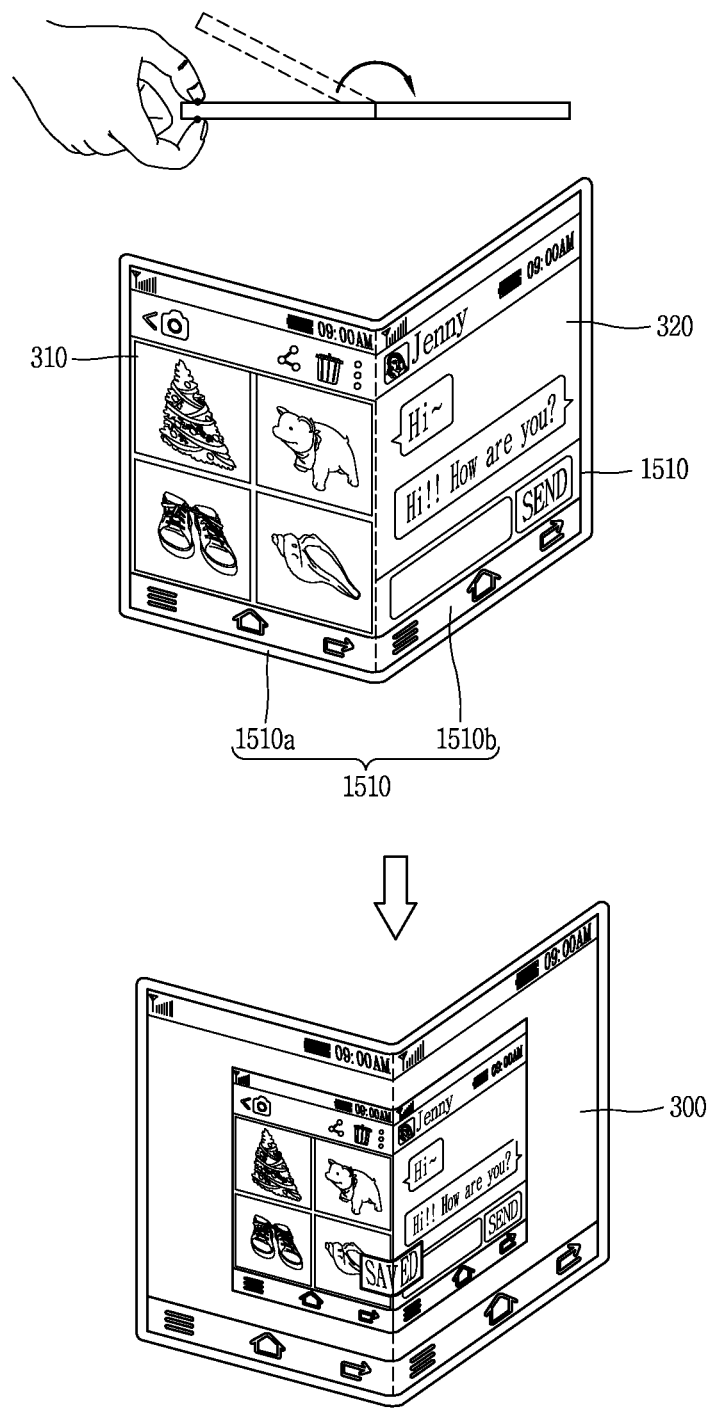
FIG. 12C is a conceptual view illustrating a method of controlling a flexible display unit based on a two-surface touch input.

FIGS. 12A to 12C are conceptual views illustrating a method of controlling the flexible display unit 1510 based on a two-surface touch input.

Referring to FIG. 12A(a), in the first state, the third screen information 330 is output to the first display region 1510*a*, and the second screen information 320 is output to the second display region 1510*b*.

FIG. 12A(a) illustrates a case where both a front touch input applied to the flexible display unit 1510, and a touch input applied to the touch sensor 1011 are sensed, when the first state is converted into the second state. FIG. 12A(b) illustrates a case where at least one of the front touch input and the touch input is not sensed.

Referring to FIG. 12A(a), the controller 1800 controls the flexible display unit 1510 to display the third screen information 330 in the second state. For instance, the controller 1800 may control the flexible display unit 1510 to change the first display region 1510*a* into a transparent state, and to output the third screen information 330 to the second display region 1510*b*. Alternatively, the controller 1800 may control the flexible display unit 1510 to output the third screen information 330 in a reversed manner, and not to output the second screen information 320.

Referring to FIG. 12A(b), the controller 1800 controls the flexible display unit 1510 to output the second screen information 320 in the second state. That is, the controller 1800 controls the flexible display unit 1510 to increase its transparency without outputting an image to the first display region 1510*a*.

In this embodiment, a user can be provided with various types of images by applying a touch input to the flexible display unit 1510 and the body, while a state of the body is being changed.

Referring to FIG. 12B, will be explained a method of capturing screen information on the flexible display unit 1510, based on a touch input sensed by the touch sensor 1011 and a front touch input. The first display region 1510*a* outputs the third screen information 330, and the second display region 1510*b* outputs the second screen information 320.

If the touch input sensed by the touch sensor 1011 and the front touch input are applied, the controller 1800 may control the memory 170 to store therein the second and third screen information 320, 330 as an image 300.

FIG. 12B illustrates a case where the front touch input and the touch input sensed by the touch sensor 1011 are applied in the first state. However, the present invention is not limited to this. For instance, it may be set to receive the touch input and to capture and store the screen information, only when the first and second bodies 1010, 1020 are folded to have a reference angle therebetween.

FIGS. 13A to 13D are conceptual views illustrating a method of controlling transparency of screen information output to the flexible display unit 1510.

Figure 13A:
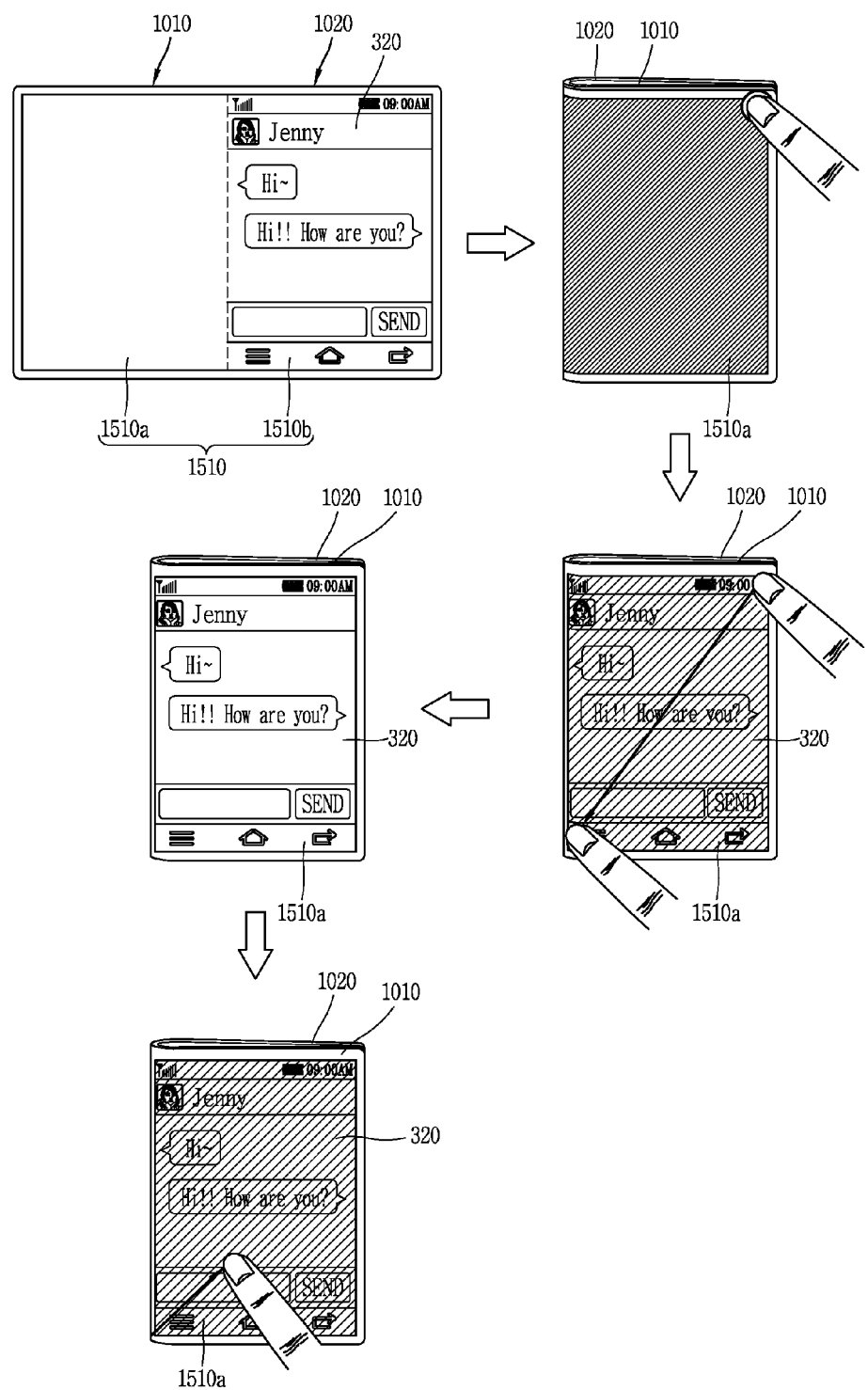

Referring to FIG. 13A, in the first state, the second screen information 320 is output to the second display region 1510b, and no image is output to the first display region 1510a. In a case where the first state is converted into the second state and a predetermined time lapses, if the flexible display unit 1510 is converted into a deactivated state, no voltage is applied to the a polymer dispersed liquid crystal (PDLC) layer in the deactivated state. Thus, one region on the flexible display unit 1510, where the polymer dispersed liquid crystal (PDLC) layer is formed, is converted into an opaque region. As a result, it is impossible to recognize the second screen information 320 due to the first display region 1510a converted into the opaque region.

The controller 1800 increases transparency of the flexible display unit 1510, based on a consecutive touch input applied from one edge of the first body 1010 in a diagonal direction (e.g., a dragging-type of touch input). The one edge may be defined as a right upper end edge.

For instance, when a long touch input is applied to one region adjacent to one edge of the first body 1010, the controller 1800 activates the touch sensor 1011. The controller 1800 controls the flexible display unit 1510 including the polymer dispersed liquid crystal (PDLC) layer, to increase the transparency, based on a touch range of a touch input applied to the touch sensor 1011. The first display region 1510a may become transparent gradually based on the touch range, and the second screen information 320 may be recognized through the transmissive region.

The controller 1800 activates the flexible display unit 1510 based on the long touch input, and controls the flexible display unit 1510 to output the second screen information 320 to the second display region 1510b.

The controller 1800 may control the flexible display unit 1510 to lower the transparency, based on a touch input consecutively applied from another edge, in a transparent state of the first display region 1510a. For instance, the another edge may be formed at a region adjacent to a left lower end of the flexible display unit 1510.

The consecutive touch input for changing the transparency may be a touch input which moves to a central region from an edge of the flexible display unit 1510.

If a consecutive touch input is applied within a range more than a reference range, the controller 1800 may control the flexible display unit 1510 to control the transparency. Thus, the control function may be differentiated from other function controlled by a touch input applied from the edge.

Figure 13B:
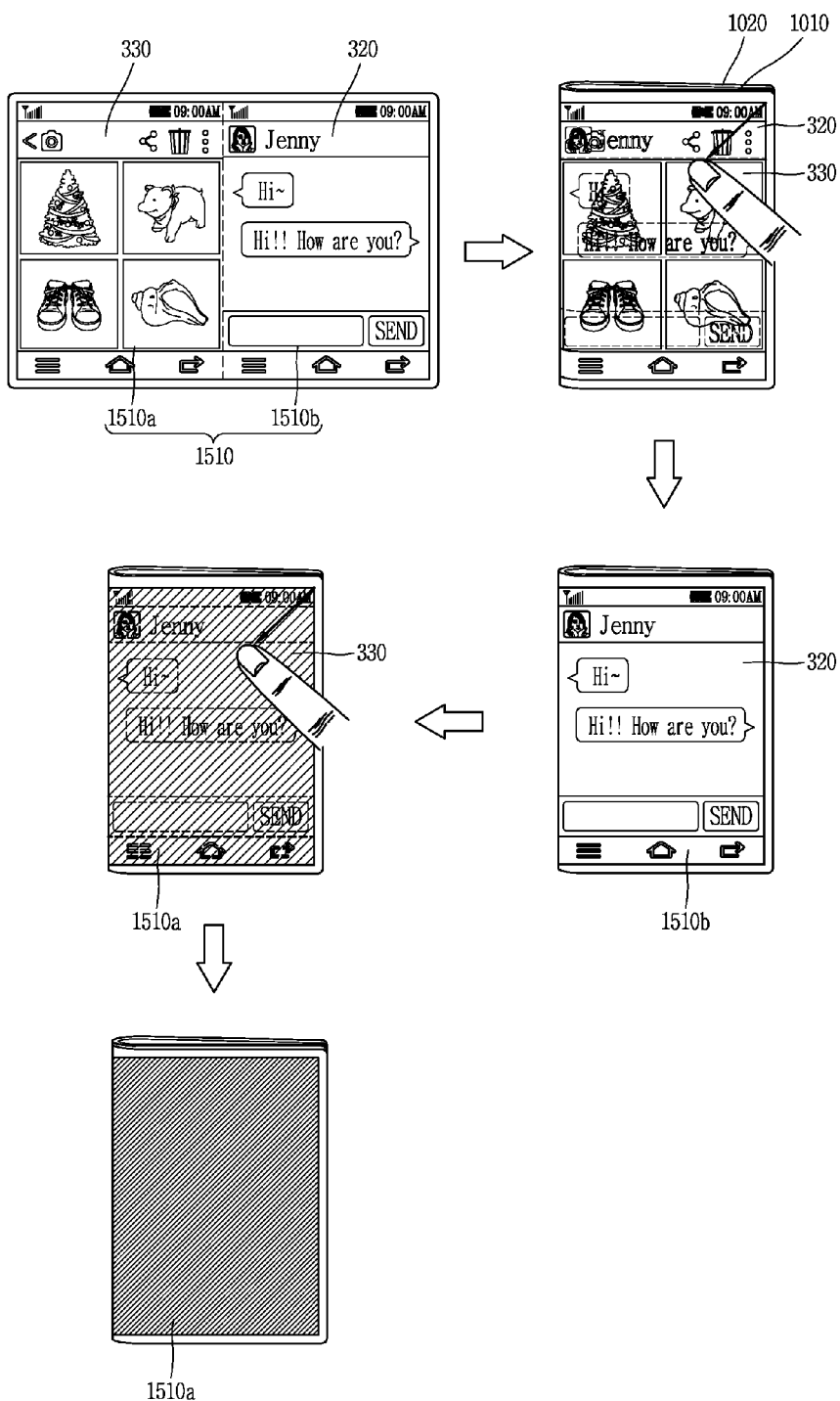

Referring to FIG. 13B, will be explained a method of controlling transparency of the flexible display unit 1510 when screen information is output to the first and second display regions 1510a, 1510b in an overlapped manner. In the first state, the third screen information 330 is output to the first display region 1510a, and the second screen information 320 is output to the second display region 1510b.

In the second state, the controller 1800 controls the flexible display unit 1510 so that the second screen information 320 can be recognized through the third screen information 330, as transparency of the first display region 1510a is increased.

In the second state, the controller 1800 controls the flexible display unit 1510 to control transparency of the first display region 1510a, based on a consecutive touch input applied to one region on another surface of the first body 110. For instance, the consecutive touch input may be a dragging-type of touch input applied, in the second state, from a region adjacent to a right upper edge of the first body 1010, in a diagonal direction.

The controller 1800 controls the flexible display unit 1510 to increase transparency of the third screen information 330, in correspondence to a touch range of the touch input. As the transparency of the third screen information 330 is increased, the third screen information 330 disappears gradually. Thus, a user can check the second screen information 320 through the transmissive region.

The controller 1800 may re-control the flexible display unit 1510 to lower transparency of the first display region 1510a, based on a touch input applied to the one region after the first display region 1510a becomes transparent. For instance, the controller 1800 may lower transparency of the flexible display unit 1510 by gradually cutting off a voltage applied to the polymer dispersed liquid crystal (PDLC) layer. As a result, the flexible display unit 1510 becomes deactivated.

Figure 13C:
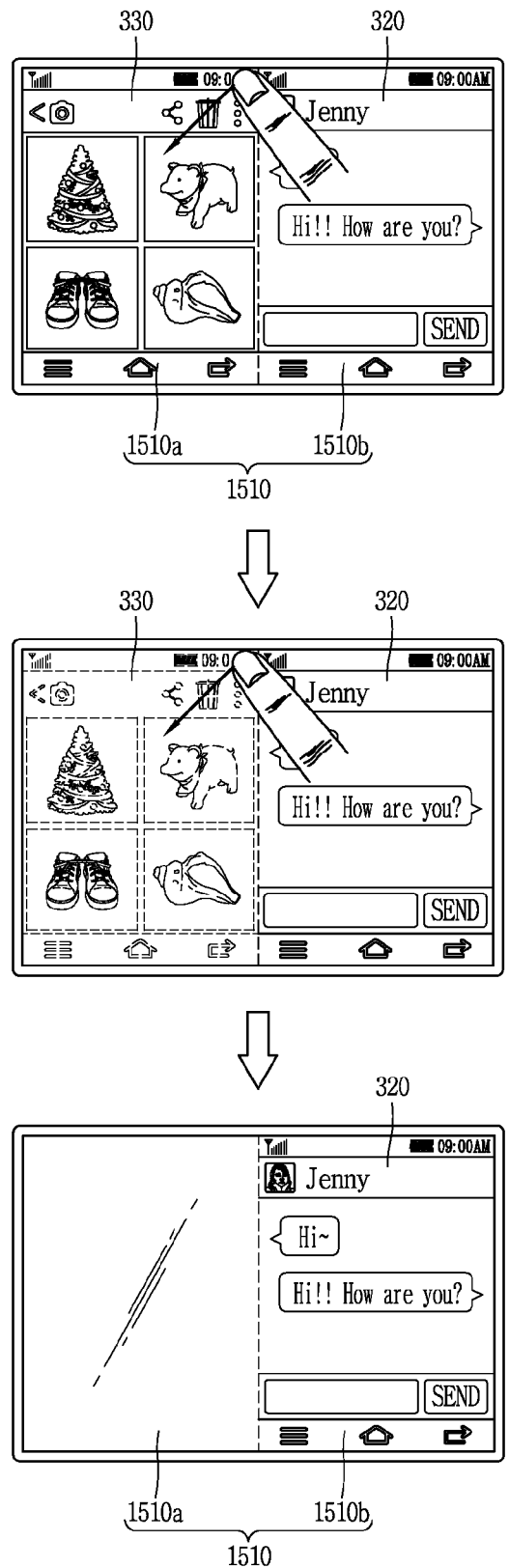

Referring to FIG. 13C, will be explained a method of controlling transparency of the flexible display unit 1510 in the first state. In the first state, the controller 1800 controls transparency of the first display region 1510a, based on a consecutive touch input applied to the first display region 1510a. The consecutive touch input may be a dragging-type of touch input applied from one edge of the first display region 1510a, in a diagonal direction.

The controller 1800 may control transparency of the first display region 1510a, based on the touch range. When the touch range is equal to or more than a reference range, the controller 1800 may control the third screen information 330 on the transmissive region to disappear.

Referring to FIG. 13D, will be explained a method of controlling transparency of the first and second display regions 1510a, 1510b. The controller 1800 controls transparency of the second display region 1510b, based on a consecutive touch input applied, in the first state, from one edge of the flexible display unit 1510, in a diagonal direction. As transparency of the second screen information 320 on the second display region 1510b is increased, an image may becomes dim and the image may be displayed in a gradually dark manner.

If the consecutive touch input is applied onto the first display region 1510a, the controller 1800 controls the flexible display unit 1510 so that the first and second display regions 1510a, 1510b can have the same transparency.

Further, the controller 1800 increases transparency of the first and second display regions 1510a, 1510b gradually, based on a consecutive touch input applied to the first display region 1510a. Thus, the first display region 1510a may be converted into a transparent state, and the second display region 1510b may be converted into a deactivated state.

That is, a user may control transparency of the first and second display regions 1510a, 1510b which output different screen information, based on a touch input applied to the flexible display unit 1510 in the first state.

Figure 14A:
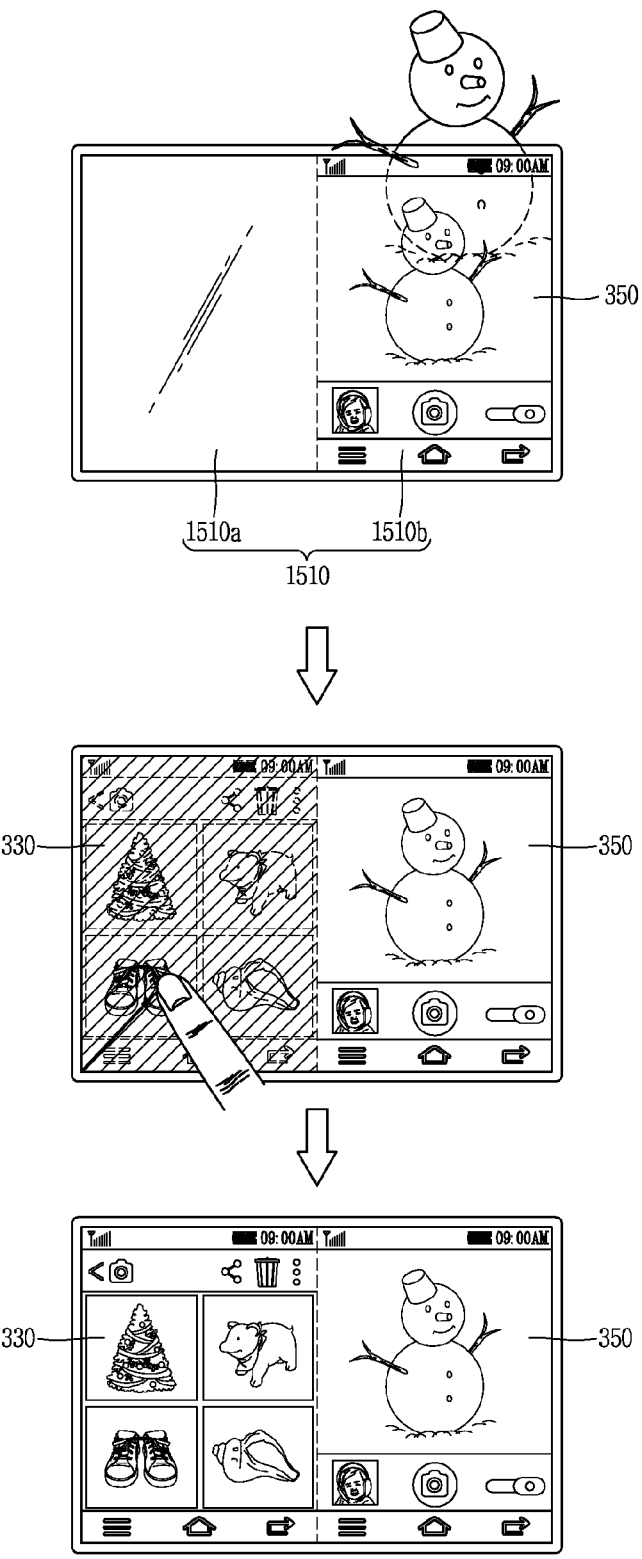
FIGS. 14A and 14B are conceptual views illustrating a method of outputting screen information related to another display region.
Figure 14B:
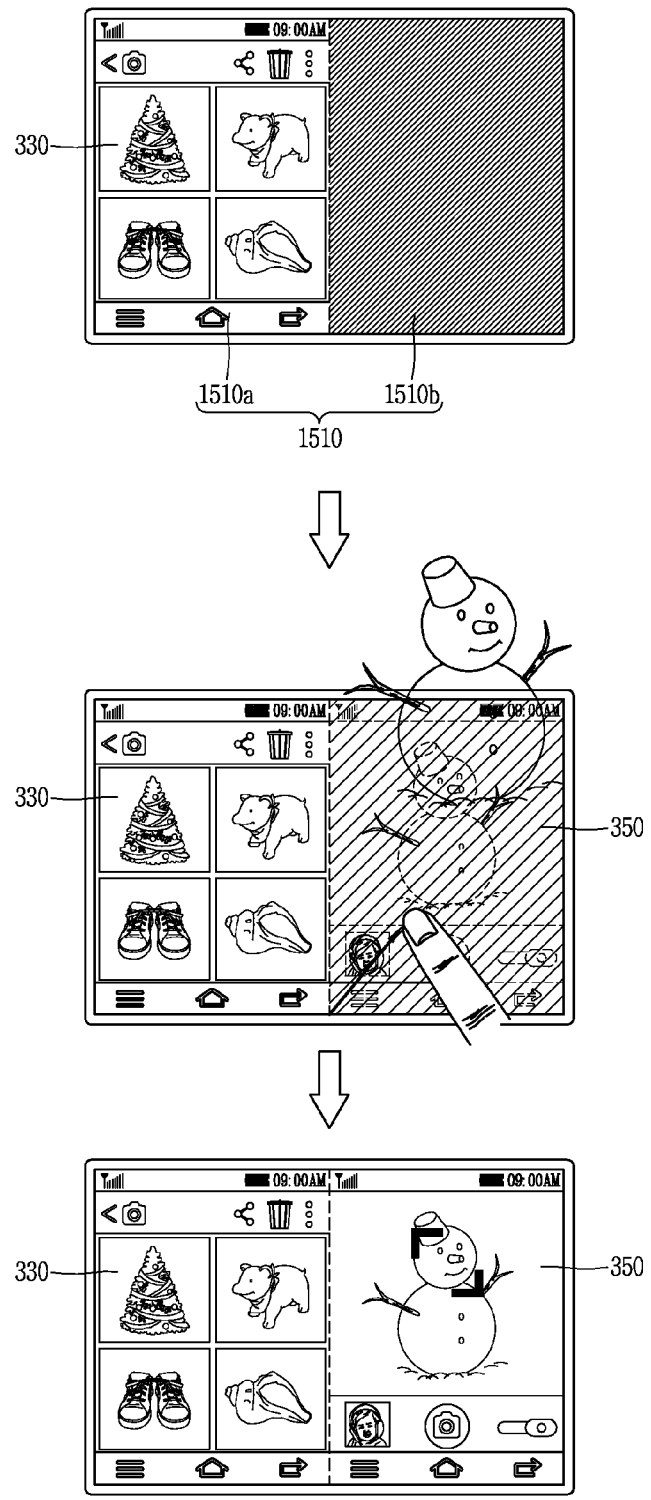

FIGS. 14A and 14B are conceptual views illustrating a method of outputting screen information related to another display region.

Referring to FIG. 14A, the second display region 1510b outputs fifth screen information 350 including a preview image obtained by the camera 1210 as a capturing application is executed. Since no image is output to the first display region 1510a, external environments may be recognized through the transmissive region.

The controller 1800 may control the flexible display unit 1510 to output the third screen information 330 related to the fifth screen information 350, based on a touch input applied to the first display region 1510a. For instance, the touch input may be a dragging-type of touch input applied from a left lower end of the first display region 1510a, in a diagonal direction.

The controller 1800 executes an application related to the fifth screen information 350 (e.g., a gallery application), based on a touch input applied to the first display region 1510a. Further, the controller controls the flexible display unit 1510 to lower transparency of the first display region 1510a, based on a touch range of the consecutive touch input. As the transparency is lowered, the third screen information 330, an execution screen of the executed application may be output clearly.

That is, a user may execute a related application and may control transparency of an execution screen, based on a touch input applied to the first display region 1510a.

Referring to FIG. 14B, the third screen information 330 may be output to the first display region 1510a, and the second display region 1510b may maintain a deactivated state.

The controller 1800 may execute an application related to the third screen information 330, based on a consecutive touch input applied to the second display region 1510b. Then, the controller 1800 may output an execution screen of the application to the second display region to the second display region 1510b. The touch input may be a dragging-type of touch input applied from an edge of the second display region 1510b, in a diagonal direction. For instance, the application may be a capturing application, and the execution screen may correspond to fifth screen information 350 including a preview screen.

The controller 1800 may control the flexible display unit 1510 to lower transparency of the fifth screen information 350, based on a touch range of the consecutive touch input.

That is, in a case where screen information is displayed on the first display region 1510a or the second display region 1510b, a related application may be executed by applying a touch input to another region, and an execution screen may be output with a desired transparency.

Figure 15A:
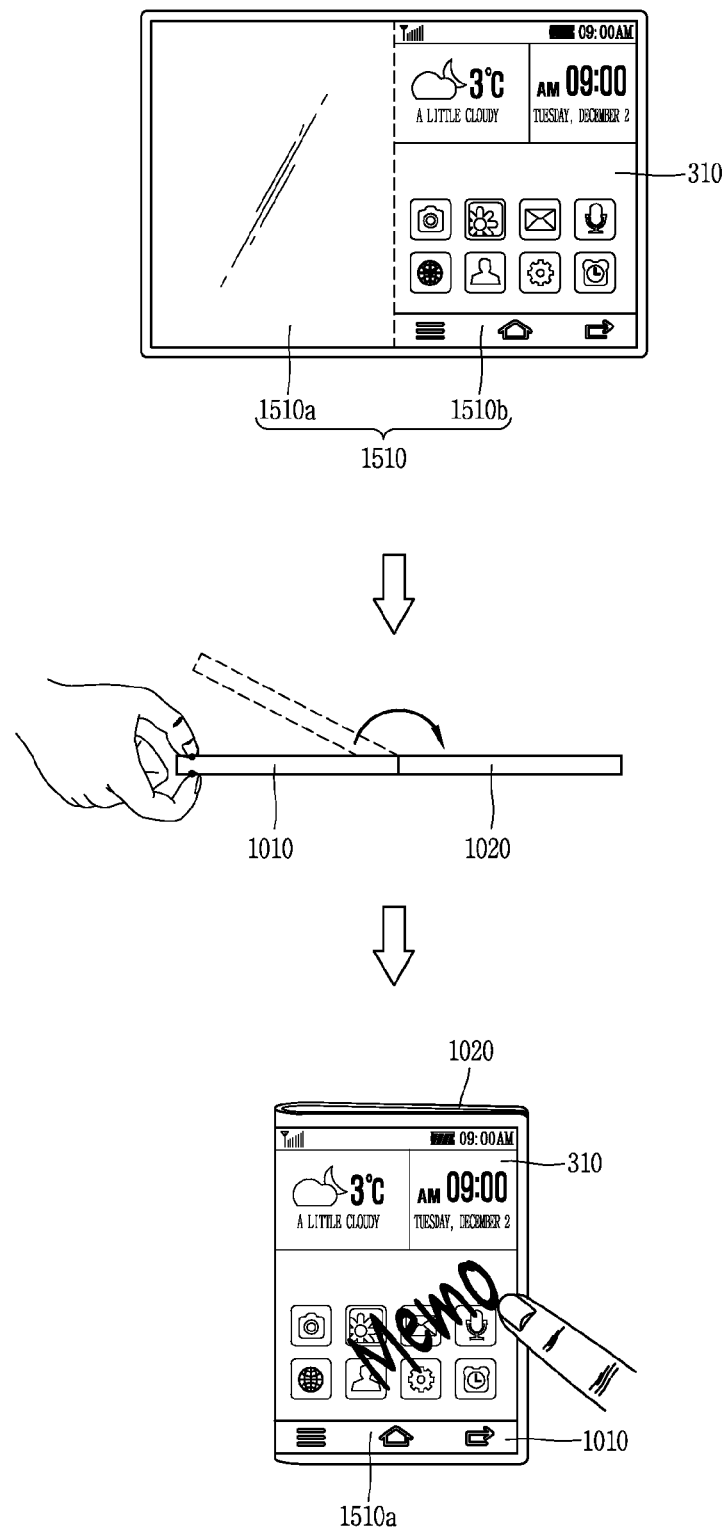
Figure 15C:
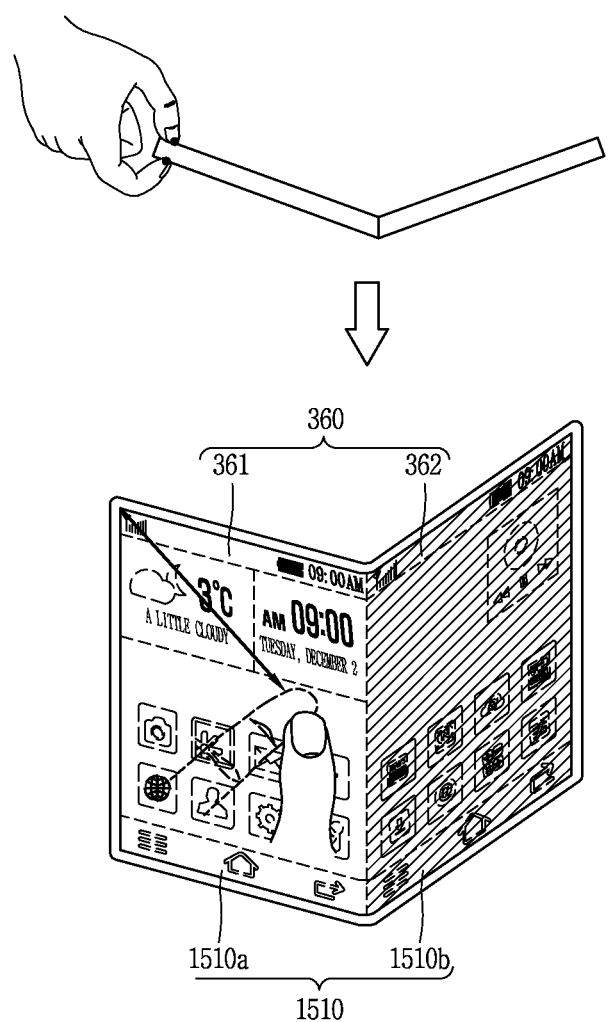

FIGS. 15A to 15C are conceptual views illustrating a control method, based on a touch input sensed by the touch sensor 1011.

Referring to FIG. 15A, in the state, the first screen information 310 is output to the second display region 1510b. The controller 1800 executes a memo function when the first state is converted into the second state, as a touch input sensed by the touch sensor 1011 and a front touch input sensed by the flexible display unit 1510 are applied.

That is, the controller 1800 controls the first display region 1510a into a transparent state so that the first screen information 310 can be recognized through the transmissive region, in the second state. The controller 1800 activates the touch sensor 1011 in the second state.

Once a user checks the first screen information 310 through the transmissive region in the second state, the user may apply a touch input to another surface of the first body. The controller 1800 controls the flexible display unit 1510 to output a writing image formed along a path of a touch input sensed by the touch sensor 1011. The writing image may be output to the first display region 1510a or the second display region 1510b.

Referring to FIG. 15B, in the first state, sixth screen information 360 including a first region 361 and a second region 362 consecutive to each other is output to the first display region 1510a and the second display region 1510b, respectively.

The controller 1800 increases transparency of the first region 361 based on a touch input applied to another surface of the first body 1010. The controller 1800 activates all of the touch sensor 1011 when a long touch input is sensed by the touch sensor 1011. The controller 1800 may control transparency of the first display region 1510a, based on a touch range of a consecutive touch input sensed by the touch sensor 1011.

FIG. 15C is a conceptual view illustrating a method of controlling transparency of the flexible display unit 1510 according to another embodiment of the present invention.

Referring to FIG. 15C, the flexible display unit 1510 outputs the sixth screen information 360 including the first region 361 and the second region 362 to the first display region 1510a and the second display region 1510b, respectively.

When touch points of a touch input sensed by the touch sensor 1011 and a front touch input are overlapped with each other, the controller 1800 controls transparency of the first and second display regions 1510a, 1510b, based on a touch range of the touch inputs. For instance, the controller 1800 may increase transparency of the sixth screen information 360, based on a touch input applied from a left upper edge of the flexible display unit 1510, in a diagonal direction.

In the preferred embodiments, a user may control transparency of the first and second display regions 1510a, 1510b in various manners, by applying a touch input.

Figure 16:
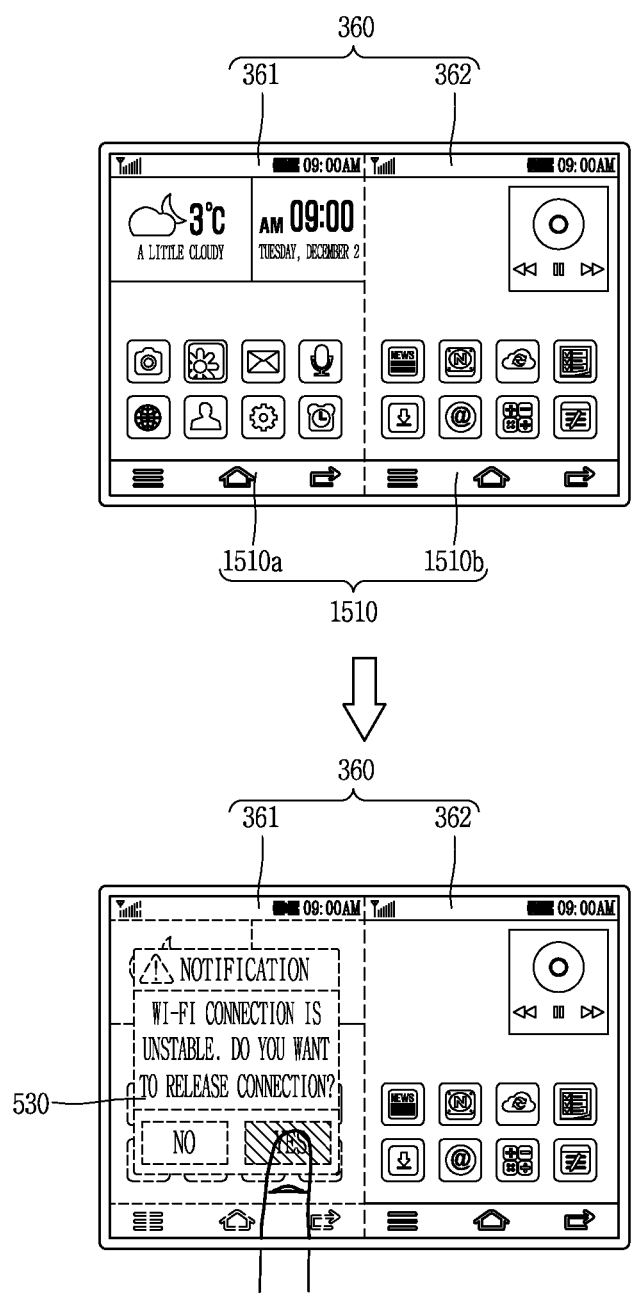
FIG. 16 is a conceptual view illustrating a method of controlling a flexible display unit when an event is received in a first state.

FIG. 16 is a conceptual view illustrating a method of controlling the flexible display unit 1510 when an event is received in the first state. The flexible display unit 1510 outputs the sixth screen information 360.

When an event is received, the controller 1800 controls the flexible display unit 1510 to increase transparency of the first display region 1510a, and to output third event information 530. The controller 1800 may activate the touch sensor 1011 when the third event information 530 is output.

The controller 1800 may select the third event information 530, based on a touch input sensed by the touch sensor 1011 or a touch input applied to the flexible display unit 1510.

Figure 17A:
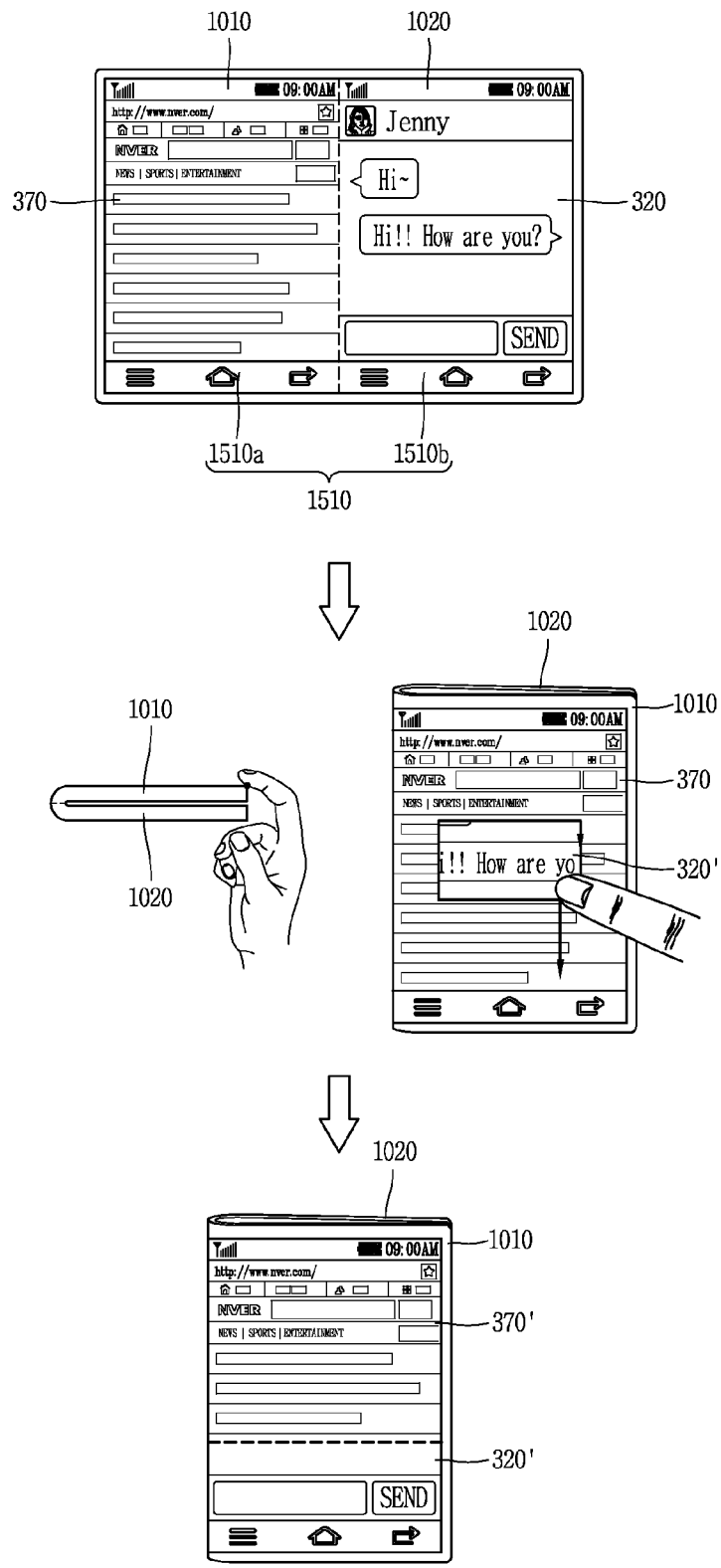
FIGS. 17A to 17C are conceptual views illustrating a method of controlling screen information output to a first display region and a second display region.
Figure 17B:
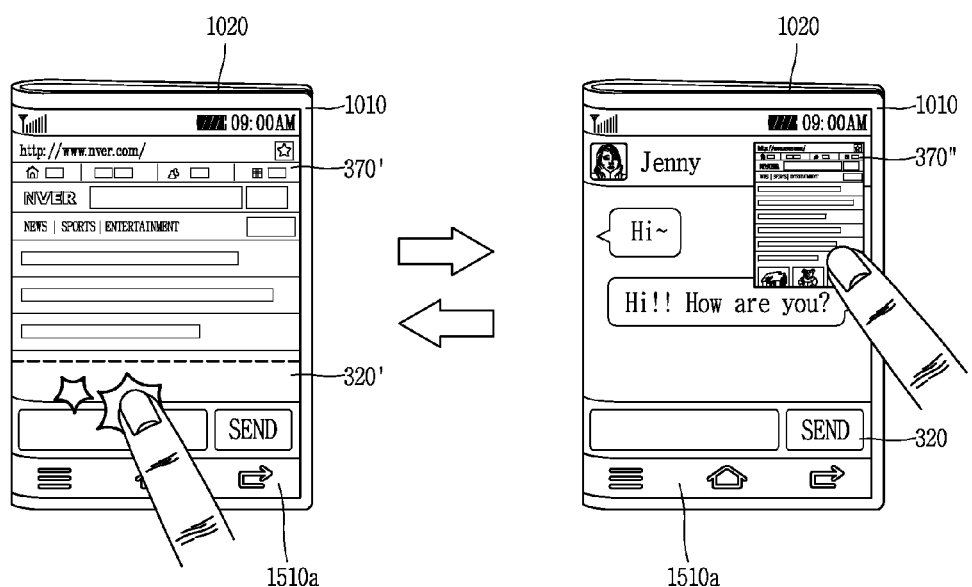
Figure 17C:
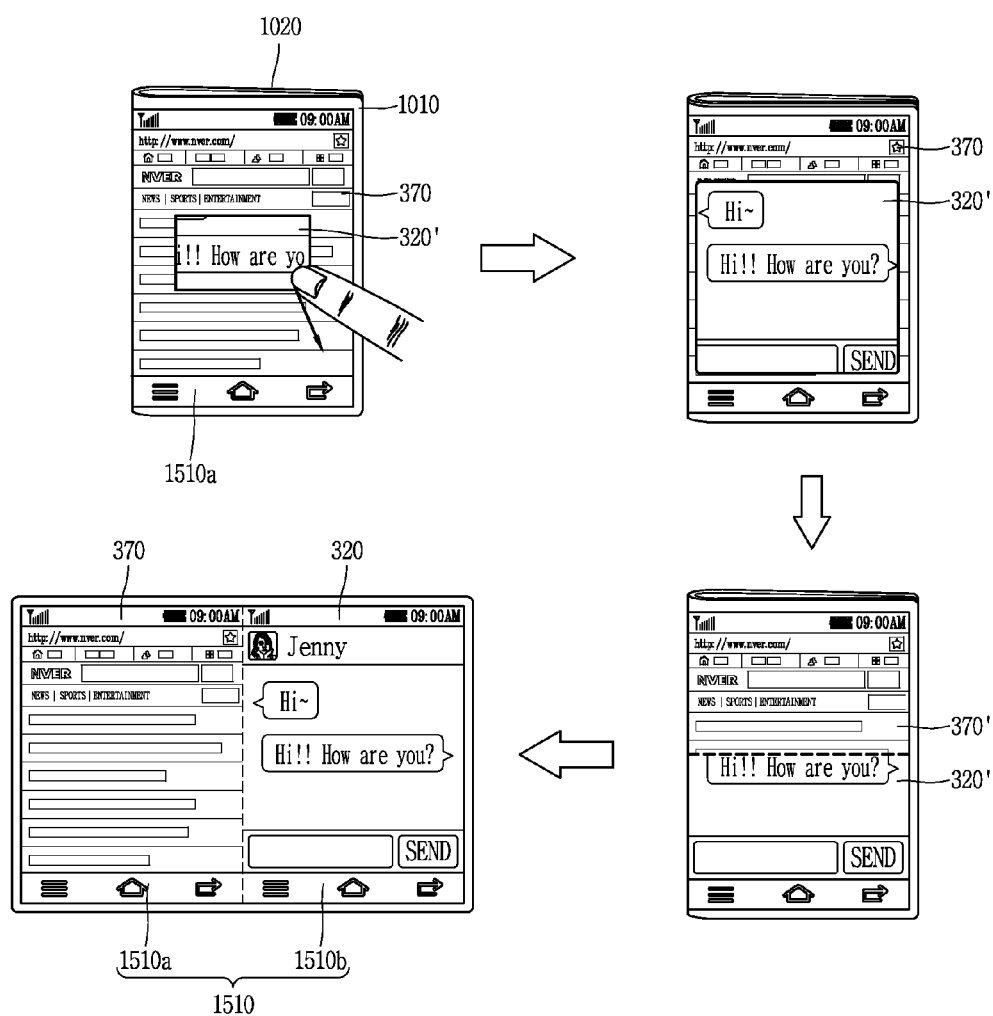

FIGS. 17A to 17C are conceptual views illustrating a method of controlling screen information output to the first display region and the second display region.

Referring to FIG. 17A, will be explained a method of controlling screen information based on a touch input applied to another surface of the first body 1010. In the first state, seventh screen information 370 and the second screen information 320 are output to the first display region 1510a and the second display region 1510b, respectively. When the mobile terminal is converted into the second state, the controller 1800 activates the touch sensor 1011.

The controller 1800 controls the flexible display unit 1510 to form one region as a transmissive region, based on a touch input sensed by the touch sensor 1011 in the second state. Also, the controller 1800 controls the flexible display unit 1510 to display part 320' of the second screen information 320 by the transparent region, in the second state. That is, the seventh screen information 370 is not displayed on the transmissive region. The touch input may be applied to form a closed loop.

The controller 1800 controls the flexible display unit 1510 to divide the first display region 1510a, based on a touch input which moves by being firstly applied to the transparent region. Also, the controller 1800 controls the flexible display unit 1510 to output part 370' of the seventh screen information 370 to one region, and to output the part 320' of the second screen information 320 to the remaining region.

Referring to FIG. 17B, if a touch input is applied to the divided first display region 1510a, a graphic image 370" corresponding to the seventh screen information 370 is output to the second screen information 320. The touch input may be a double tap type of touch input.

The controller 1800 may control the flexible display unit 1510 to output the seventh screen information 370 to the first display region 1510a, based on a touch input applied to the graphic image 370".

Referring to FIG. 17C, the controller 1800 forms a transparent region so that the part 320' of the second screen information can be seen, based on a consecutive touch input applied in the second state and forming a closed loop. The controller 1800 may extend the transparent region based on a touch input applied to the transparent region.

If a size of the transparent region becomes larger than a reference size, the controller 1800 controls the flexible display unit 1510 to output the part 370' of the seventh screen information 370 and the part 320' of the second screen information 320, by dividing the first display region 1510a.

In this instance, if the second state is converted into the first state, the controller 1800 controls the flexible display unit 1510 to output the seventh screen information 370 to the first display region 1510a, and to output the second screen information 320 to the second display region 1510b.

With such a configuration, a user can simultaneously check a plurality of screen information even in a folded state of the flexible display unit 1510.

FIG. 18 is a conceptual view illustrating a method of outputting reverse image information in the second state. If the second state is converted into the first state, the controller 1800 controls the third screen information 330 being output to be recognized through the transparent region, in a state where right and left sides of the third screen information 330 are switched from each other.

The controller 1800 outputs reverse image information 331 formed as the right and left sides of the third screen information 330 are switched from each other, to the first display region 1510a, based on a touch input applied to another surface of the first body 1010. The touch input may be a pinch-in type of touch input or a pinch-out type of touch input.

FIGS. 19A to 19E are conceptual views illustrating a mobile terminal including a transparent region on a second body according to another embodiment of the present invention.

Figure 19A:
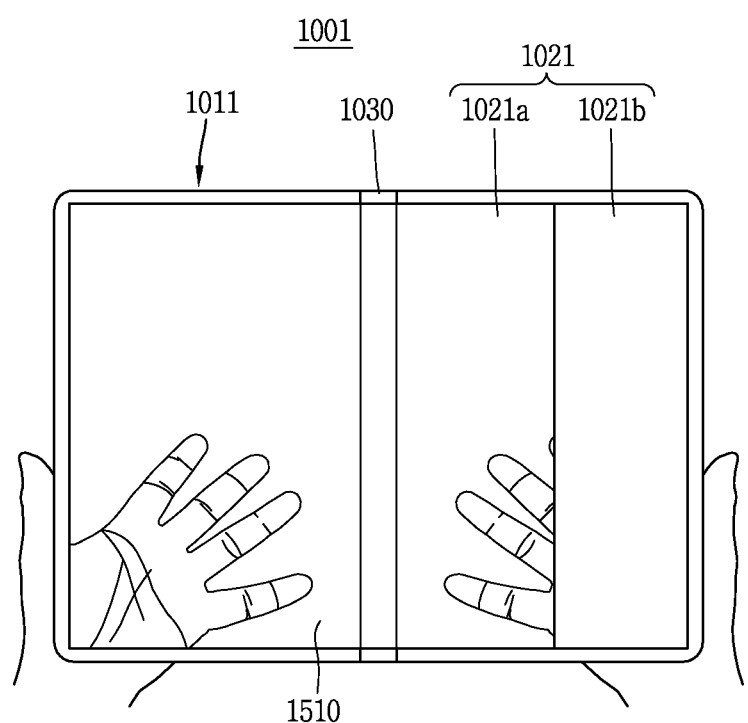
FIG. 19A is a conceptual view illustrating a mobile terminal including a transparent region on a second body according to another embodiment.

Referring to FIG. 19A, a mobile terminal 1001 according to another embodiment includes a first body 1011, a second body 1021, and a connection unit 1030. The first body 1011 and the connection unit 1030 are the same as the first body 1010 and the connection unit 1030 of the mobile terminal 1000 shown in FIG. 4A, and thus detailed explanations thereof will be omitted.

The second body 1021 of the mobile terminal 1001 according to another embodiment is divided into a first region 1021a formed as a transmissive region, and a second region 1021b formed as an opaque region. The transmissive region of the second body 1021 is formed to be consecutive from the first body 1011. The connection unit 1030 is preferably formed of a transmissive material.

Figure 19B:
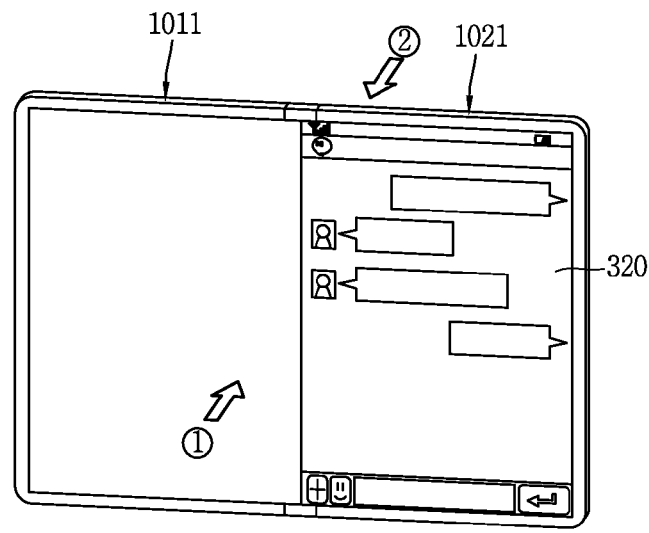
FIG. 19B(a) is a conceptual view illustrating a mobile terminal including a transparent region on a second body according to another embodiment.
Figure 19B:
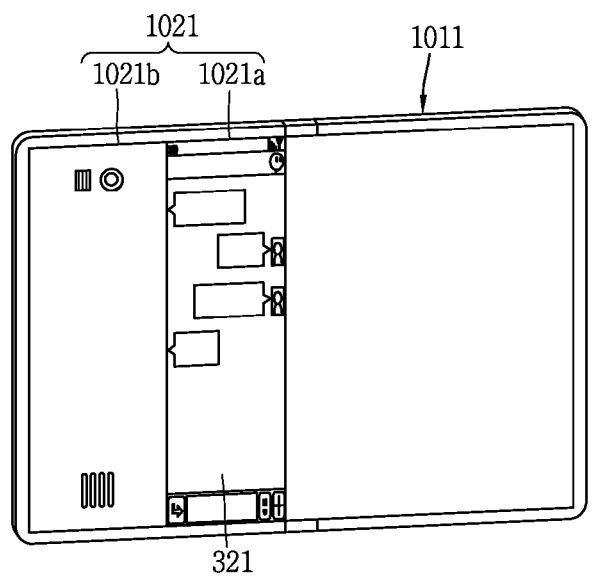
Figure 19B:
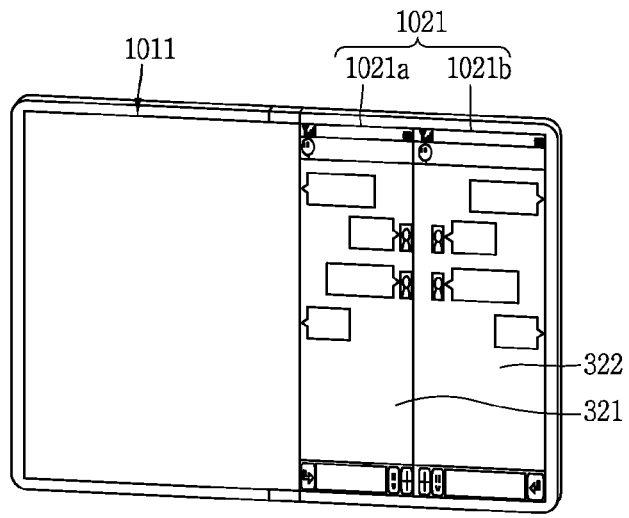

Referring to FIG. 19B, the controller 1800 displays the second screen information 320 on the first and second regions 1021a, 1021b. The controller 1800 controls the flexible display unit 1510 to output a divided image to each of the first and second regions 1021a, 1021b, based on a preset control command.

For instance, the preset control command may be formed by overturning the mobile terminal, by applying a touch input, or by changing an angle between the first and second bodies 1011, 1021.

FIG. 19B(b) illustrates a mobile terminal seen from direction □. The flexible display unit 1510 outputs second reverse image information 321 formed as the second screen information 320 is reversed with a changed ratio, to the first region 1021a of the display unit 1510. Accordingly, the second screen information 320 of which ratio in horizontal and vertical lengths has been changed can be recognized from the direction □ through the transmissive region.

FIG. 19B(c) illustrates a mobile terminal seen from direction □. The first region 1021a outputs the second reverse image information 321, and the second region 1021b outputs a second change screen 322 formed as a ratio of the second screen information 320 has been changed. In this embodiment, a user can simultaneously recognize images substantially equal to each other or including similar content, from opposite directions. The images may correspond to an execution screen including different content of the same application, etc.

Figure 19C:
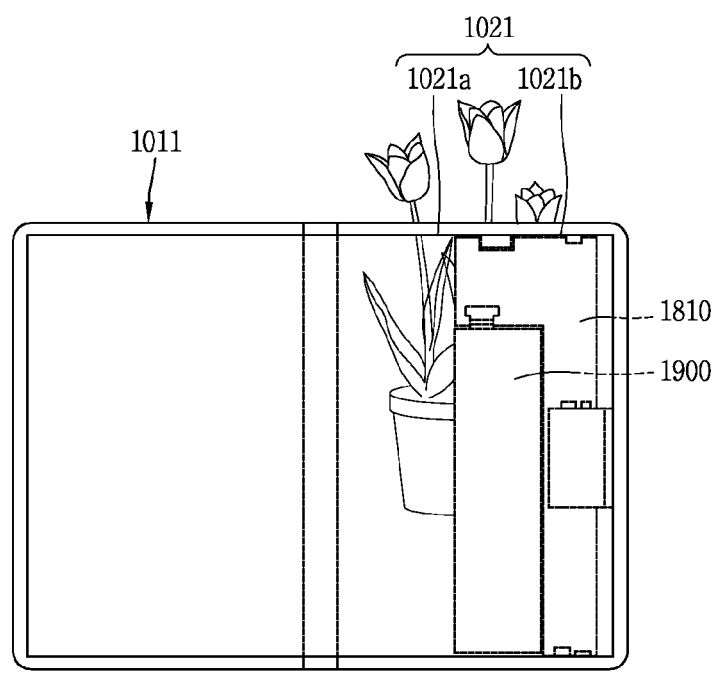
FIG. 19C is a conceptual view illustrating a mobile terminal including a transparent region on a second body according to another embodiment.

FIG. 19C is a conceptual view illustrating an arrangement structure of components of the mobile terminal shown in FIG. 19A.

Referring to FIG. 19C, the printed circuit board (PCB) 1810 for mounting electronic components, and the power supply unit 1900 are disposed on one region of the second body 1021, the one region corresponding to the second region 1021b.

Figure 19D:
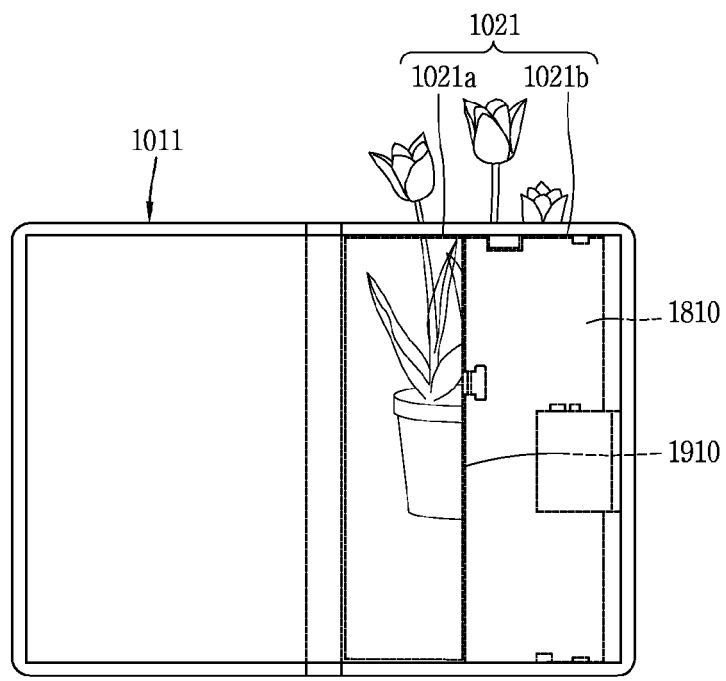
FIG. 19D is a conceptual view illustrating a mobile terminal including a transparent region on a second body according to another embodiment.

Referring to FIG. 19D, the mobile terminal 1000 includes a power supply unit 1910 formed of a transmissive material. Preferably, the power supply unit 1910 is formed to have a size corresponding to or larger than that of the first region 1021a. Accordingly, an image displayed by the first region 1021a may be output through the power supply unit 1910 formed of a transmissive material.

Figure 19E:
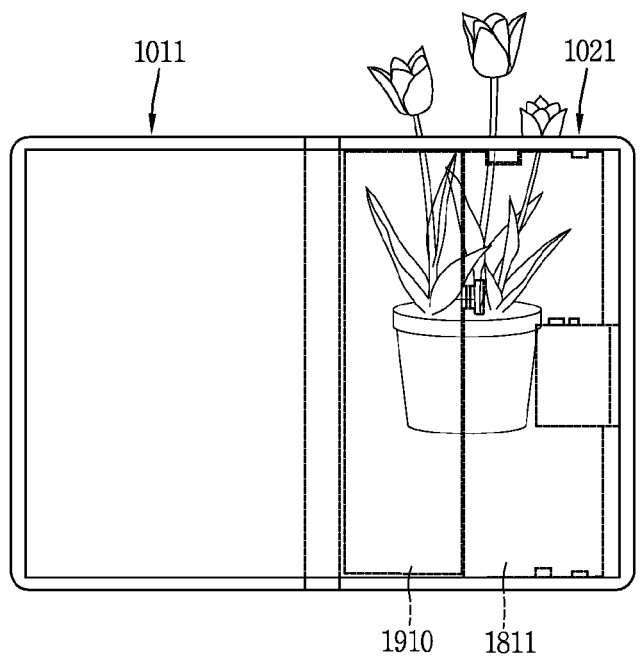
FIG. 19E is a conceptual view illustrating a mobile terminal including a transparent region on a second body according to another embodiment.

Referring to FIG. 19E, electronic components of the mobile terminal, a printed circuit board (PCB) 1811 and the power supply unit 1910 may be formed of a transmissive material. Accordingly, the PCB 1811 and the electronic components formed of a transmissive material may be disposed at the second body 1021 corresponding to the first region 1021a (transparent region).

Since at least part of the components disposed on the second body 1021 is formed of a transmissive material, the transmissive region can be extended and the mobile terminal can have a minimized thickness.

Figure 20A:
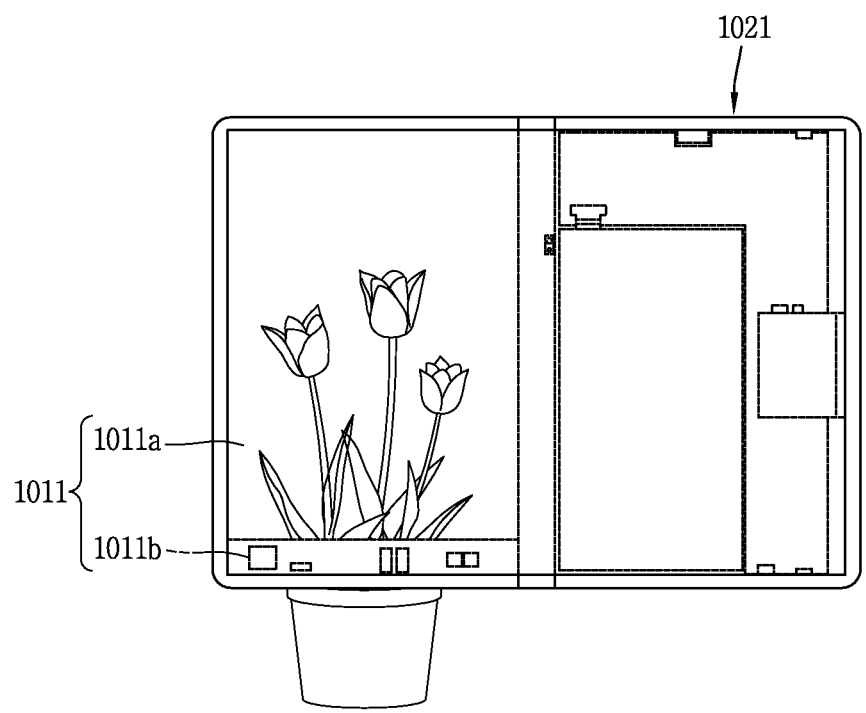
FIGS. 20A to 20C are conceptual views illustrating a mobile terminal provided with a first body including an opaque region according to another embodiment.
Figure 20B:
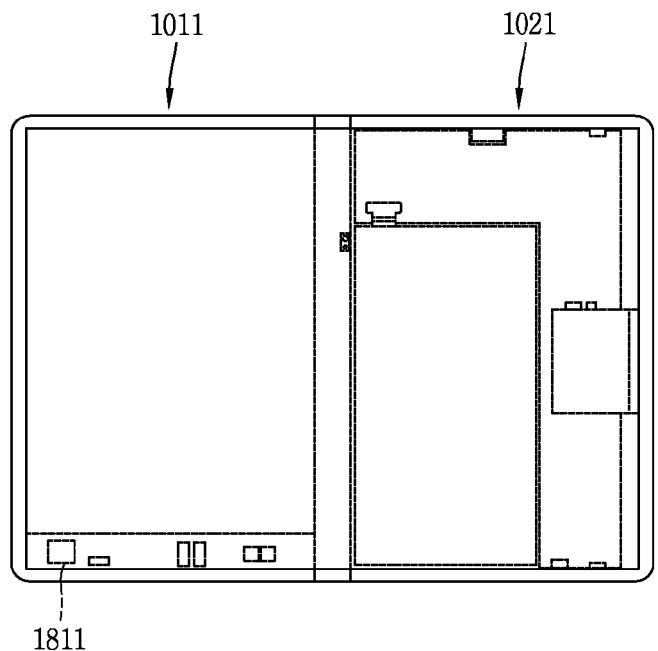
Figure 20C:
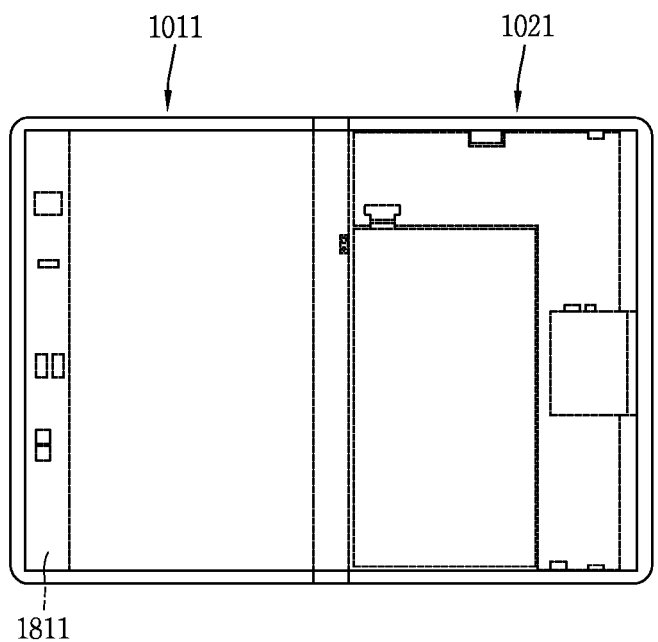

FIGS. 20A to 20C are conceptual views illustrating a mobile terminal provided with a first body including an opaque region according to another embodiment of the present invention.

Referring to FIG. 20A, the first body 1011 may be divided into a first region 1011a formed as a transmissive region, and a second region 1011b formed as an opaque region. The second region 1011b may be formed at one end of the first body 1011, with a preset width. A PCB and electronic components may be disposed at the second region 1011b. Since part of the PCB and the electronic components is formed at the first body 1011, the first body 1011 may have the same thickness as a second body 1012.

Referring to FIG. 20B, the PCB 1811 formed of a transmissive material may be disposed at a region adjacent to an edge of the first body 1011.

Since electronic components formed of a transmissive material are disposed at the transmissive region, an inner space of the mobile terminal can be obtained and the mobile terminal can have a minimized thickness.

Figure 21A:
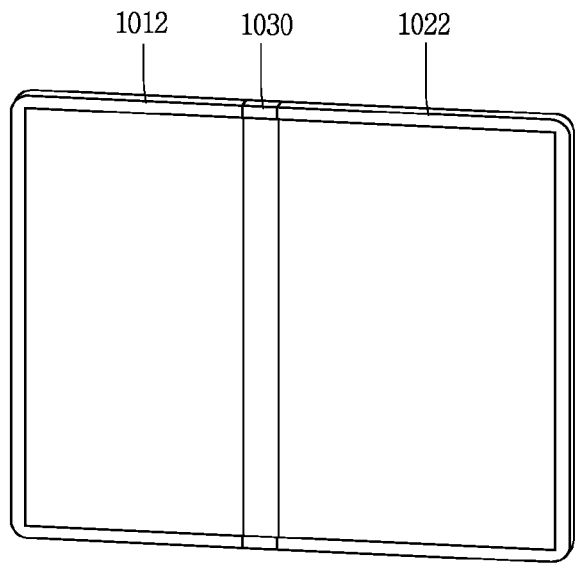
FIGS. 21A and 21B are conceptual views illustrating a mobile terminal according to another embodiment.
Figure 21B:
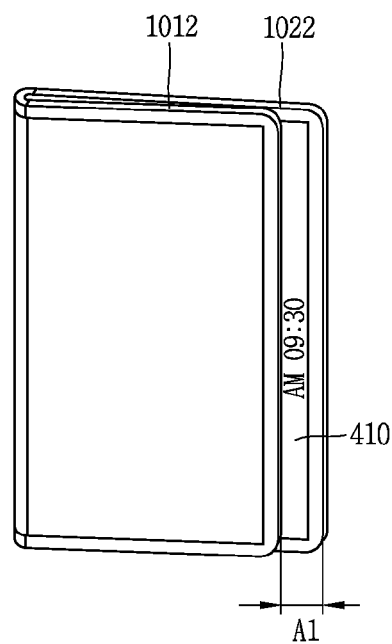

FIGS. 21A and 21B are conceptual views illustrating a mobile terminal according to another embodiment of the present invention. FIG. 21A illustrates a mobile terminal 1002 in the first state, and FIG. 21B illustrates the mobile terminal 1002 in the second state.

The mobile terminal 1002 according to this embodiment includes a first body 1012, a second body 1022, and a connection unit 1030. The mobile terminal 1002 has the same components as the mobile terminal 1000 shown in FIG. 4A except for a size of the first and second bodies 1012, 1022, and thus detailed explanations thereof will be omitted. At least one region of the first body 1012 is formed as a transmissive region, and the flexible display unit 1510 is disposed on one surface of the first and second bodies 1012, 1022.

In this embodiment, the second body 1022 is formed to have a larger size than the first body 1012. As shown in FIG. 21A, a horizontal length of the second body 1022 is longer than that of the first body 1012.

If the first and second bodies 1012, 1022 are overlapped with each other in the second state, the second body 1022 includes a remaining region (A1) where the second body 1022 is not overlapped with the first body 1012. The flexible display unit 1510 may output a preset first image 410 to the remaining region (A1). For instance, the first image 410 may include information on a current time, a current date and a received event.

Figure 22A:
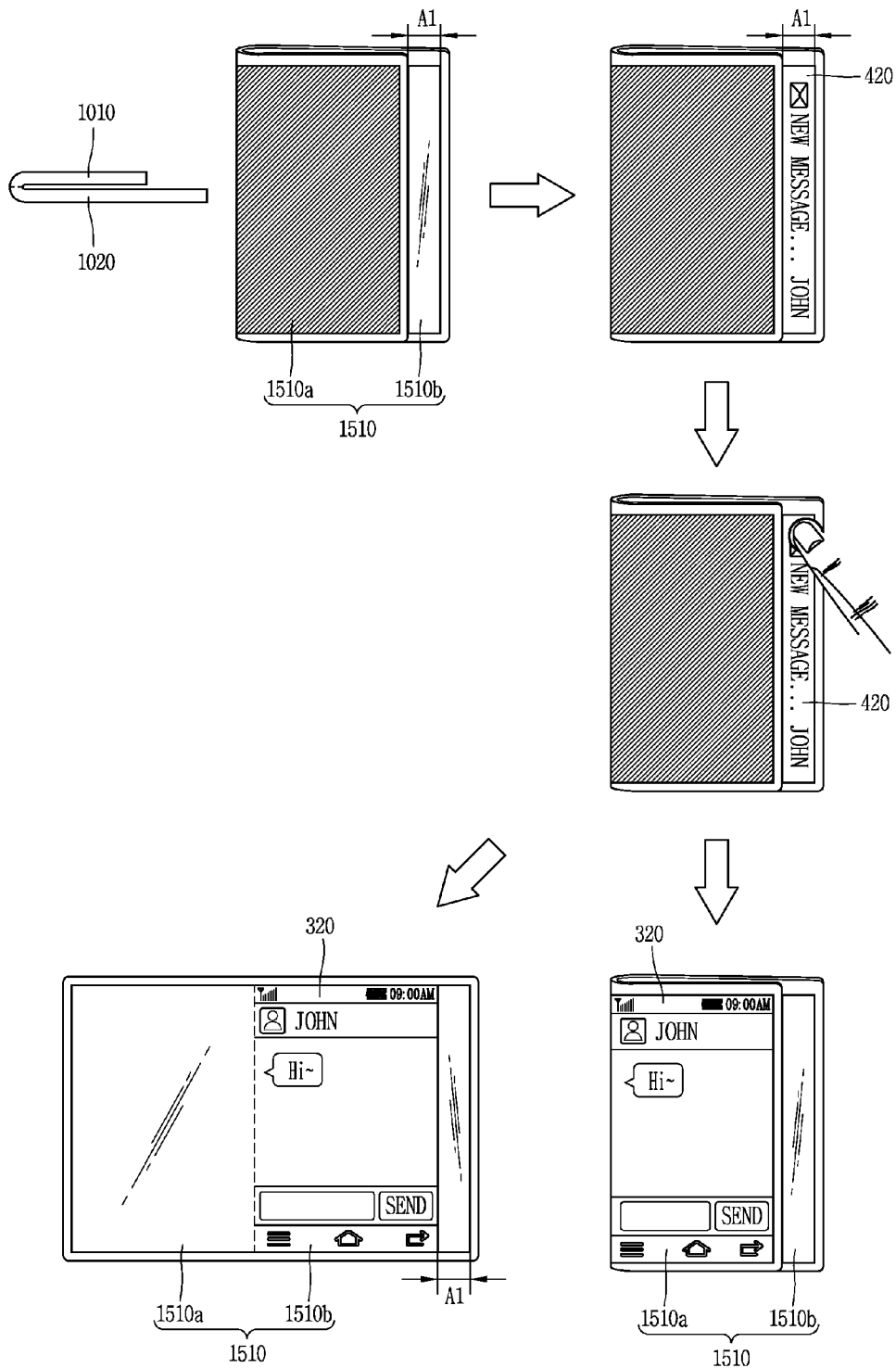
Figure 22C:
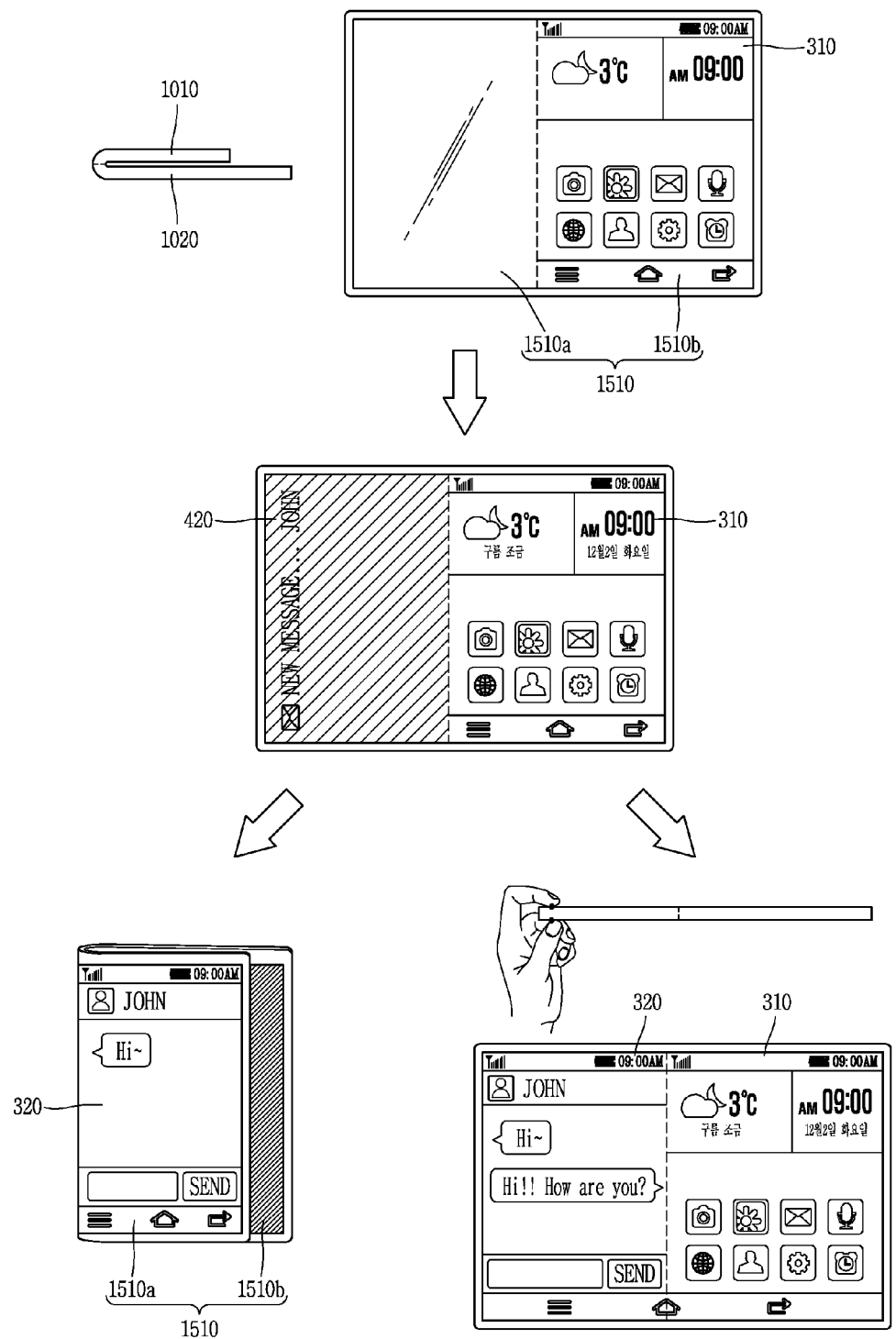

FIGS. 22A to 22C are conceptual views illustrating a method of controlling a mobile terminal having bodies of different sizes.

FIGS. 22A to 22C illustrate an embodiment where the second body 1020 is formed to have a larger size than the first body 1010. In the second state, the second body 1020 includes a first remaining region (A1) where the second body 1020 is not overlapped with the first body 1010.

If an event is received in the second state, the controller 1800 controls the flexible display unit 1510 to output an event image 420 to the first remaining region (A1).

The controller 1800 controls the flexible display unit 1510 to output the second screen information 320 related to the event to the first display region 1510a, based on a touch input applied to the first remaining region (A1) in the second state.

In a case where a touch input is applied to the first remaining region (A1), if the second state is converted into the first state, the controller 1800 may control the flexible display unit 1510 to output the second screen information 320 to the second display region 1510b.

Referring to FIG. 22B, the first screen information 310 is output to the second display region 1510b in the first state. When the event is received, the controller 1800 controls the flexible display unit 1510 to output the event image 420 to the first display region 1510a.

The controller 1800 controls the flexible display unit 1510 to change the first screen information 310 into the second screen information 320 related to the event, based on a touch input applied to the second display region 1510b from the first display region 1510a. In this instance, no image may be output to the first display region 1510a, or the first screen information 310 may be output to the first display region 1510a.

Referring to FIG. 22C, when the first screen information 310 is output to the second display region 1510b in the first state, the controller 1800 controls the flexible display unit 1510 to output the event image 420 related to the received event to the first display region 1510a.

The controller 1800 may output the second screen information 320 related to the event, when both a touch input sensed by the touch sensor 1011 and a front touch input are applied to the first display region 1510a in the first state.

For instance, when the first state is converted into the second state, the controller 1800 controls the flexible display unit 1510 to output the second screen information 320 to the first display region 1510a. On the other hand, if the first state is maintained, the controller 1800 controls the flexible display unit 1510 to output the second screen information 320 to the first display region 1510a, and to output the first screen information 310 to the second display region 1510b.

With such a configuration, when an event is received, the event is output to the remaining region of the second body. This can allow a user to be provided with information on the event more easily.

Figure 23A:
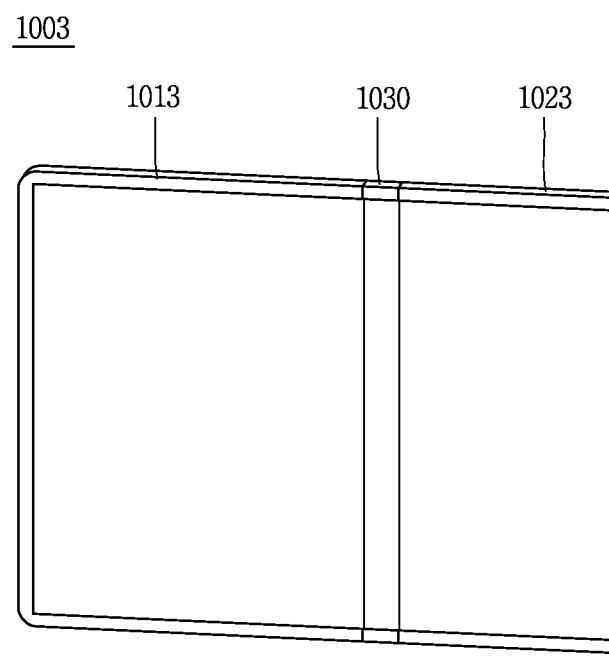
FIGS. 23A and 23B are conceptual views illustrating a mobile terminal according to another embodiment.
Figure 23B:
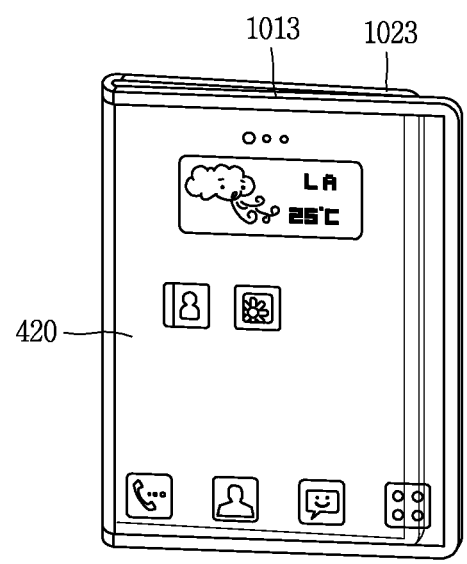

FIGS. 23A and 23B are conceptual views illustrating a mobile terminal according to another embodiment of the present invention. FIG. 23A illustrates a mobile terminal 1003 of the first state, and FIG. 23B illustrates the mobile terminal 1003 of the second state.

The mobile terminal 1003 has the same components as the mobile terminal 1000 shown in FIG. 4A except for a size of the first and second bodies 1013, 1023, and thus detailed explanations thereof will be omitted. At least one region of the first body 1013 is formed as a transmissive region, and the flexible display unit 1510 is disposed on one surface of the first and second bodies 1013, 1023.

In this embodiment, the first body 1013 is formed to have a larger size than the second body 1023. As shown in FIG. 23A, a horizontal length of the first body 1013 is longer than that of the second body 1023.

Figure 24A:
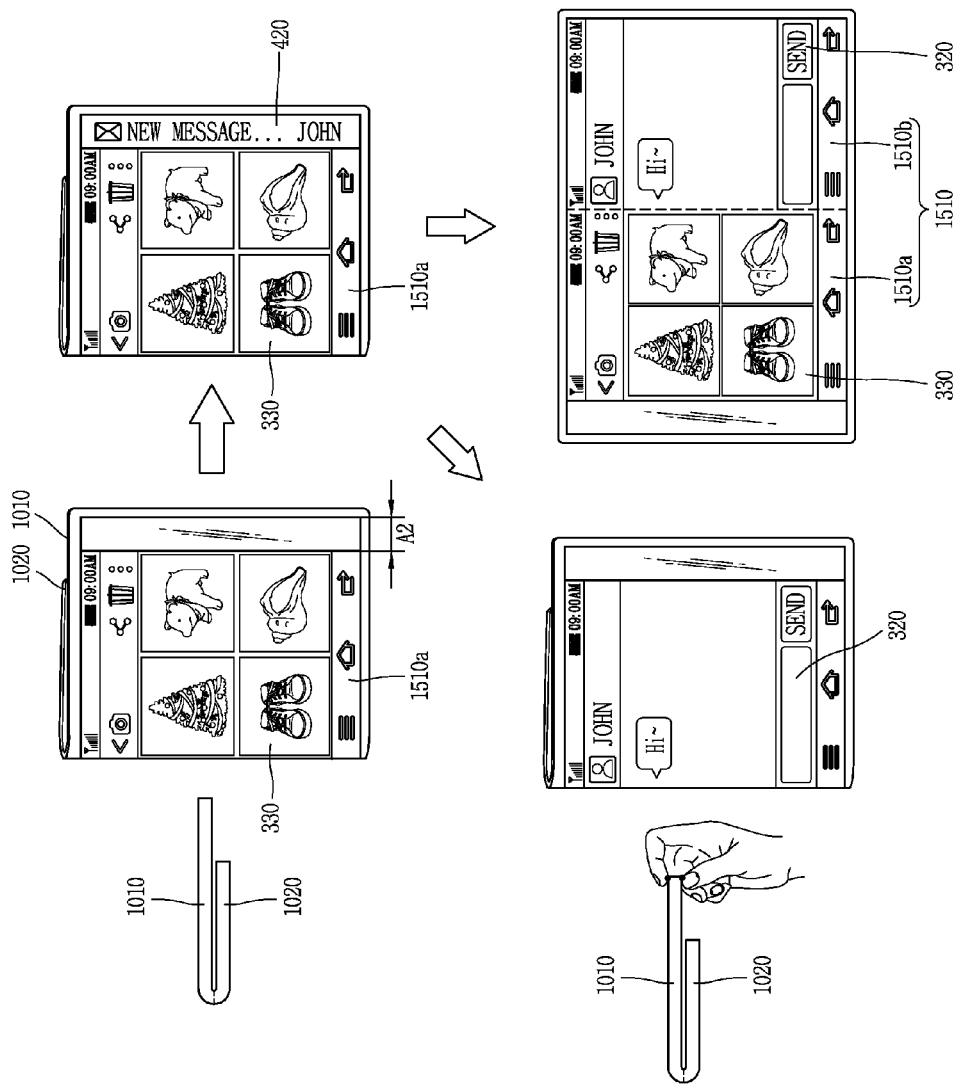
FIGS. 24A and 24B are conceptual views illustrating a method of controlling a mobile terminal having bodies of different sizes.
Figure 24B:
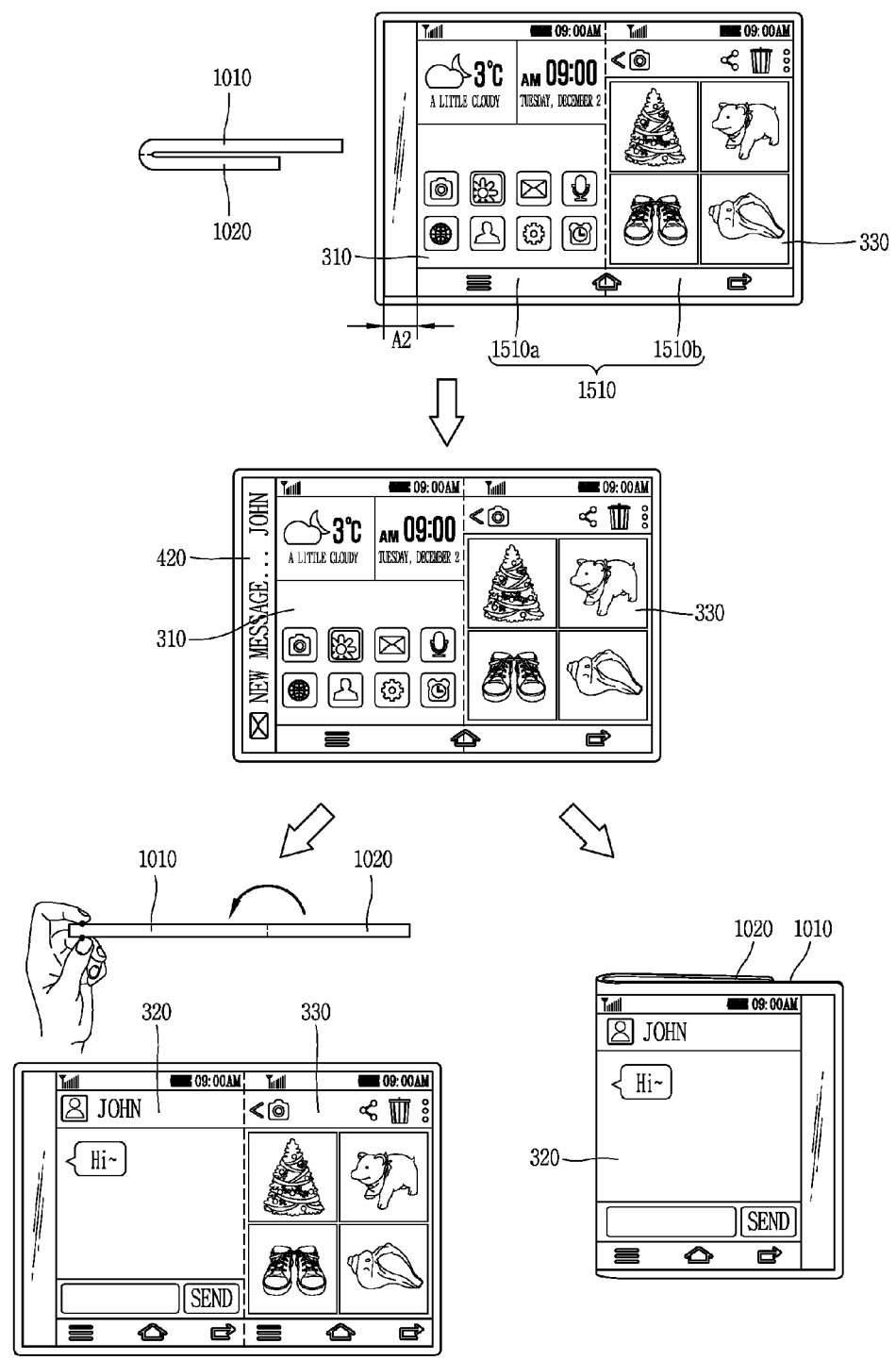

FIGS. 24A and 24B are conceptual views illustrating a method of controlling a mobile terminal having bodies of different sizes. FIGS. 24A and 24B illustrate a control method when the first body 1010 is larger than the second body 1020. The first body 1010 according to this embodiment includes a second remaining region (A2) where the first body 1010 is not overlapped with the second body 1020.

Referring to FIG. 24A, the third screen information 330 is output to the first display region 1510a in the second state. When an event is received, the controller 1800 controls the flexible display unit 1510 to output the event image 420 to the second remaining region (A2).

The controller 1800 controls the flexible display unit 1510 to output the second screen information 320 to the first display region 1510a, based on a touch input sensed by the touch sensor 1011 disposed on the second remaining region (A2), and based on a front touch input sensed by the flexible display unit 1510.

If the second state is converted into the first state, the controller 1800 controls the flexible display unit 1510 to output the third screen information 330 to the first display region 1510a, and to output the second screen information 320 related to the event to the second display region 1510b.

Referring to FIG. 24B, the flexible display unit 1510 outputs the first screen information 310 to the first display region 1510a, and outputs the third screen information 330 to the second display region 1510b.

When the event is received, the controller 1800 outputs the event image 420 to the second remaining region (A2). The controller 1800 controls the flexible display unit 1510 to output the second screen information 320 related to the event to the first display region 1510a, based on the touch input applied to the second remaining region (A2), and the front touch input.

When the first state is converted into the second state, the controller 1800 controls the flexible display unit 1510 to output the second screen information 320 to the first display region 1510a.

Figure 25A:
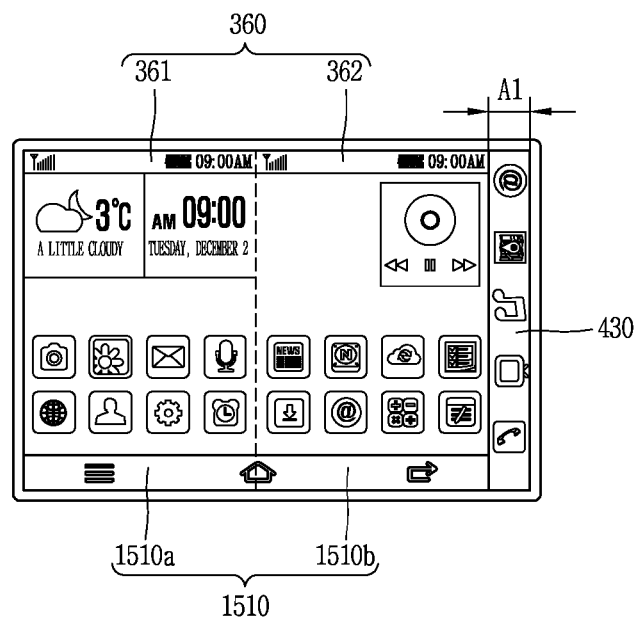
FIGS. 25A to 25C are conceptual views illustrating a method of outputting a menu image to the remaining region.
Figure 25B:
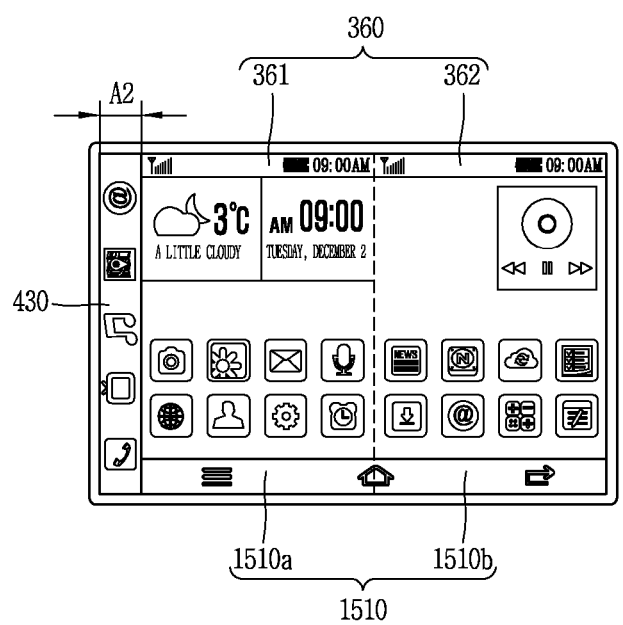
Figure 25C:
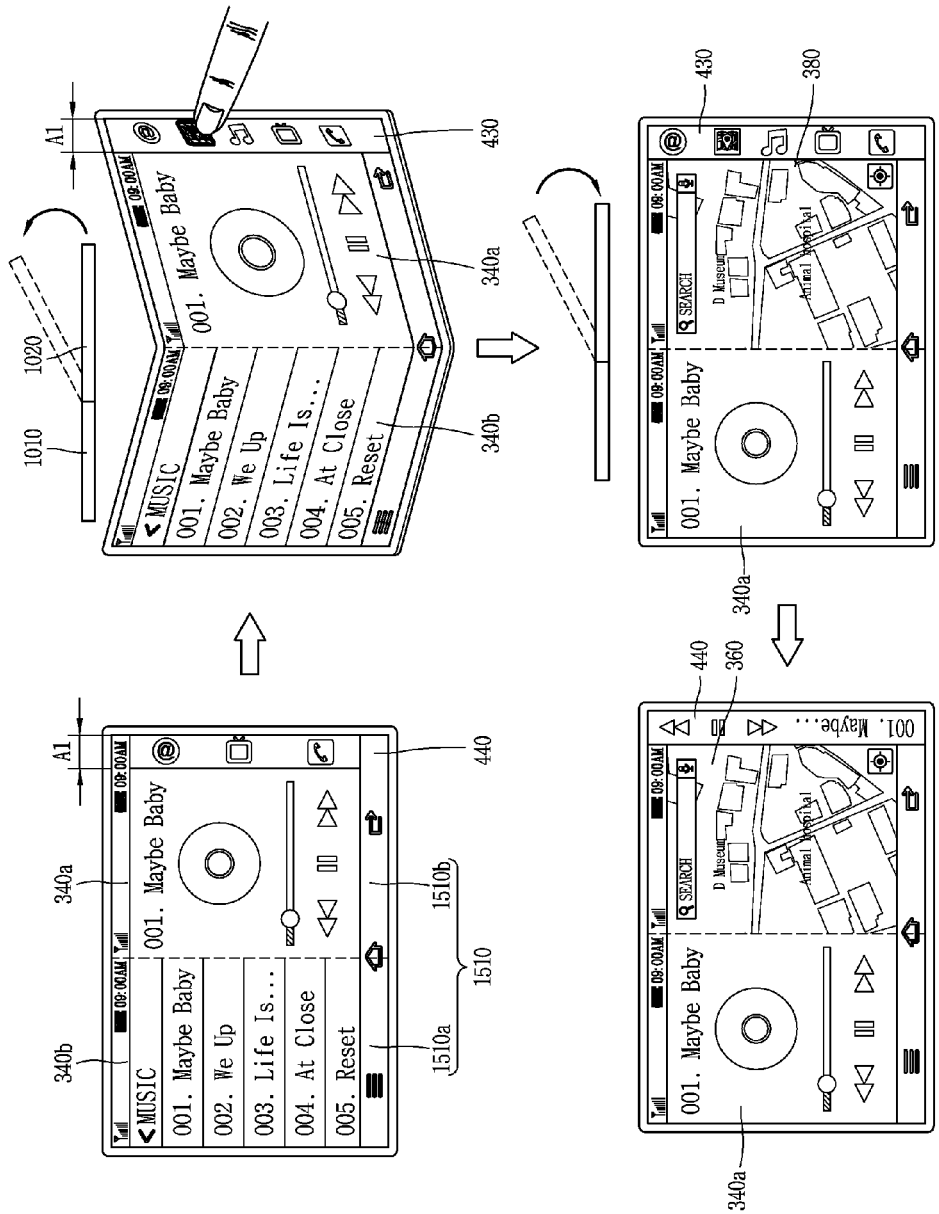

FIGS. 25A to 25C are conceptual views illustrating a method of outputting a menu image to the remaining region.

Referring to FIGS. 25A and 25B, a menu image 430 including a plurality of icons is output to the first and second remaining regions (A1, A2). The menu image 430 may include icons corresponding to an application set by a user, an application frequently used, and an application being currently executed.

Referring to FIG. 25C, the controller 1800 outputs the fourth screen information 340a of a specific application to the second display region 1510b in the first state, and outputs the list screen 340b related to the fourth screen information 340a to the first display region 1510a. The fourth screen information 340a may be extended to the first remaining region (A1).

The controller 1800 controls the flexible display unit 1510 to output the menu image 430 to the first remaining region (A1), based on change of an angle between the first and second bodies 1010, 1020.

The controller 1800 may execute a selected application based on a touch input applied to the menu image 430. The controller 1800 controls the flexible display unit 1510 to output eighth screen information 380, an execution screen of the selected application, to the second display region 1510b. Thus, the fourth screen information 340a is output to the first display region 1510a.

When the first and second bodies 1010, 1020 are converted into the first state, the controller 1800 outputs the fourth screen information 340a to the first display region 1510a, and outputs the eighth screen information 380 to the second display region 1510b. Also, the controller 1800 outputs control icons 440 for controlling the fourth screen information 340a, to the first remaining region (A1).

With such a configuration, a user may execute a specific application or control an executed application, by outputting a desired image to the remaining region by transformation of the body.

Figure 26A:
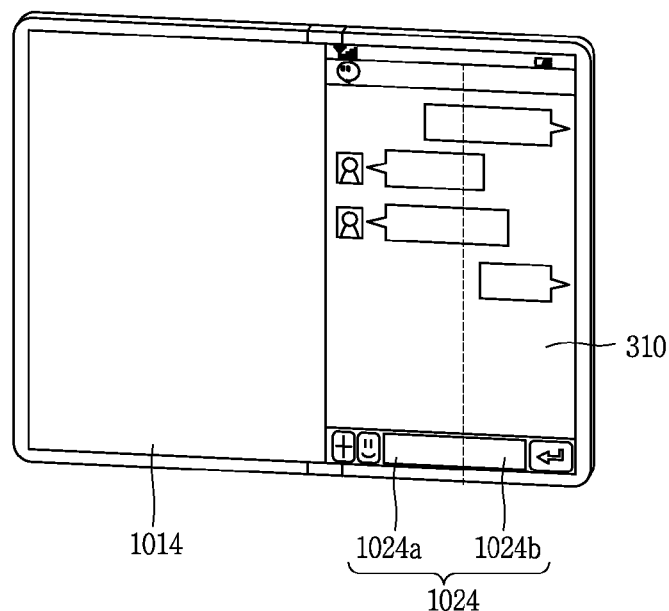
FIGS. 26A and 26B are conceptual views illustrating a mobile terminal according to another embodiment.
Figure 26B:
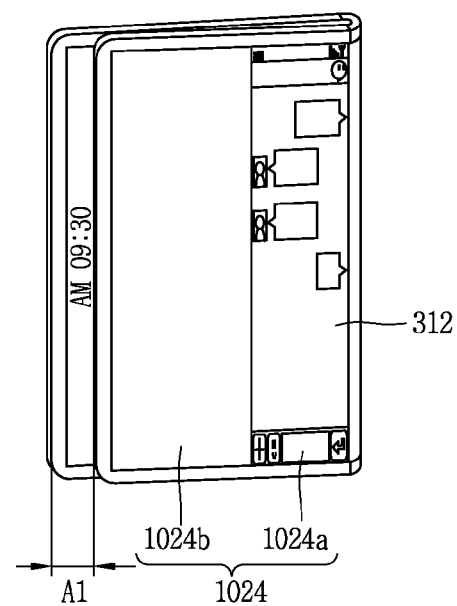

FIGS. 26A and 26B are conceptual views illustrating a mobile terminal according to another embodiment of the present invention. FIG. 26A illustrates a mobile terminal 1004 in the first state, and FIG. 21B illustrates the mobile terminal 1004 in the second state. The mobile terminal 1004 has the same components as the mobile terminal 1000 shown in FIG. 19A except for a size of first and second bodies 1014, 1024, and thus detailed explanations thereof will be omitted. The first body 1014 is formed to have a larger size than the second body 1024. In the second state, the first body 1014 includes a first remaining region (A1) where the first body 1014 is not overlapped with the second body 1024.

Figure 27:
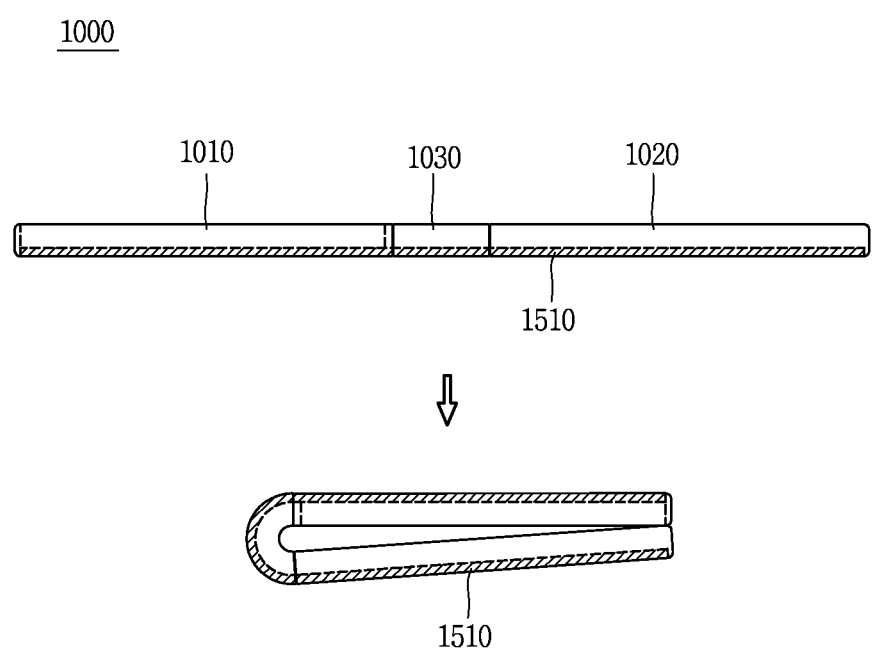
FIG. 27 is a conceptual view illustrating a mobile terminal folded so that a flexible display unit can be exposed to outside.

FIG. 27 is a conceptual view illustrating a mobile terminal folded so that the flexible display unit 1510 can be exposed to outside. By the connection unit 1030, the first and second bodies 1010, 1020 are foldable on each other so that the flexible display unit 1510 disposed on one surface of the first and second bodies 1010, 1020 can be partially exposed to outside.

The mobile terminal 1000 according to this embodiment includes the first and second bodies 1010, 1020, and the connection unit 1030 for connecting the first and second bodies 1010, 1020 to each other. The connection unit 1030 may include the same structure or a similar structure as/to the connection unit shown in FIGS. 4C, 5A and 5B.

The controller 1800 may control transparency of the flexible display unit 1510 in a state where the first and second bodies 1010, 1020 are folded on each other in an overlapped manner. If a transmissive region is formed at the first and second bodies 1010, 1020, the controller 1800 may receive a touch input sensed by the touch sensor 1011 on the first body 1010 in the folded state. In this instance, the controller 1800 may control transparency of the flexible display unit 1510 so that an object (a finger) which applies the touch input can be recognized.

The controller 1800 may selectively activate the first and second display regions 1510a, 1510b disposed on the first and second bodies 1010, 1020, based on a state of the mobile terminal 1000. The state of the mobile terminal 1000 may be a state where a front surface of a rear surface of the body is laid on a floor surface, a state where a side surface of the body is laid on a floor surface, a state where the mobile terminal is held by a user, etc. The state may be sensed by the sensor unit 1400 disposed in the mobile terminal.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 1800 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a body including a first body, a second body, and a connection portion located between the first body and the second body, an angle between the first and second bodies is changeable from a first angle by transformation of the connection portion,
wherein the first body and the second body are substantially coplanar, to a second angle,
wherein the first body and the second body are folded onto each other, and
wherein the first body includes a transmissive region;
a transparent flexible display with a touch sensor mounted onto a first surface and spanning at least a portion of both the first body and the second body;
a sensor that detects when the mobile terminal is in a first state,
wherein the angle between the first and second bodies is greater than a predetermined angular value, and when the mobile terminal is in a second state, and
wherein the angle between the first and second bodies is less than or equal to the predetermined angular value;

a second touch sensor formed on a second surface of the first body opposite the first surface on which the transparent flexible display is mounted; and a controller configured to:
- cause the transparent flexible display to display screen information;
- increase the transparency of the transmissive region when the angle between the first and second bodies is decreased as detected by the sensor;
- activate the second touch sensor based on the transparency of the transmissive region and cause the transparent flexible display to display at least one image based on a first touch input applied to the second touch sensor;
- receive a touch input, via the second touch sensor, overlapped with the screen information; and
- deactivate the second touch sensor when the angle between the first and second bodies is increased and larger than a preset angle as detected by the sensor.

2. The mobile terminal of claim 1, wherein the transparent flexible display comprises:
a polymer dispersed liquid crystal layer, the transparency of which is changeable when an electric signal is applied thereto.

3. The mobile terminal of claim 1, wherein the controller is further configured to control the transparent flexible display to display a reverse image of the screen information through the transmissive region when the mobile terminal is in the second state.

4. The mobile terminal of claim 1, wherein the controller is further configured to control the transparent flexible display to display a pop-up image related to the displayed screen information in response to a touch input applied to the touch sensor.

5. The mobile terminal of claim 1, wherein the transparent flexible display is divided into a first display region corresponding to the first body and a second display region corresponding to the second body.

6. The mobile terminal of claim 1, wherein the controller is further configured to control the transparent flexible display to delete the image in response to a touch input applied to the touch sensor over the image while another touch input is applied to the transparent flexible display over the image.

7. The mobile terminal of claim 1, wherein the controller is further configured to control the transparent flexible display to display a pop-up image related to the at least one image in response to a first touch input applied to the touch sensor over the image, and further configured to control the pop-up image based on another touch input applied to the transparent flexible display over the pop-up image.

8. The mobile terminal of claim 1, wherein the transparent flexible display is divided into a first display region corresponding to the first body, and a second display region corresponding to the second body, and
wherein the controller is further configured to control the transparent flexible display to display a reverse image of the displayed screen information through the transmissive region when the angle between the first and second bodies is less than 90 degrees.

9. The mobile terminal of claim 8, wherein the controller is further configured to control the transparent flexible display to display the reverse information in response to a touch input applied to the transparent flexible display and another touch input applied to the second touch sensor.

10. The mobile terminal of claim 9, wherein the mobile terminal transitions from the first state to the second state when the angle between the first body and the second body becomes less than 90 degrees.

11. The mobile terminal of claim 1, wherein the controller is further configured to control the transparency of the displayed screen information based on a preset control command.

12. The mobile terminal of claim 11, wherein the control command is generated in response to an event, wherein the controller is further configured to control the transparent flexible display to output an image related to the event and to increase the transparency of the image while decreasing the transparency of remaining information of the screen information, and wherein the event includes at least one of success or failure of a user authentication, message reception, call signal reception, a missed call, an alarm, a schedule notice, an email reception, information reception through an application.

13. The mobile terminal of claim 12, wherein the controller is further configured to control the transparent flexible display to display information related to the event in response to a touch input applied to the second touch sensor over the image, and wherein the information related to the event is displayed with a preset transparency.

14. The mobile terminal of claim 1, wherein the transparent flexible display is divided into a first display region corresponding to the first body and a second display region corresponding to the second body, and when the screen information displayed in the first display region is in a form of a list of elements, the controller is further configured to control the transparent flexible display to increase the transparency of a region corresponding to at least one element of the list when a touch input is applied to the second touch sensor over the region corresponding to the at least one element.

15. The mobile terminal of claim 1, wherein the transparent flexible display is divided into a first display region corresponding to the first body and a second display region corresponding to the second body, and
wherein the controller is further configured to control the transparent flexible display to display an image on the first display region based on a change in the angle between the first body and the second body.

16. The mobile terminal of claim 15, wherein the image is a home screen page including an icon corresponding to an application.

17. The mobile terminal of claim 15, wherein the controller is further configured to control the transparent flexible display to display an execution screen of the application on the second display region in response to a touch input applied to the icon.

18. The mobile terminal of claim 17, wherein the controller is further configured to control the transparent flexible display to display information related to the execution screen on the first display region, when the mobile terminal transitions from the second state to the first state.

19. The mobile terminal of claim 1, wherein the controller is further configured to activate a preset function when a first touch input is applied to the second touch sensor and another touch input is applied to the transparent flexible display.

20. The mobile terminal of claim 19, wherein the controller is further configured to store the displayed information in a form of an image in response to the first touch input applied to the second touch sensor and the another touch input applied to the transparent flexible display.

21. The mobile terminal of claim 19, wherein the controller is further configured to control the transparent flexible display to display a trace corresponding to a path of a touch input as the touch input moves across the transparent flexible display.

22. The mobile terminal of claim 19, wherein the controller is further configured to control the transparency of at least a portion of the displayed screen information based on a range of movement of the first touch input applied to the second touch sensor and the another touch input applied to the transparent flexible display.

23. The mobile terminal of claim 1, wherein the first body is larger in size than the second body,
wherein the transparent flexible display is divided into a first display region corresponding to the first body and a second display region corresponding to the second body,
wherein when the mobile terminal is in the second state and the first and second bodies are overlapping each other, such that at least a portion of the first display region extends beyond the end of the second body, the controller is further configured to display information related to an event on the extended portion of the first display region, and
wherein the event includes at least one of success or failure of a user authentication, message reception, call signal reception, a missed call, an alarm, a schedule notice, an email reception, information reception through an application.

24. The mobile terminal of claim 23, wherein the controller is further configured to control the transparent flexible display to display the information related to the event in response to a touch input applied to the transparent flexible display at a location corresponding to the extended portion of the first display region, and a touch input applied to the second touch sensor at a location corresponding to the extended portion of the first display region.

25. The mobile terminal of claim 24, wherein the second body is non-transmissive, and wherein the controller is further configured to control the transparent flexible display to display at least one of time information, weather information and the information related to the event on the extended portion of the first display region.

26. The mobile terminal of claim 24, wherein the controller is further configured to control the transparent flexible display to display a menu on the extended portion of the first display region when the mobile terminal is in the first state, and configured to replace the menu with a control icon related to the displayed information based on a change of the angle between the first and second bodies.

27. The mobile terminal of claim 1, wherein the first body is smaller in size than the second body,
wherein the flexible display is divided into a first display region corresponding to the first body and a second display region corresponding to the second body, and
wherein the controller is further configured to control the transparent flexible display to output information relating to an event on the first display region when the mobile terminal is in the first state and the first and second bodies are not folded onto each other,
wherein the event includes at least one of success or failure of a user authentication, message reception, call signal reception, a missed call, an alarm, a schedule notice, an email reception, information reception through an application.

* * * * *